United States Patent
Sandhu et al.

(10) Patent No.: US 9,055,080 B2
(45) Date of Patent: Jun. 9, 2015

(54) SYSTEMS AND METHODS FOR SERVICE ISOLATION

(75) Inventors: Vikramjeet Sandhu, Bangalore (IN); Joseph Nord, Lighthouse, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 546 days.

(21) Appl. No.: 12/967,020

(22) Filed: Dec. 13, 2010

(65) Prior Publication Data

US 2011/0173251 A1 Jul. 14, 2011

Related U.S. Application Data

(60) Provisional application No. 61/286,334, filed on Dec. 14, 2009.

(51) Int. Cl.
| | |
|---|---|
| *H04L 29/06* | (2006.01) |
| *G06F 9/445* | (2006.01) |
| *G06F 9/455* | (2006.01) |
| *G06F 21/10* | (2013.01) |
| *G06F 21/53* | (2013.01) |

(52) U.S. Cl.
CPC ............... *H04L 63/102* (2013.01); *G06F 8/61* (2013.01); *G06F 9/455* (2013.01); *G06F 21/105* (2013.01); *G06F 21/53* (2013.01); *G06F 2009/45587* (2013.01); *G06F 2221/2145* (2013.01); *H04L 63/08* (2013.01)

(58) Field of Classification Search
CPC ................. G06F 21/53; G06F 2009/45587
USPC .......................................................... 709/217
See application file for complete search history.

(56) References Cited

U.S. PATENT DOCUMENTS

| | | | |
|---|---|---|---|
| 6,574,618 B2 | 6/2003 | Eylon et al. | |
| 7,293,267 B1* | 11/2007 | Fresko | 717/166 |
| 7,761,618 B2* | 7/2010 | Avraham et al. | 710/36 |
| 2005/0149726 A1* | 7/2005 | Joshi et al. | 713/164 |
| 2005/0262181 A1* | 11/2005 | Schmidt et al. | 709/200 |
| 2006/0075381 A1* | 4/2006 | Laborczfalvi et al. | 717/100 |

(Continued)

FOREIGN PATENT DOCUMENTS

WO  WO-2007/121241  10/2007

OTHER PUBLICATIONS

International Preliminary Report on Patentability on PCT/US2010/060286 dated Jun. 28, 2012.

(Continued)

*Primary Examiner* — Backhean Tiv
(74) *Attorney, Agent, or Firm* — Foley and Lardner LLP; John D. Lanza

(57) ABSTRACT

The present invention is directed towards systems and methods of streaming an application from a remote location to a local machine system, and using local machine system resources in executing that application. In various embodiments, services needed by a streamed application may be started with high local system privileges in their own isolation environment. These service may be started, stopped, and otherwise managed by a Service Control Manager. In order for an application to both access services that operate at high local system privileges and the network so that it can access remotely stored, streaming, information; a streaming application may rely on privileges of the user when accessing network information rather than the higher privileges of the services running in isolation.

19 Claims, 32 Drawing Sheets

(56) References Cited

U.S. PATENT DOCUMENTS

| | | | |
|---|---|---|---|
| 2006/0218320 A1* | 9/2006 | Avraham et al. | 710/62 |
| 2007/0011199 A1* | 1/2007 | Hunt et al. | 707/104.1 |
| 2007/0083610 A1* | 4/2007 | Treder et al. | 709/217 |
| 2007/0083620 A1* | 4/2007 | Pedersen | 709/219 |
| 2007/0171921 A1* | 7/2007 | Wookey et al. | 370/401 |
| 2007/0245409 A1 | 10/2007 | Harris et al. | |
| 2009/0063869 A1* | 3/2009 | Kohavi et al. | 713/189 |
| 2010/0281102 A1* | 11/2010 | Chinta et al. | 709/203 |
| 2011/0173251 A1* | 7/2011 | Sandhu et al. | 709/203 |

OTHER PUBLICATIONS

International Search Report on PCT/US2010/060286 dated Aug. 31, 2011.

Written Opinion on PCT/US2010/060286 dated Aug. 31, 2011.

Extended European Search Report on 10841526.6 dated Jul. 11, 2013.

* cited by examiner

SYSTEMS AND METHODS FOR SERVICE ISOLATION

CROSS-REFERENCE TO RELATED APPLICATIONS

This application claims priority to U.S. Application Ser. No. 61/286,334 entitled "Systems and Methods for Rade Service Isolation" filed Dec. 14, 2009, the entire disclosure of which is incorporated herein by reference in its entirety for any and all purposes.

FIELD OF THE DISCLOSURE

The present disclosure relates to a method for executing application programs and, in particular, to a method for isolating services operating on a client machine.

BACKGROUND OF THE DISCLOSURE

Administrators of modern enterprise environments may face many challenges when providing access to application programs. One such challenge concerns the issue of delivering and maintaining (i.e. updating) applications to the environments in which they will eventually execute—large numbers of machines having different execution environments with varying types of access to multiple corporate networks. Another challenge concerns providing an environment on a target machine enabling execution of an application program without interfering with other application programs, which may have conflicting requirements, and in environments in which the application program may not have been designed to run (i.e. a single user application running in isolation within a multi-user operating system).

SUMMARY OF THE DISCLOSURE

The present disclosure relates to a method for selecting between a predetermined number of execution methods for an application program. In one aspect, the invention relates to a method for selecting, by a remote machine, a method of execution for an application program. Credentials associated with a local machine are received. An enumeration of a plurality of applications available to the local machine is provided, responsive to the received credentials. A request to execute an enumerated application is received. One of a predetermined number of methods for executing the enumerated application is selected responsive to a policy, the predetermined number of methods including a method for application streaming of the enumerated application. In one embodiment, the method includes selection of a method for streaming of the enumerated application to the local machine. In another embodiment, the method includes selection of a method for streaming the enumerated application to a remote machine, executing the enumerated application on the remote machine, and providing to the local machine application-output data generated by the execution of the enumerated application on the remote machine.

In another aspect, the present application relates to systems and methods for providing isolation environments to services and service processes supporting applications operating in their own isolation environments that are independent from the isolation environments of the services.

BRIEF DESCRIPTION OF THE DRAWINGS

These and other aspects of this invention will be readily apparent from the detailed description below and the appended drawings, which are meant to illustrate and not to limit the invention, and in which.

DETAILED DESCRIPTION

A. Systems and Methods for Rapid Application Delivery

The illustrative embodiment of the present disclosure is applicable to a distributed networking environment where a user of a local machine requests access to applications stored on a remote machine. Prior to discussing the specifics of the present disclosure, it may be helpful to discuss some of the network environments in which the illustrative embodiment of the present disclosure may be employed.

Figure 1A:
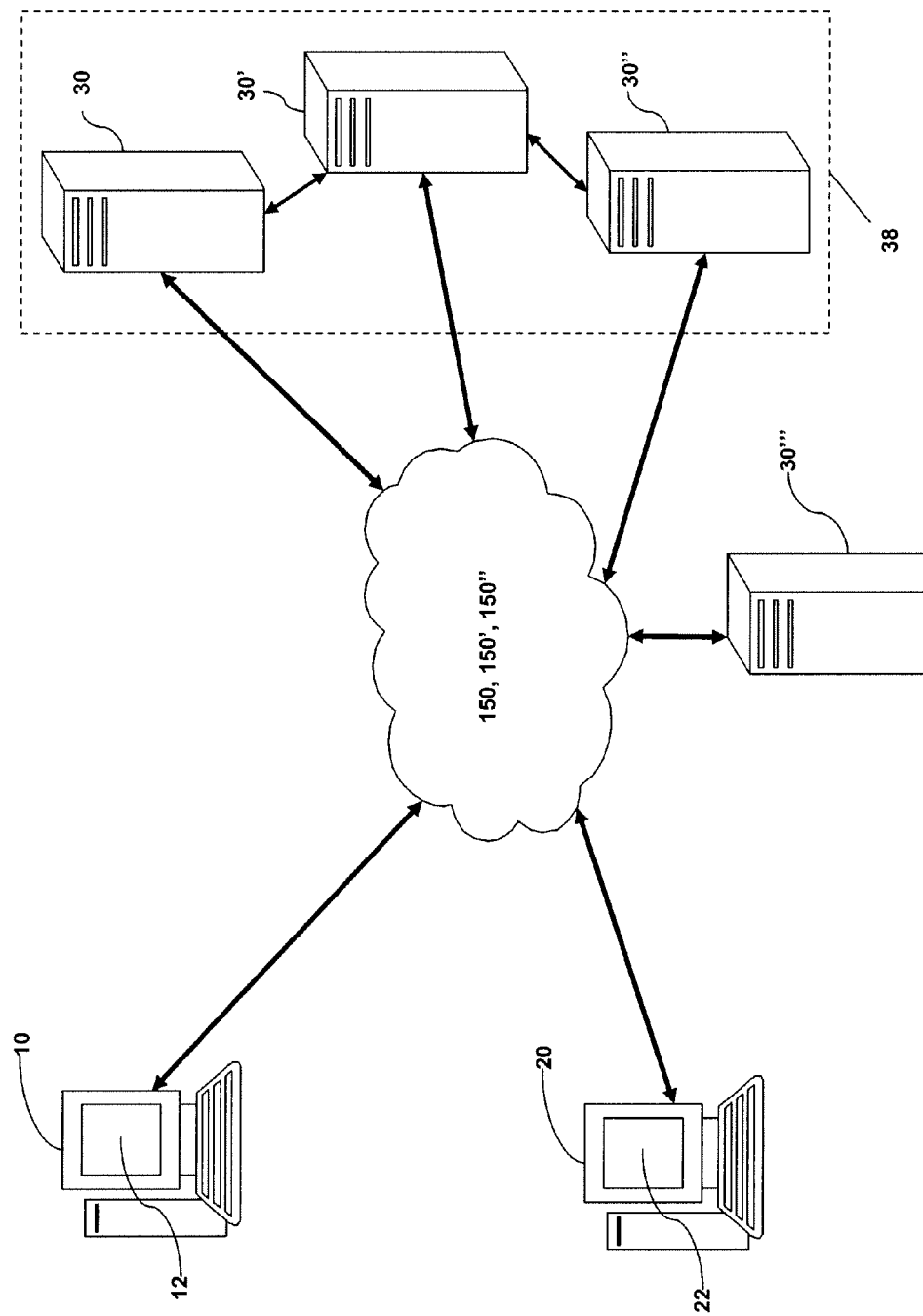
FIG. 1A is a block diagram depicting an environment suitable for practicing the illustrative embodiment of the present disclosure.

FIG. 1A is a block diagram of an environment suitable for practicing the illustrative embodiment of the present disclosure. A user of a local machine 10 or 20 is able to connect to a remote machine, such as remote machine 30, 30', 30", or 30'" (hereafter referred to generally as remote machine 30). Although only two local machines 10, 20, and only four remote machines 30 are depicted in the embodiment shown in FIG. 1A, it should be understood that the system may provide multiple ones of any or each of those components. For example, in one embodiment, the system may include multiple, logically-grouped remote machines 30, one or more of which is available to execute applications on behalf of a local machine 10, 20. In these embodiments, the logical group of remote machines may be referred to as a "server farm," indicated in FIG. 1A as farm 38. In some of these embodiments, the remote machines 30 may be geographically dispersed. A farm 38 may be administered as a single entity.

The remote machines 30 within each farm 38 can be heterogeneous. That is, one or more of the remote machines 30 can operate according to one type of operating system platform (e.g., WINDOWS NT, manufactured by Microsoft Corp. of Redmond, Wash.), while one or more of the other remote machines 30 can operate on according to another type of operating system platform (e.g., Unix or Linux). The remote machines 30 comprising each farm 38 do not need to be physically proximate to each other remote machine 30 in its farm 38. Thus, the group of remote machines 30 logically grouped as a farm 38 may be interconnected using a wide-area network (WAN) connection or medium-area network (MAN) connection. For example, a farm 38 may include remote machines 30 physically located in different regions of a state, city, campus, or room. Data transmission speeds between remote machines 30 in the farm 38 can be increased if the remote machines 30 are connected using a local-area network (LAN) connection or some form of direct connection.

Remote machines 30 may be referred to as servers, file servers, application servers, or remote machines. In some embodiments, remote machines 30 may have the capacity to function as either application servers or as a master application server. In one embodiment, a remote machine 30 may include an Active Directory. The local machines 10, 20, may also be referred to as client nodes or endpoints. In some embodiments, the local machines 10, 20 have the capacity to function as both client nodes seeking access to applications and as application servers providing access to hosted applications for other local machines 10, 20.

In one embodiment, the local machine 10 communicates directly with one of the remote machines 30 in a farm 38. In another embodiment, the local machine 10 executes a program neighborhood application to communicate with the remote machine 30 in a farm 38. In still another embodiment, the remote machine 30 provides the functionality of a master node. In some embodiments, the local machine 10 communicates with the remote machine 30 in the farm 38 through a communications link 150. Over the communication link 150, the local machine 10 can, for example, request execution of various applications hosted by the remote machines 30, 30', 30", and 30'" in the farm 38 and receive output of the results of the application execution for display. The communications link 150 may be synchronous or asynchronous and may be a LAN connection, MAN (Medium-Area Network) connection, or a WAN connection. Additionally, communications link 150 may be a wireless link, such as an infrared channel or satellite band. In some embodiments, only the master node provides the functionality required to identify and provide address information associated with a remote machine 30' hosting a requested application.

In some embodiments, a local machine 10 communicates with a remote machine 30'. In one of these embodiment, the remote machine 30'" provides functionality of a web server. In another of these embodiments, the remote machine 30'" receives requests from the local machine 10, forwards the requests to a remote machine 30 and responds to the request by the local machine 10 with a response to the request from the remote machine 30. In still another of these embodiments, the remote machine 30 acquires an enumeration of applications available to the local machine 10 and address information associated with a remote machine 30' hosting an application identified by the enumeration of applications. In yet another of these embodiments, the remote machine 30''' presents the response to the request to the local machine 10 using a web interface. In one embodiment, the local machine 10 communicates directly with the remote machine 30' to access the identified application. In another embodiment, the local machine 10 receives application output data from the remote machine 30''', the application output data generated by an execution of the identified application on the remote machine 30'.

In many embodiments, the remote machines 30, and the local machines 10 and 20, are provided as personal computer or computer servers, of the sort manufactured by Apple Computer, Inc., of Cupertino, Calif., International Business Machines of White Plains, N.Y., Hewlett-Packard Corporation of Palo Alto, Calif. or the Dell Corporation of Round Rock, Tex. In some embodiments, the remote machines 30 may be virtual machines executing on a server, such as a blade server. In these embodiments, a single physical server may provide two or more application servers.

Figure 1B:
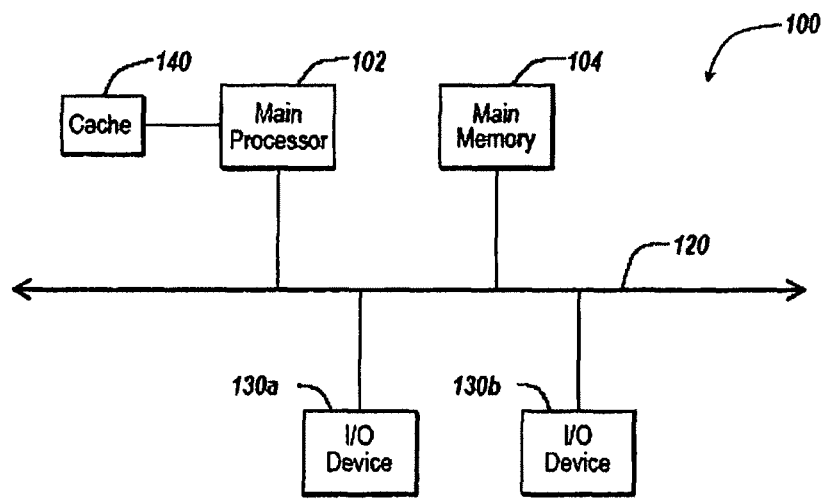
FIGS. 1B and 1C are block diagrams depicting embodiments of computers useful in connection with the present disclosure.
Figure 1C:
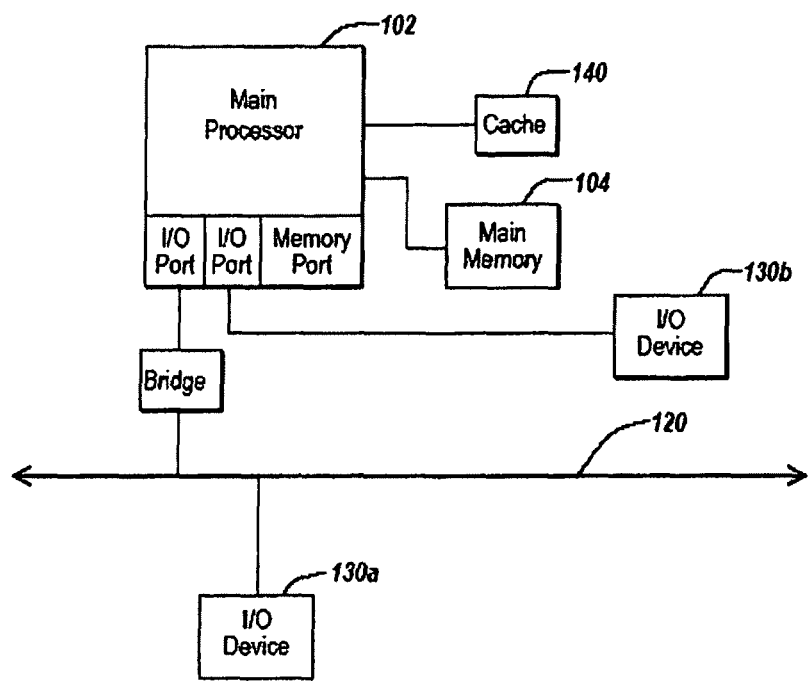

FIGS. 1B and 1C depict block diagrams of a typical computer 100 useful in those embodiments as the remote machine 30, or the local machine 10, 20. As shown in FIGS. 1B and 1C, each computer 100 includes a central processing unit 102, and a main memory unit 104. Each computer 100 may also include other optional elements, such as one or more input/output devices 130a-130n (generally referred to using reference numeral 130), and a cache memory 140 in communication with the central processing unit 102.

The central processing unit 102 is any logic circuitry that responds to and processes instructions fetched from the main memory unit 104. In many embodiments, the central processing unit is provided by a microprocessor unit, such as those manufactured by Intel Corporation of Mountain View, Calif.; those manufactured by Motorola Corporation of Schaumburg, Ill.; those manufactured by International Business Machines of White Plains, N.Y.; or those manufactured by Advanced Micro Devices of Sunnyvale, Calif.

Main memory unit 104 may be one or more memory chips capable of storing data and allowing any storage location to be directly accessed by the microprocessor 102, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM).

In the embodiment shown in FIG. 1B, the processor 102 communicates with main memory 104 via a system bus 120 (described in more detail below). FIG. 1C depicts an embodiment of a computer system 100 in which the processor communicates directly with main memory 104 via a memory port. For example, in FIG. 1C, the main memory 104 may be DRDRAM.

FIG. 1B and FIG. 1C depict embodiments in which the main processor 102 communicates directly with cache memory 140 via a secondary bus, sometimes referred to as a "backside" bus. In other embodiments, the main processor 102 communicates with cache memory 140 using the system bus 120. Cache memory 140 typically has a faster response time than main memory 104 and is typically provided by SRAM, BSRAM, or EDRAM.

In the embodiment shown in FIG. 1B, the processor 102 communicates with various I/O devices 130 via a local system bus 120. Various busses may be used to connect the central processing unit 102 to the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display, the processor 102 may use an Advanced Graphics Port (AGP) to communicate with the display. FIG. 1C depicts an embodiment of a computer system 100 in which the main processor 102 communicates directly with I/O device 130b via HyperTransport, Rapid I/O, or InfiniBand. FIG. 1C also depicts an embodiment in which local busses and direct communication are mixed: the processor 102 communicates with I/O device 130a using a local interconnect bus while communicating with I/O device 130b directly.

A wide variety of I/O devices 130 may be present in the computer system 100. Input devices include keyboards, mice, trackpads, trackballs, microphones, and drawing tablets. Output devices include video displays, speakers, inkjet printers, laser printers, and dye-sublimation printers. An I/O device may also provide mass storage for the computer system 100 such as a hard disk drive, a floppy disk drive for receiving floppy disks such as 3.5-inch, 5.25-inch disks or ZIP disks, a CD-ROM drive, a CD-R/RW drive, a DVD-ROM drive, tape drives of various formats, and USB storage devices such as the USB Flash Drive line of devices manufactured by Twintech Industry, Inc. of Los Alamitos, Calif., and the iPod Shuffle line of devices manufactured by Apple Computer, Inc., of Cupertino, Calif.

In further embodiments, an I/O device 130 may be a bridge between the system bus 120 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

General-purpose desktop computers of the sort depicted in FIG. 1B and FIG. 1C typically operate under the control of operating systems, which control scheduling of tasks and access to system resources. Typical operating systems include: MICROSOFT WINDOWS, manufactured by Microsoft Corp. of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, among others.

The local machines 10 and 20 may be any personal computer (e.g., a Macintosh computer or a computer based on processors such as 286, 386, 486, Pentium, Pentium II, Pentium III, Pentium IV, Pentium M, the Celeron, or the Xeon processor, all of which are manufactured by Intel Corporation of Mountain View, Calif.), Windows-based terminal, Network Computer, wireless device, information appliance, RISC Power PC, X-device, workstation, mini computer, main frame computer, personal digital assistant, or other computing device that has a windows-based desktop and sufficient persistent storage for executing a small, display presentation program. The display presentation program uses commands and data sent to the application across communication channels to render a graphical display. Windows-oriented platforms supported by the local machines 10 and 20 can include, without limitation, WINDOWS 3.x, WINDOWS 95, WINDOWS 98, WINDOWS NT 3.51, WINDOWS NT 4.0, WINDOWS 2000, Windows 2003, WINDOWS CE, Windows XP, Windows vista, MAC/OS, Java, Linux, and UNIX. The local machines 10 and 20 can include a visual display device (e.g., a computer monitor), a data entry device (e.g., a keyboard), persistent or volatile storage (e.g., computer memory) for storing downloaded application programs, a processor, and a mouse. Execution of a small, display presentation program allows the local machines 10 and 20 to participate in a distributed computer system model (i.e., a server-based computing model).

For embodiments in which a local machine 10 or 20 is a mobile device, the device may be a JAVA-enabled cellular telephone, such as those manufactured by Motorola Corp. of Schaumburg, Ill., those manufactured by Kyocera of Kyoto, Japan, or those manufactured by Samsung Electronics Co., Ltd., of Seoul, Korea. In other embodiments in which the local machine 10 or 20 is mobile, the device may be a personal digital assistant (PDA) operating under control of the PalmOS operating system, such as the devices manufactured by palmOne, Inc. of Milpitas, Calif. In further embodiments, the local machine 10 or 20 may be a personal digital assistant (PDA) operating under control of the PocketPC operating system, such as the iPAQ devices manufactured by Hewlett-Packard Corporation of Palo Alto, Calif., the devices manufactured by ViewSonic of Walnut, Calif., or the devices manufactured by Toshiba America, Inc. of New York, N.Y. In still other embodiments, the client node is a combination PDA/telephone device such as the Treo devices manufactured by palmOne, Inc. of Milpitas, Calif. In still further embodiments, the local machine 10 or 20 is a cellular telephone that operates under control of the PocketPC operating system, such as those manufactured by Motorola Corp.

In one embodiment, the local machine 10 communicates directly with one of the remote machines 30 in a farm 38. In some embodiments, the local machine 10 communicates with the remote machine 30 in the farm 38 through a communications link 150. Over the communication link 150, the local machine 10 can, for example, request execution of various applications hosted by the remote machines 30, 30', 30", and 30'" in the farm 38 and receive output of the results of the application execution for display. The communications link 150 may be synchronous or asynchronous and may be a LAN connection, MAN (Medium-area Network) connection, or a WAN connection. Additionally, communications link 150 may be a wireless link, such as an infrared channel or satellite band.

In some embodiments, a local machine 10 communicates with a remote machine 30. In one of these embodiment, the remote machine 30 provides the local machine 10 with an enumeration of applications available for execution by the local machine 10. In another of these embodiments, the remote machine 30 provides the local machine 10 with address information associated with a remote machine 30' hosting an application identified by the enumeration of applications. In still another of these embodiments, the local machine 10 communicates with the remote machine 30' to access the identified application. In one embodiment, the local machine 10 executes a program neighborhood application to communicate with the remote machines 30 and 30'. In some embodiments, each of the remote machines 30 provide the functionality required to identify and provide address information associated with a remote machine 30' hosting a requested application.

In some embodiments, a local machine 10 communicates with a remote machine 30'". In one of these embodiment, the remote machine 30'" provides functionality of a web server or a file server. In another of these embodiments, the remote machine 30'" receives requests from the local machine 10, forwards the requests to a remote machine 30 and responds to the request by the local machine 10 with a response to the request from the remote machine 30. In still another of these embodiments, the remote machine 30 acquires an enumeration of applications available to the local machine 10 and address information associated with a remote machine 30' providing access to an application program identified by the enumeration of applications. In yet another of these embodiments, the remote machine 30'" presents the response to the request to the local machine 10 using a web interface. In one embodiment, the local machine 10 communicates directly with the remote machine 30' to access the identified application. In another embodiment, the local machine 10 receives application output data from the remote machine 30'", the application output data generated by an execution of the identified application on the remote machine 30'.

Figure 1D:
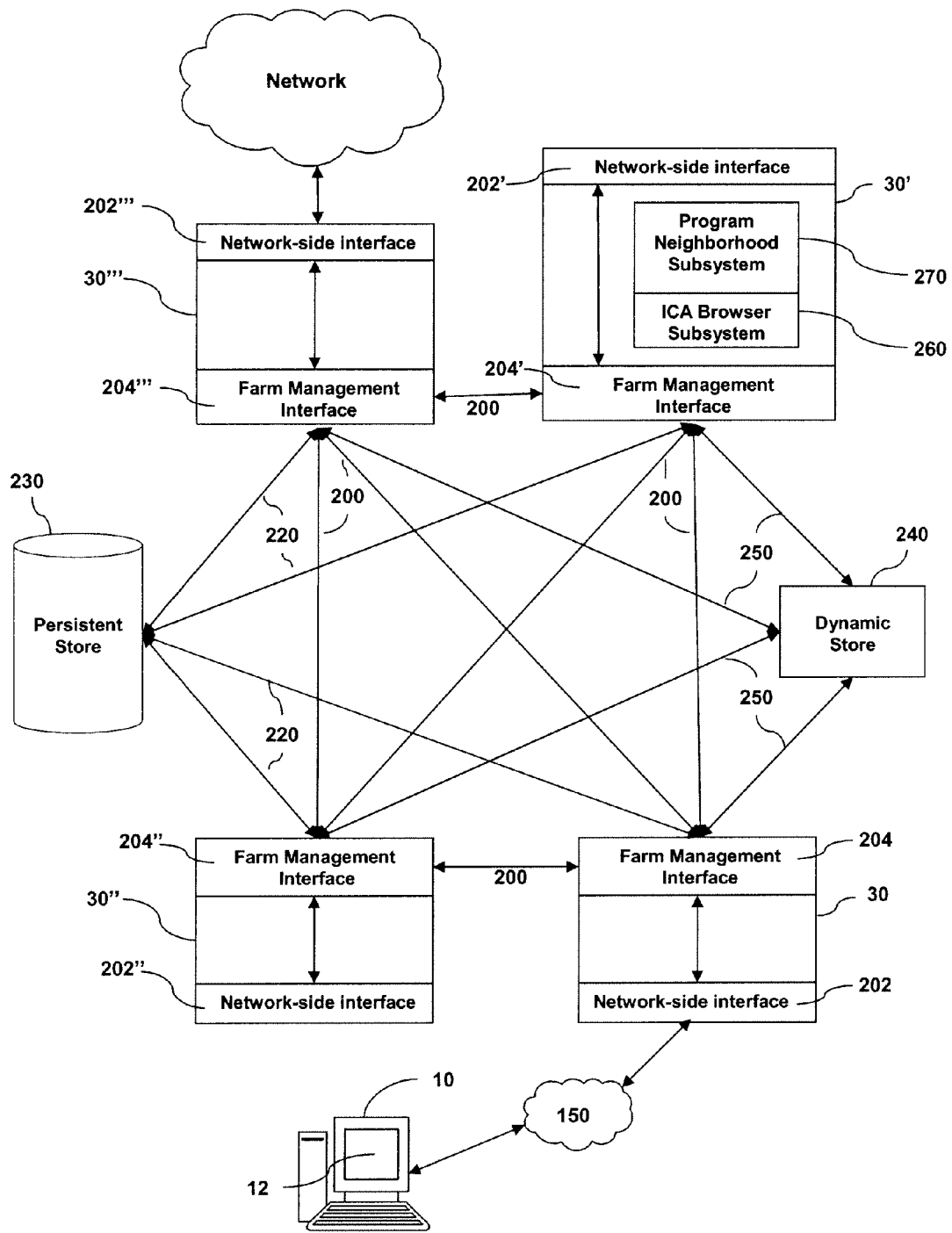
FIG. 1D is a block diagram depicting an embodiment of a server farm using the invention.

Referring now to FIG. 1D, the remote machines 30 comprising a farm 38 each include a network-side interface 202 and a farm-side interface 204. The network-side interfaces 202 of the remote machine 30 may be in communication with one or more local machines 10, 20 or a network 210. The network 210 can be a WAN, LAN, or international network such as the Internet or the World Wide Web. Local machines 10, 20 may establish connections with the remote machines 30 using the network 210.

The farm-side interfaces 204 of the remote machines 30 are interconnected with each over communication links 200 so that the remote machines 30 may communicate with one another. On each remote machine 30, the farm-side interface 204 communicates with the network-side interface 202. The farm-side interfaces 204 also communicate (designated by arrows 220) with a persistent store 230 and, in some embodiments, with a dynamic store 240. The combination of remote machines 30, the persistent store 230, and the dynamic store 240, when provided, are collectively referred to as a farm 38. In some embodiments, a remote machine 30 communicates with the persistent store 230 and other remote machines 30' communicate with the remote machine 30 to access information stored in the persistent store.

Persistent store 230 may be physically implemented on a disk, disk farm, a redundant array of independent disks (RAID), writeable compact disc, or any other device that allows data to be read and written and that maintains written data if power is removed from the storage device. A single physical device may provide storage for a plurality of persistent stores, i.e., a single physical device may be used to provide the persistent store 230 for more than one farm 38. The persistent store 230 maintains static data associated with each remote machine 30 in farm 38 and global data used by all remote machines 30 within the farm 38. In one embodiment, the persistent store 230 may maintain the remote machine data in a Lightweight Directory Access Protocol (LDAP) data model. In other embodiments, the persistent store 230 stores remote machine data in an ODBC-compliant database. For the purposes of this description, the term "static data" refers to data that do not change frequently, i.e., data that change only on an hourly, daily, or weekly basis, or data that never change. Each remote machine uses a persistent storage subsystem to read data from and write data to the persistent store 230.

The data stored by the persistent store 230 may be replicated for reliability purposes physically or logically. For example, physical redundancy may be provided using a set of redundant, mirrored disks, each providing a copy of the data.

In other embodiments, the database itself may be replicated using standard database techniques to provide multiple copies of the database. In further embodiments, both physical and logical replication may be used concurrently.

The dynamic store 240 (i.e., the collection of all record tables) can be embodied in various ways. In one embodiment, the dynamic store 240 is centralized; that is, all runtime data are stored in the memory of one remote machine 30 in the farm 38. That remote machine operates as a master network node with which all other remote machines 30 in the farm 38 communicate when seeking access to that runtime data. In another embodiment, each remote machine 30 in the farm 38 keeps a full copy of the dynamic store 240. Here, each remote machine 30 communicates with every other remote machine 30 to keep its copy of the dynamic store 240 up to date.

In another embodiment, each remote machine 30 maintains its own runtime data and communicates with every other remote machine 30 when seeking to obtain runtime data from them. Thus, for example, a remote machine 30 attempting to find an application program requested by the local machine 10 may communicate directly with every other remote machine 30 in the farm 38 to find one or more remote machines hosting the requested application.

For farms 38 having a large number of remote machines 30, the network traffic produced by these embodiments can become heavy. One embodiment alleviates heavy network traffic by designating a subset of the remote machines 30 in a farm 38, typically two or more, as "collector points." Generally, a collector point is a remote machine that collects runtime data. Each collector point stores runtime data collected from certain other remote machines 30 in the farm 38. Each remote machine 30 in the farm 38 is capable of operating as, and consequently is capable of being designated as, a collector point. In one embodiment, each collector point stores a copy of the entire dynamic store 240. In another embodiment, each collector point stores a portion of the dynamic store 240, i.e., it maintains runtime data of a particular data type. The type of data stored by a remote machine 30 may be predetermined according to one or more criteria. For example, remote machines 30 may store different types of data based on their boot order. Alternatively, the type of data stored by a remote machine 30 may be configured by an administrator using administration tool 140. In these embodiments, the dynamic store 240 is distributed among two or more remote machines 30 in the farm 38.

Remote machines 30 not designated as collector points know the remote machines 30 in a farm 38 that are designated as collector points. A remote machine 180 not designated as a collector point may communicate with a particular collector point when delivering and requesting runtime data. Consequently, collector points lighten network traffic because each remote machine 30 in the farm 38 communicates with a single collector point remote machine 30, rather than with every other remote machine 30, when seeking to access the runtime data.

Each remote machine 30 can operate as a collector point for more than one type of data. For example, remote machine 30" can operate as a collector point for licensing information and for loading information. In these embodiments, each collector point may amass a different type of run-time data. For example, to illustrate this case, the remote machine 30''' can collect licensing information, while the remote machine 30" collects loading information.

In some embodiments, each collector point stores data that is shared between all remote machines 30 in a farm 38. In these embodiments, each collector point of a particular type of data exchanges the data collected by that collector point with every other collector point for that type of data in the farm 38. Thus, upon completion of the exchange of such data, each collector point 30" and 30 possesses the same data. Also in these embodiments, each collector point 30 and 30" also keeps every other collector point abreast of any updates to the runtime data.

Browsing enables a local machine 10 to view farms 38, remote machines 30, and applications in the farms 38 and to access available information such as sessions throughout the farm 38. Each remote machine 30 includes an ICA browsing subsystem 260 to provide the local machine 10 with browsing capability. After the local machine 10 establishes a connection with the ICA browser subsystem 260 of any of the remote machines 30, that browser subsystem supports a variety of local machine requests. Such local machine requests include: (1) enumerating names of remote machines in the farm, (2) enumerating names of applications published in the farm, (3) resolving a remote machine name and/or application name to a remote machine address that is useful the local machine 10. The ICA browser subsystem 260 also supports requests made by local machines 10 running a program neighborhood application that provides the local machine 10, upon request, with a view of those applications within the farm 38 for which the user is authorized. The ICA browser subsystem 260 forwards all of the above-mentioned local machine requests to the appropriate subsystem in the remote machine 30.

In one embodiment, each remote machine 30 in the farm 38 that has a program neighborhood subsystem 270 can provide the user of a local machine 10 with a view of applications within the farm 38. The program neighborhood subsystem 270 may limit the view to those applications for which the user of the local machine 10 has authorization to access. Typically, this program neighborhood service presents the applications to the user as a list or a group of icons.

The functionality provided by the program neighborhood subsystem 270 is available to two types of local machines, (1) program neighborhood-enabled local machines that can access the functionality directly from a local machine desktop, and (2) non-program neighborhood-enabled local machines (e.g., legacy local machines) that can access the functionality by running a program neighborhood-enabled desktop on the remote machine.

Communication between a program neighborhood-enabled local machine and the program neighborhood subsystem 270 may occur over a dedicated virtual channel that is established on top of an ICA virtual channel. In other embodiments, the communication occurs using an XML service. In one of these embodiments, the program neighborhood-enabled local machine communicates with an XML subsystem, such as the XML service 516 described in connection with FIG. 6 below, providing program neighborhood functionality on a remote machine 30.

In one embodiment, the program neighborhood-enabled local machine does not have a connection with the remote machine with a program neighborhood subsystem 270. For this embodiment, the local machine 10 sends a request to the ICA browser subsystem 260 to establish an ICA connection to the remote machine 30 in order to identify applications available to the local machine 10. The local machine 10 then runs a client-side dialog that acquires the credentials of a user. The credentials are received by the ICA browser subsystem 260 and sent to the program neighborhood subsystem 270. In one embodiment, the program neighborhood subsystem 270 sends the credentials to a user management subsystem for authentication. The user management subsystem may return a set of distinguished names representing the list of accounts to which the user belongs. Upon authentication, the program neighborhood subsystem 270 establishes the program neighborhood virtual channel. This channel remains open until the application filtering is complete.

The program neighborhood subsystem 270 then requests the program neighborhood information from the common application subsystem 524 associated with those accounts. The common application subsystem 524 obtains the program neighborhood information from the persistent store 230. On receiving the program neighborhood information, the program neighborhood subsystem 270 formats and returns the program neighborhood information to the local machine over the program neighborhood virtual channel. Then the partial ICA connection is closed.

For another example in which the program neighborhood-enabled local machine establishes a partial ICA connection with a remote machine, consider the user of the local machine 10 who selects a farm 38. The selection of the farm 38 sends a request from the local machine 10 to the ICA browser subsystem 260 to establish an ICA connection with one of the remote machines 30 in the selected farm 38. The ICA browser subsystem 260 sends the request to the program neighborhood subsystem 270, which selects a remote machine 30 in the farm 38. Address information associated with the remote machine 30 is identified and returned to the local machine 10 by way of the ICA browser subsystem 260. The local machine 10 can then subsequently connect to the remote machine 30 corresponding to the received address information.

In another embodiment, the program neighborhood-enabled local machine 10 an ICA connection upon which the program neighborhood-virtual channel is established and remains open for as long as the ICA connection persists. Over this program neighborhood virtual channel, the program neighborhood subsystem 270 pushes program neighborhood information updates to the local machine 10. To obtain updates, the program neighborhood subsystem 270 subscribes to events from the common application subsystem 524 to allow the program neighborhood subsystem 270 to detect changes to published applications.

Figure 1E:
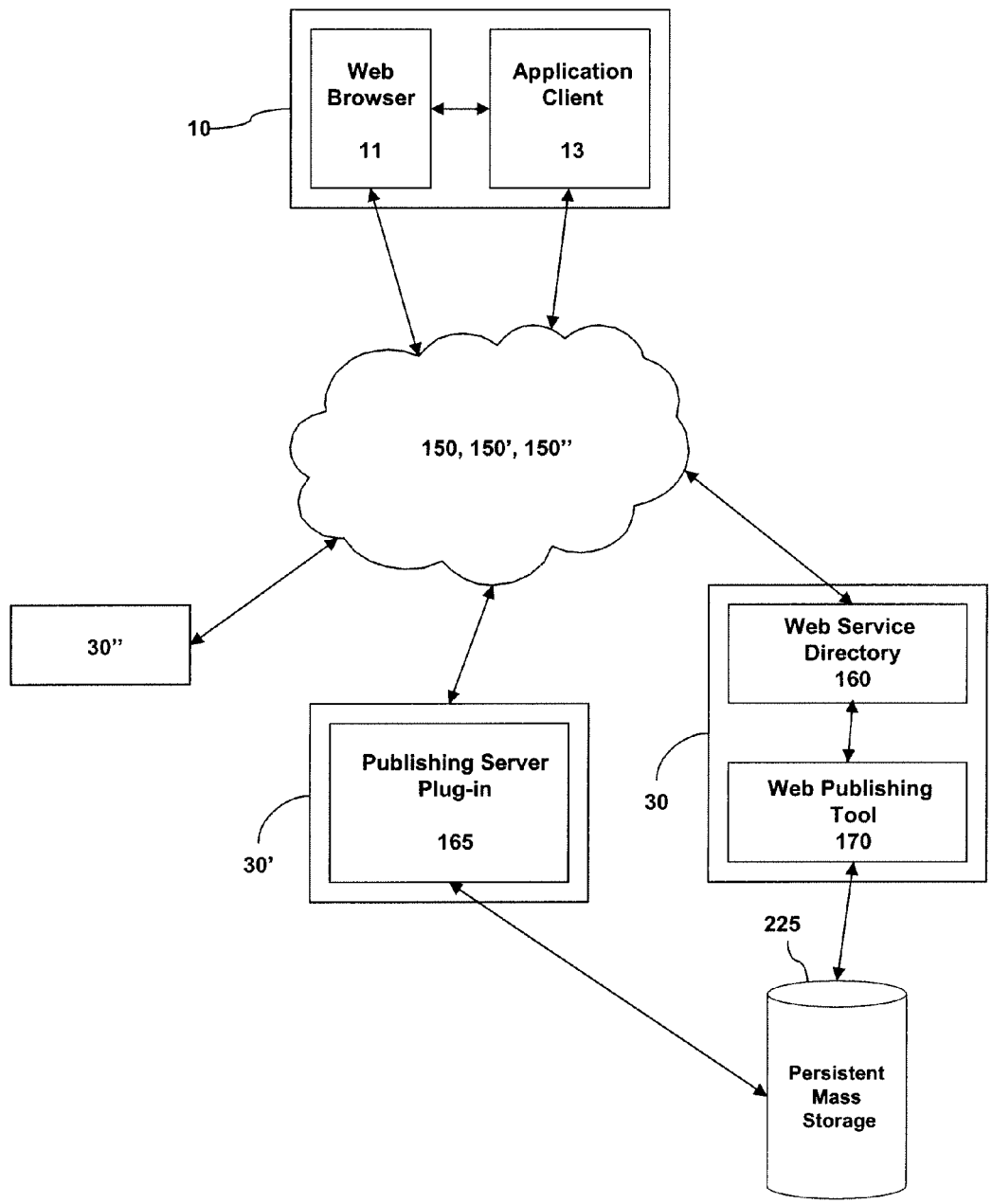
FIG. 1E is a block diagram depicting one embodiment of a system for providing a plurality of application programs available to the local machine via publishing of GUIs in a web service directory.

Referring to FIG. 1E, a block diagram depicts another embodiment of a system architecture for providing a plurality of application programs available to the local machine via publishing of GUIs in a web service directory. The system includes the local machine 10, and a plurality of remote machines 30. One remote machine 30 functions as a content server. A remote machine 30' provides web server functionality. A remote machine 30" provides functionality for providing access to application files and acts as an application server or a file server. The local machine 10 can download content from the content server 30, the web server 30', and the application server 30" over the network 155. In one embodiment, the local machine 10 can download content (e.g., an application) from the application server 30" over the client-application server communication channel 150.

In one embodiment, the web browser 11 on the local machine 10 uses Secure Socket Layer (SSL) support for communications to the content server 30 and/or the web server 30'. SSL is a secure protocol developed by Netscape Communication Corporation of Mountain View, Calif., and is now a standard promulgated by the Internet Engineering Task Force (IETF). The web browser 11 can alternatively connect to the content server 30 and/or the web server 30' using other security protocols, such as, but not limited to, Secure Hypertext Transfer Protocol (SHTTP) developed by Terisa Systems of Los Altos, Calif., HTTP over SSL (HTTPS), Private Communication Technology (PCT) developed by Microsoft Corporation of Redmond, Wash., and the Transport Level Security (TLS) standard promulgated by the IETF. In other embodiments, the web browser 11 communicates with the servers 30 using a communications protocol without encryption, such as the HyperText Transfer Protocol (HTTP).

Additionally, the local machine 10 includes an application client 13 for establishing and exchanging communications with the application server 30" over the client-application server communication channel 150. In one embodiment, the application client 13 is a GUI application. In some embodiments, the application client 13 is an Independent Computing Architecture (ICA) client, developed by Citrix Systems, Inc. of Fort Lauderdale, Fla., and is also referred to below as ICA client 13. Other embodiments of the application client 13 include a Remote Display Protocol (RDP) client, developed by Microsoft Corporation of Redmond, Wash., an X-Windows client 13, a client-side player, interpreter or simulator capable of executing multimedia applications, email, Java, or .NET code. Moreover, in one embodiment the output of an application executing on the application server 30" can be displayed at the local machine 10 via the ICA client 13. In some embodiments, the application client 13 is an application client such as the application streaming client 552, described in greater detail in connection with FIG. 5.

The local machine 10 searches the web service directory 160 for a web service. In one embodiment, the search is a manual search. Alternatively, the search is an automatic search. The web service directory 160 may also provide a service based view, such as white and yellow pages, to search for web services in the web service directory. In another embodiment, the web service directory 160 supports a hierarchical browsing based on a structured service name and service kind for GUI applications. In one embodiment, the web service directory 160 executes on a remote machine independent of the content server 30, such as a directory server. In other embodiments, the web service directory 160 executes on multiple servers.

In some embodiments, the content server 30 enables the local machine 10 to select web services based on additional analysis or information by providing this information or analysis in the web service directory 160. Examples of service information that the web service directory 160 can list includes, but is not limited to, the name of the business offering the service, the service type, a textual description of the service, one or more service access points (SAPs), the network type, the path to use (e.g., TCP or HTTPS), and quality of service (QoS) information. Moreover, service information can be client device type or user (e.g., role) specific. Thus, service selection can be based on one or more of the above attributes.

In one embodiment, the service type denotes a programming interface that the local machine 10 may use to access the web service. For instance, the service type can state that the service is encoded by an interface description language, such as Web Services Description Language (WSDL).

The service access point, or SAP, is a unique address for an application. The SAPs enable the computer system to support multiple applications at the local machine 10 and each remote machine 30. For example, the application server 30" may support an electronic mail (i.e., e-mail) application, a file transfer application, and/or a GUI application. In one embodiment, these applications would each have a SAP that is unique within the application server 30". In one embodiment, the SAP is a web or Internet address (e.g., Domain Name System (DNS) name, IP/port, or Uniform Resource Locator (URL)). Thus, in one embodiment the SAP identifies the address of the web server 30' as part of the address for an application stored on the web server 30'. In some embodiments, the SAP identifies the address of a publishing server plug-in 165 as part of the address for an application stored on the web server 30', as described below. In one embodiment, the SAP is an "accessPoint" from the UDDI registry.

To prepare an item for publishing in the web service directory 160, the content server 30 includes a web publishing tool 170. In one embodiment, the web publishing tool 170 is a software module. Alternatively, the web publishing tool 170 is another server that may be externally located from or internally located in the content server 30.

In one embodiment, the web server 30' delivers web pages to the local machine 10. The web server 30' can be any remote machine 30 capable of providing web pages to the local machine 105. In another embodiment, the web server 30' is an Enterprise Information Portal (e.g., corporate Intranet or secured business-to-business extranet). Enterprise portals are company web sites that aggregate, personalize and serve applications, data and content to users, while offering management tools for organizing and using information more efficiently. In some companies, portals have replaced traditional desktop software with browser-based access to a virtual workplace.

The web server 30' also includes a publishing server plug-in 165 to enable the publishing of graphical user interface (GUI) applications. More specifically, the publishing server plug-in 165 translates a new web service entry URL into a GUI application service so that the GUI can be accessed via the web service directory 160. In one embodiment, the publishing server plug-in 165 is a Common Gateway Interface (CGI) script, which is a program designed to accept and return data that conforms to the CGI specification. The program can be written in any programming language, such as C, Perl, Java, or Visual Basic. In another embodiment, the publishing server plug-in 165 is a Java Server Page (JSP). Using the publishing server plug-in 165 to facilitate the publishing of remote GUI applications, the local machine 10 can thereby access the web service, not through a programming interface or a web page, but through a full GUI interface, such as with Citrix's ICA or Microsoft's RDP.

The application server 30" hosts one or more applications that are available for the local machine 10. Examples of such applications include word processing programs such as MICROSOFT WORD and spreadsheet programs such as MICROSOFT EXCEL, both manufactured by Microsoft Corporation of Redmond, Wash., financial reporting programs, customer registration programs, programs providing technical support information, customer database applications, or application set managers.

In some embodiments, one or more communication links 150 are established over different networks. For example, the client-content server communication channel 150' can belong to a first network (e.g., the World Wide Web) and the client-web server communication channel 150" can belong to a second network (e.g., a secured extranet or Virtual Private Network (VPN)).

In one embodiment, the web publishing tool 170 stores information about an application that the web publishing tool 170 is publishing in the web service directory 160 in a persistent mass storage 225. In one embodiment the information is a URL for the dynamic publishing server plug-in 165. The persistent mass storage 225 may be a magnetic disk or magneto-optical drive. In one embodiment, the persistent mass storage 225 is a database server, which stores data related to the published application in one or more local service databases. The persistent mass storage 225 may be a component internally located in or externally located from any or all of the remote machines 30.

In other embodiments, the content server 30 or the web server 30' communicate with a remote machine 30 in the farm 38 to retrieve the list of applications. In one of these embodiments, the content server 30 or the web server 30' communicate with the farm 38 instead of with the persistent mass storage 225.

Figure 2:
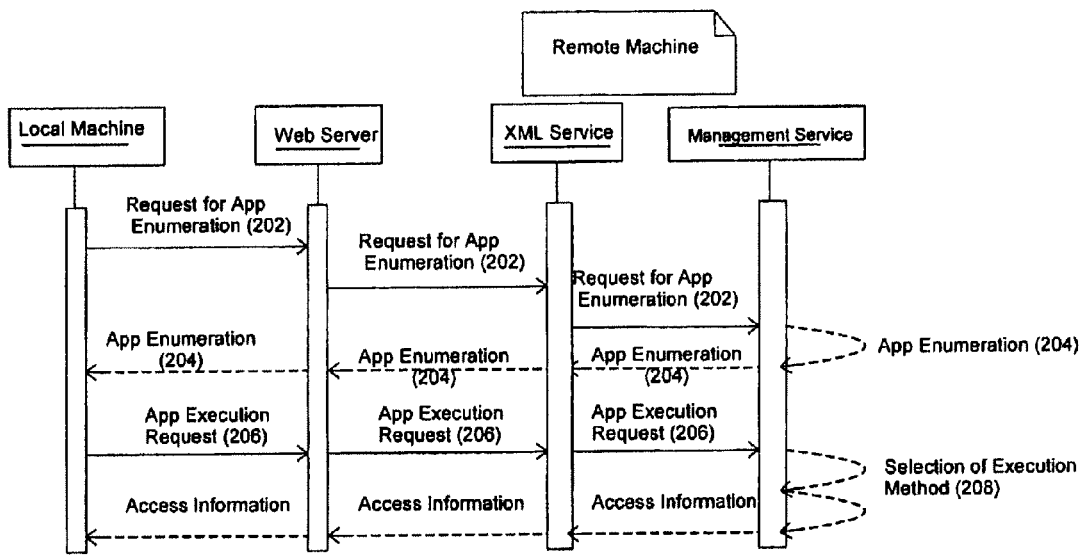
FIG. 2 is a flow diagram depicting one embodiment of the steps taken to select a method of execution of an application program.

Referring now to FIG. 2, a flow diagram depicts one embodiment of the steps taken to select a method of execution of an application program. In brief overview, credentials associated with the local machine or with a user of the local machine are received, with a request for an enumeration of applications available for execution by the local machine (step 202). An enumeration of a plurality of application programs available to the local machine is provided, responsive to the received credentials (step 204). A request is received to execute an enumerated application (step 206). One of a predetermined number of methods for executing the enumerated application is selected, responsive to a policy, the predetermined number of methods including a method for application streaming of the enumerated application (step 208).

Credentials associated with the local machine or with a user of the local machine are received, with a request for an enumeration of applications available for execution by the local machine (step 202). In one embodiment, the remote machine receives a request for enumeration of available applications from the local machine 10 with the credentials. In another embodiment, an XML service on the remote machine 30 receives the request and the credentials and transmits the request and credentials to a management service on the remote machine 30.

In some embodiments, a remote machine 30 functioning as a web server receives communications from the local machine 10 and forwards the communications to a remote machine 30'. In one of these embodiments, the web server forwards the communications to an XML service on the remote machine 30'. In another of these embodiments, the web server resides on the local machine. In other embodiments where communications from the local machine 10 are routed to a remote machine 30' by the web server, the remote machine 30 may be selected responsive to an Internet Protocol (IP) address of the local machine 10.

In some embodiments, a local machine 10 requests access to an application residing on a remote machine 30. In one of these embodiments, the local machine 10 requests execution by the remote machine 30 of the application residing on the remote machine 30. In another of these embodiments, the local machine 10 requests retrieval of a plurality of application files that comprise the application.

In some embodiments, the user provides credentials to the remote machine 30 via a graphical user interface presented to the local machine 10 by the remote machine 30. In other embodiments, a remote machine 30'" having the functionality of a web server provides the graphical user interface to the local machine 10. In still other embodiments, a collection agent transmitted to the local machine 10 by the remote machine 30 gathers the credentials from the local machine 10. In one embodiment, a credential refers to a username and password. In another embodiment, a credential is not limited to a username and password but includes, without limitation, a machine ID of the local machine 10, operating system type, existence of a patch to an operating system, MAC addresses of installed network cards, a digital watermark on the client device, membership in an Active Directory, existence of a virus scanner, existence of a personal firewall, an HTTP header, browser type, device type, network connection information such as internet protocol address or range of addresses, machine ID of the remote machine 30, date or time of access request including adjustments for varying time zones, and authorization credentials.

In some embodiments, a credential associated with a local machine is associated with a user of the local machine. In one of these embodiments, the credential is information possessed by the user. In another of these embodiments, the credential is user authentication information. In other embodiments, a credential associated with a local machine is associated with a network. In one of these embodiments, the credential is information associated with a network to which the local machine may connect. In another of these embodiments, the credential is information associated with a network collecting information about the local machine. In still other embodiments, a credential associated with a local machine is a characteristic of the local machine.

An enumeration of a plurality of application programs available to the local machine is provided, responsive to the received credentials (step 204). In one embodiment, a user of a local machine 10 may learn of the availability of application programs hosted by the remote machines 30 in the network 40 without knowing where to find such applications and without technical information necessary to link to such applications. These available application programs comprise the "program neighborhood" of the user. A system for determining a program neighborhood for a local machine includes an application program (hereafter referred to as the "Program Neighborhood" application), memory for storing components of the application program, and a processor for executing the application program. The Program Neighborhood (PN) application can be installed in memory of the local machine 10 and/or on a remote machine 30 as described below.

A remote machine 30 operating according to the Program Neighborhood application collects application-related information from each of the remote machines 30 in a farm 38. The application-related information for each hosted application can be a variety of information including, for example, an address of the remote machine hosting that application, the application name, the users or groups of users who are authorized to use that application, and the minimum capabilities required of the local machine 10 before establishing a connection to run the application. For example, the application may stream video data, and therefore a required minimum capability may be that the local machine supports video data. Other examples are requirements that the local machine support audio data or have the capacity to process encrypted data. The application-related information can be stored in a database.

When a local machine 10 connects to the network 40, the user of the local machine 10 provides user credentials. User credentials may include the username of a user of the local machine 10, the password of the user, and the domain name for which the user is authorized. Alternatively, the user credentials may be obtained from smart cards, time-based tokens, social security numbers, user passwords, personal identification (PIN) numbers, digital certificates based on symmetric key or elliptic curve cryptography, biometric characteristics of the user, or any other means by which the identification of the user of the local machine 10 can be obtained and submitted for authentication. The remote machine 30 responding to the local machine 10 can authenticate the user based on the user credentials. The user credentials can be stored wherever the Program Neighborhood application is executing. For embodiments in which the local machine 10 executes the Program Neighborhood application, the user credentials may be stored at the local machine 10. For embodiments in which a remote machine 30 executes the Program Neighborhood, the user credentials can be stored at that remote machine 30.

From the user credentials and the application-related information, the remote machine 30 can also determine which application programs hosted by remote machines 30 are available for use by the user of the local machine 10. The remote machine 30 transmits information representing the available application programs to the local machine 10. This process eliminates the need for a user of the local machine 10 to establish application connections. Additionally, an administrator of the remote machine 30 may control access to applications among multiple users of a local machine 10.

In some embodiments, the user authentication performed by the remote machine 30 may suffice to authorize the use of each hosted application program presented to the local machine 10, although such applications may reside at another remote machine 30'. Accordingly, when the local machine 10 launches (i.e., initiates execution of) one of the hosted applications, additional input of user credentials by the local machine 10 may be unnecessary to authenticate use of that application. Thus, a single entry of the user credentials may serve to determine the available applications and to authorize the launching of such applications without an additional, manual log-on authentication process by the user.

Either a local machine 10 or remote machine 30 can launch the Program Neighborhood application. The results are displayed on the display screen 12, 22 of the local machine 10, 20. In a graphical windows-based implementation, the results can be displayed in a Program Neighborhood graphical window and each authorized application program can be represented by a graphical icon in that window.

In one embodiment, the Program Neighborhood application filters out application programs that the local machine 10 is unauthorized to execute and displays only authorized (i.e., available) programs. In other embodiments, the Program Neighborhood application can display authorized and unauthorized applications. When unauthorized applications are not filtered from the display, a notice can be provided indicating that such applications are unavailable. Alternatively, the Program Neighborhood application can report all applications hosted by the remote machines 30 to the user of a local machine 10, 20, without identifying which applications the local machine 10, 20 is authorized or unauthorized to execute. Authorization can be subsequently determined when the local machine 10, 20 attempts to run one of those applications.

The local machine 10 may request application enumeration from a remote machine 30. Application enumeration enables a user of the local machine 10 to view the names of every published application. In one embodiment, the user of the local machine 10 can view the application names regardless of whether the user has authorization to execute the application. In another embodiment, the user views only those application names that the user is authorized to execute.

Requests for application enumeration pass to the ICA browser subsystem 260, to the program neighborhood subsystem 270, or to a common application subsystem 524, depending upon the particular process being run by the local machine 10. For example, when the local machine 10 is running program neighborhood application, the requests for application enumeration are sent to the program neighborhood subsystem 270 on a remote machine 30. When the local machine 10 submits the enumeration request through a web page, the requests pass to the common access point subsystem 524. For these embodiments, the common application subsystem 524 serves as an initial access point for the program neighborhood subsystem 270, ICA browser subsystem 260, and common application subsystems when the local machine 10 wants to enumerate applications. In some embodiments, when the local machine 10 submits the enumeration request through a web page, an intermediate remote machine 30 hosting a web server receives the request and forwards the request to a remote machine 30'.

Upon receiving the enumeration requests, a common application subsystem 524 queries the persistent store 230 for a list of all applications. For requests received from the program neighborhood subsystem 270 and common access point 645 subsystems, this list of applications is filtered according to the credentials of the user of the local machine 10 (i.e., the user views only those applications for which the user is authorized).

The local machine 10 can also request remote machine enumeration. Remote machine enumeration enables a user of the local machine 10 to view a list of remote machines in the farm 38. In one embodiment, the list of remote machines can be filtered according to the type of remote machine, as determined by the specialized remote machine subsystem on that remote machine.

Requests for remote machine enumeration pass to the ICA browser subsystem 260 or to the common access point subsystem 645, depending upon the particular process being run by the local machine 120. For example, when the local machine 120 submits the remote machine enumeration request through a web page, the requests pass to the common access point subsystem 645. For these embodiments, the common remote machine subsystem 300 serves as an initial access point for the ICA browser subsystem 260 and common access point 645 subsystems. Upon receiving the remote machine enumeration requests, the common remote machine subsystem queries the persistent store 230 for a list of all remote machines. Optionally, the list of remote machines is filtered according to the remote machine type.

Figure 3A:
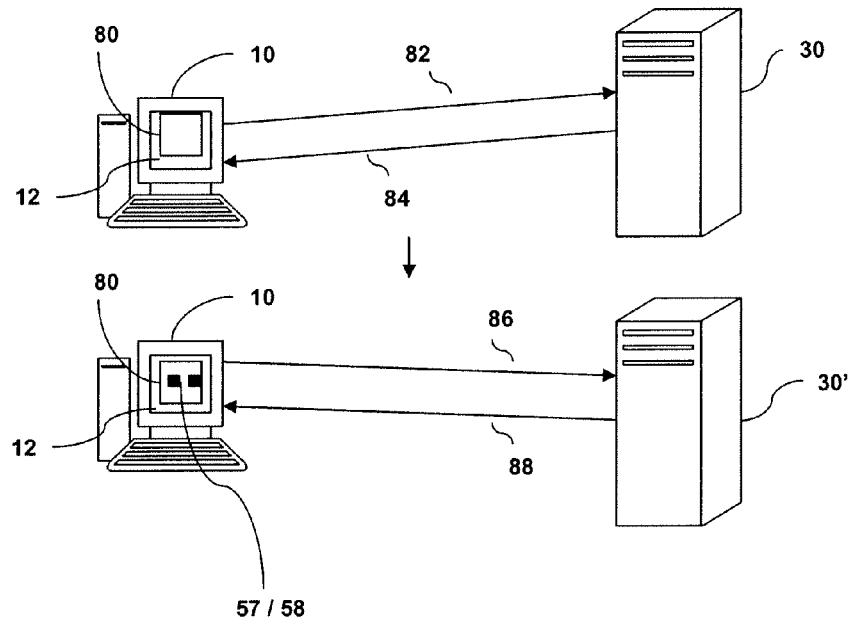
FIG. 3A is a block diagram depicting one embodiment of a local machine initiating execution of a Program Neighborhood application via the World Wide Web.

FIG. 3A is a block diagram depicting another embodiment of the process by which a local machine 10 initiates execution of the Program Neighborhood application, in this example via the World Wide Web. A local machine 10 executes a web browser application 80, such as NETSCAPE NAVIGATOR, manufactured by Netscape Communications, Inc. of Mountain View, Calif. or MICROSOFT INTERNET EXPLORER, manufactured by Microsoft Corporation of Redmond, Wash., or FIREFOX, manufactured by Mozilla Foundation of Mountain View, Calif., or OPERA, manufactured by Opera Software ASA, of Oslo, Norway, or SAFARI, manufactured by Apple Computer, Inc., of Cupertino, Calif.

The local machine 10, via the web browser 80, transmits a request 82 to access a Uniform Resource Locator (URL) address corresponding to an HTML page residing on remote machine 30. In some embodiments the first HTML page returned 84 to the local machine 10 by the remote machine 30 is an authentication page that seeks to identify the local machine 10.

Still referring to FIG. 3A, once the local machine 10 is authenticated by the remote machine 30, the remote machine 30 prepares and transmits to the local machine 10 an HTML page 88 that includes a Program Neighborhood window 58 in which appears graphical icons 57, 57' representing application programs to which the local machine 10 has access. A user of local machine 10 invokes execution of an application represented by icon 57 by clicking that icon 57.

In some embodiments, the remote machine 30 executes the Program Neighborhood application on behalf of a user of the local machine 10. In one of these embodiments, the remote machine 30 is an intermediate remote machine residing between the local machine 10 and a remote machine 30'.

Figure 3B:
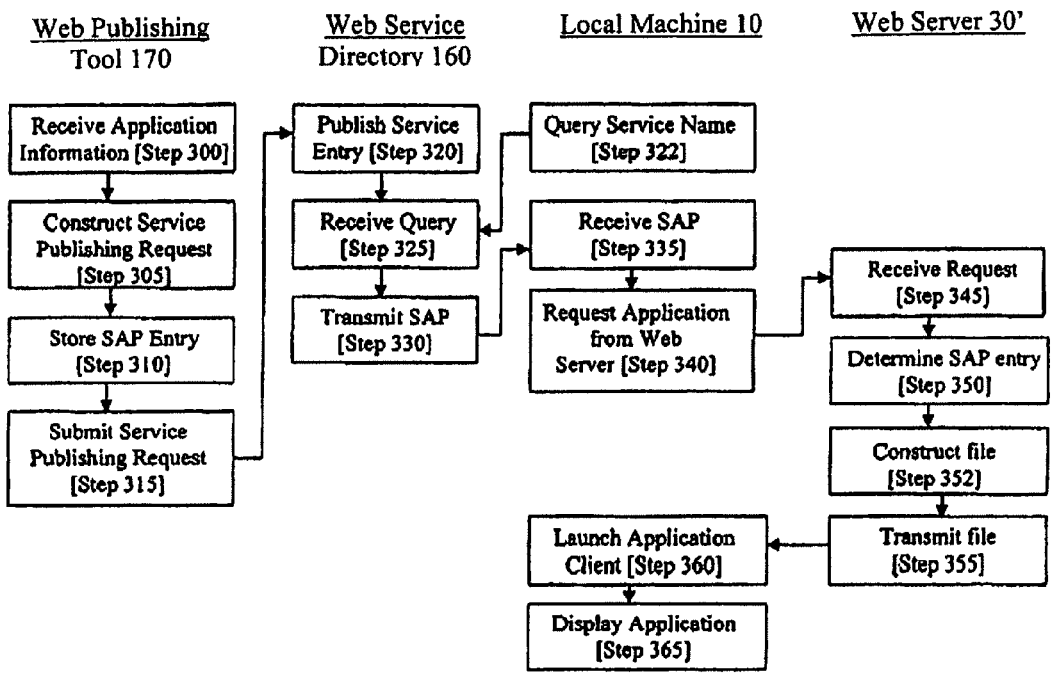
FIG. 3B is a flow diagram depicting one embodiment of the steps taken by a local machine to access an application program enumerated using a web service directory.

Referring to FIG. 3B, a flow diagram depicts one embodiment of the steps taken to provide a plurality of application programs available to the local machine via publishing of GUIs in a web service directory. The web publishing tool 170 receives a web service description and access information for an application (e.g., GUI application) for publishing (step 300). In one embodiment, the web service description includes the service information described above (e.g., the name of the business offering the web service, the service type, a textual description of the service, and a SAP). The access information may include, for example, a published application name, a Transmission Control Protocol (TCP) browsing server farm address, and a MetaFrame server IP address. In some embodiments, the access information specifies the address to use and a ticket to use to traverse network or security gateways or bridge devices.

The web publishing tool 170 then constructs a service-publishing request to request the publication of the web service (i.e., GUI application) (step 305). In one embodiment, the service-publishing request includes a SAP. In some embodiments, the SAP is a URL including the web address of the web server 30' and the publishing server plug-in 165. Further, the web address can be a Uniform Resource Identifier (URI), which is the generic term for the types of names and addresses that refer to objects on the web. A URL is one kind of URI. An example of the URI is the name of the web server 30' (e.g., "web-server") and the CGI script name (e.g., "dynamic-component") for the publishing server plug-in 165.

The web publishing tool 170 stores a SAP entry associated with the SAP in the persistent mass storage 225 (step 310). In some embodiments, the web publishing tool 170 also associates published application information (e.g., ICA-published-app-info) with the GUI application. In further embodiments, the web publishing tool 170 also includes a key in the service-publishing request to identify the SAP entry that the content server 30 stores in the persistent mass storage 225. For instance, the key can have the value of "123456677." An example of a SAP identifying the web server 30', the CGI script name of the publishing server plug-in 165, and the key described above is "http://web-server/dynamic-component/?app=123456677."

An example of the SAP entry associated with the SAP described above is "key=123456677, value=ICA-published-app-info." The key can be any length (e.g., 56 bit key, 128 bit key). In one embodiment, the key is a cryptographic random number. The key may also provides an access right to the key holder. Although illustrated with a key, any means can be used to provide a form of security to the SAP entry stored in the persistent mass storage 225.

The web publishing tool 170 provides the service-publishing request to the content server 30 for publishing in the web service directory 160 (step 315). Moreover, in one embodiment, the content server 30 transmits the key of the SAP to the local machine 10 requesting the particular web service for subsequent use in locating the SAP entry. In one embodiment, the publishing of the service-publishing request enables users of the local machine 10 to access the service. In one embodiment, GUI applications are published on the web service directory 160 using NFUSE developed by Citrix Systems, Inc. of Fort Lauderdale, Fla. In some embodiments, a publisher of a GUI application customizes the publication of the GUI application on the web service directory 160 using Application Launching And Embedding (ALE), also developed by Citrix Systems, Inc. ALE enables the launching of a GUI application from or the embedding of the application into an HTML page.

The local machine 10 then queries a service name from the web service directory 160 (step 320). The content server 30 receives the query from the local machine 10 (step 325) and finds the requested service name in the web service directory 160. In another embodiment, the user of the local machine 10 navigates the web service directory 160 until locating a particular service name that the user of the local machine 10 was attempting to find. Although illustrated with the local machine 10, any web service directory client (e.g., UDDI client or LDAP browser) can query or navigate the web service directory 160 to discover published web services.

Upon location of the SAP associated with the received query, the content server 30 transmits the SAP to the local machine 10 (step 330). The local machine 10 receives the SAP (step 335) and determines the address of the publishing server plug-in 165 from the SAP. The local machine 10 subsequently transmits a request for the GUI application to the web server 30' (step 340). In some embodiments, the request from the local machine 10 is an HTTP request transmitted from the web browser 11 to the web server 30'. In other embodiments, an application (e.g., general directory browser or HTML UI) executing on the local machine 10 receives the SAP from the content server 30 and provides the SAP as an argument to the web browser 11. The web browser 1 may then automatically transmit an HTTP request (for the GUI application) to the web server 30'. Following along the lines of the previous examples, a particular example of the application request to the web server 30' is http://web-server/dynamic-component/?app=123456677).

The web server 30', and, more particularly, the publishing server plug-in 165, receives the application request associated the SAP (step 345) and determines the SAP entry associated with the request (step 350). In one embodiment, the publishing server plug-in 165 receives the request from the local machine 10 and retrieves the published application information associated with the request that had been stored (as part of the SAP entry) in the persistent mass storage 225. In some embodiments, the publishing server plug-in 165 uses the SAP (or part of the SAP) that the local machine 10 received from the content server 30 as the key to access the proper service entry (e.g., the published application information) stored in the persistent mass storage 225.

The publishing server plug-in 165 then constructs a file or document having the published application information (e.g., HTTP address of the application server 30") (step 352) and transmits this document to the local machine 10 (step 355). The publishing server plug-in 165 constructs the file so that the file has a format compatible with the application client 13. In one embodiment, the document is a Multipurpose Internet Mail Extensions (MIME) or a secure MIME (S/MIME) document. In another embodiment, the document is an HTML document containing an ICA web client embedded object HTML tag. In still another embodiment, the document is an HTML document containing an application streaming client embedded object HTML tag.

The web browser 11 subsequently receives the document and attempts to open the document. In one embodiment, if the application client 13 is not installed on the local machine 10, the local machine 10 communicates with the application server 30" to download and install the application client 13. Upon installation of the application client 13 or, alternatively, if the application client 13 has already been installed on the local machine 10, the local machine 10 launches the application client 13 to view the document received from the web server 30' (step 360).

Once the application client 13 is installed and executing on the local machine 10, the application server 30" then executes the application and displays the application on the application client 13 (step 365). In an alternative embodiment, the application server 30" transmits a plurality of application files comprising the application to the application client 13 for execution on the local machine 10, as described in further detail below in connection with FIG. 7. In another embodiment, the local machine 10 views the document (even before launching the application client 13) and uses the information in the document to obtain the GUI application from the application server 30". In this embodiment, the display of the GUI application includes the installation and execution of the application client 30". Moreover, the viewing of the document may be transparent to the user of the local machine 10. For example, the local machine 10 may receive the document from the web server 30' and interpret the document before automatically requesting the GUI application from the application server 30".

Thus, the application client 13 provides service-based access to published applications, desktops, desktop documents, and any other application that is supported by the application client 13. Examples of applications that the application client 13 can provide access to include, but are not limited to, the WINDOWS desktops, WINDOWS documents such as MICROSOFT EXCEL, WORD, and POWER-POINT, all of which were developed by Microsoft Corporation of Redmond, Wash., Unix desktops such as SUN SOLARIS developed by Sun Microsystems of Palo Alto, Calif., and GNU/Linux distributed by Red Hat, Inc. of Durham, N.C., among others.

Figure 4A:
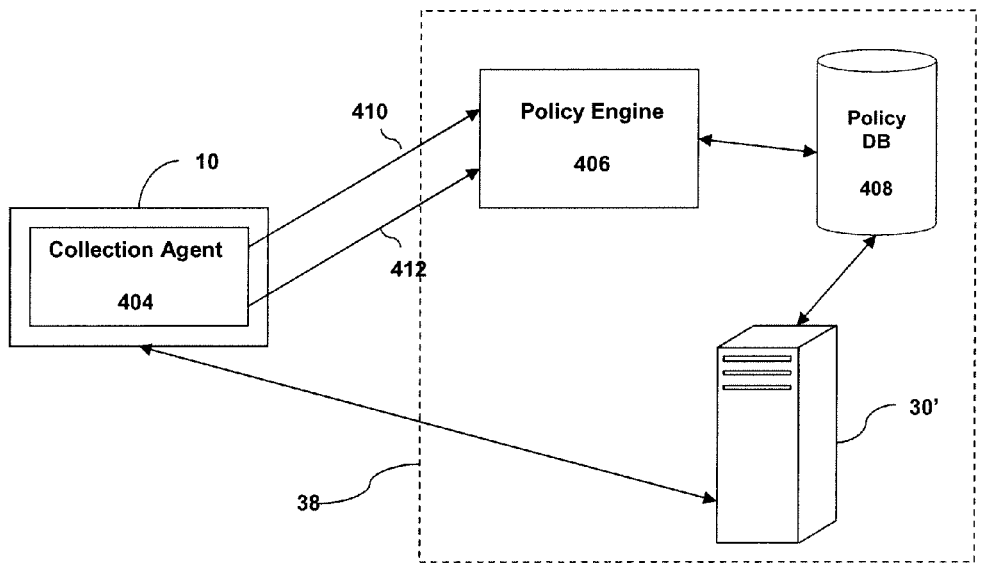
FIG. 4A is a block diagram of an embodiment of a network providing policy-based access to application programs for a local machine.

In some embodiments, an enumeration of a plurality of application programs available to the local machine 10 is provided (step 204) responsive to a determination by a policy engine regarding whether and how a local machine may access an application. The policy engine may collect information about the local machine prior to making the determination. Referring now to FIG. 4A, one embodiment of a computer network constructed in accordance with the invention is depicted, which includes a local machine 10, a collection agent 404, a policy engine 406, a policy database 408, a farm 38, and an application server 30'. In one embodiment, the policy engine 406 is a remote machine 30. In another embodiment, the application server 30' is a remote machine 30'. Although only one local machine 10, collection agent 404, policy engine 406, farm 38, and application server 30' are depicted in the embodiment shown in FIG. 4A, it should be understood that the system may provide multiple ones of any or each of those components.

In brief overview, when the local machine 10 transmits a request 410 to the policy engine 406 for access to an application, the collection agent 404 communicates with local machine 10, retrieving information about the local machine 10, and transmits the local machine information 412 to the policy engine 406. The policy engine 406 makes an access control decision by applying a policy from the policy database 408 to the received information 412.

In more detail, the local machine 10 transmits a request 410 for a resource to the policy engine 406. In one embodiment, the policy engine 406 resides on an application server 30'. In another embodiment, the policy engine 406 is a remote machine 30. In still another embodiment, an application server 30' receives the request 410 from the local machine 10 and transmits the request 410 to the policy engine 406. In yet another embodiment, the local machine transmits a request 410 for a resource to a remote machine 30''', which transmits the request 410 to the policy engine 406.

In some embodiments, the local machine 10 transmits the request 410 over a network connection. The network can be a local area network (LAN), a metropolitan area network (MAN), or a wide area network (WAN) such as the Internet. The local machine 10 and the policy engine 406 may connect to a network through a variety of connections including standard telephone lines, LAN or WAN links (e.g., T1, T3, 56 kb, X.25), broadband connections (ISDN, Frame Relay, ATM), and wireless connections. Connections between the local machine 10 and the policy engine 10 may use a variety of data-link layer communication protocols (e.g., TCP/IP, IPX, SPX, NetBIOS, NetBEUI, SMB, Ethernet, ARCNET, Fiber Distributed Data Interface (FDDI), RS232, IEEE 802.11, IEEE 802.11a, IEE 802.11b, IEEE 802.11 g and direct asynchronous connections). The connection may also be a communications link 150 as described above.

Upon receiving the request, the policy engine 406 initiates information gathering by the collection agent 404. The collection agent 404 gathers information regarding the local machine 10 and transmits the information 412 to the policy engine 406.

In some embodiments, the collection agent 404 gathers and transmits the information 412 over a network connection. In some embodiments, the collection agent 404 comprises bytecode, such as an application written in the bytecode programming language JAVA. In some embodiments, the collection agent 404 comprises at least one script. In those embodiments, the collection agent 404 gathers information by running at least one script on the local machine 10. In some embodiments, the collection agent comprises an Active X control on the local machine 10. An Active X control is a specialized Component Object Model (COM) object that implements a set of interfaces that enable it to look and act like a control.

In one embodiment, the policy engine 406 transmits the collection agent 404 to the local machine 10. In one embodiment, the policy engine 406 requires a second execution of the collection agent 404 after the collection agent 404 has transmitted information 412 to the policy engine 406. In this embodiment, the policy engine 406 may have insufficient information 412 to determine whether the local machine 10 satisfies a particular condition. In other embodiments, the policy engine 406 requires a plurality of executions of the collection agent 404 in response to received information 412.

In some embodiments, the policy engine 406 transmits instructions to the collection agent 404 determining the type of information the collection agent 404 gathers. In those embodiments, a system administrator may configure the instructions transmitted to the collection agent 404 from the policy engine 406. This provides greater control over the type of information collected. This also expands the types of access control decisions that the policy engine 406 can make, due to the greater control over the type of information collected. The collection agent 404 gathers information 412 including, without limitation, machine ID of the local machine 10, operating system type, existence of a patch to an operating system, MAC addresses of installed network cards, a digital watermark on the client device, membership in an Active Directory, existence of a virus scanner, existence of a personal firewall, an HTTP header, browser type, device type, network connection information such as internet protocol address or range of addresses, machine ID of the remote machine 30, date or time of access request including adjustments for varying time zones, and authorization credentials.

In some embodiments, the device type is a personal digital assistant. In other embodiments, the device type is a cellular telephone. In other embodiments, the device type is a laptop computer. In other embodiments, the device type is a desktop computer. In other embodiments, the device type is an Internet kiosk.

In some embodiments, the digital watermark includes data embedding. In some embodiments, the watermark comprises a pattern of data inserted into a file to provide source information about the file. In other embodiments, the watermark comprises data hashing files to provide tamper detection. In other embodiments, the watermark provides copyright information about the file.

In some embodiments, the network connection information pertains to bandwidth capabilities. In other embodiments, the network connection information pertains to Internet Protocol address. In still other embodiments, the network connection information consists of an Internet Protocol address. In one embodiment, the network connection information comprises a network zone identifying the logon agent to which the local machine provided authentication credentials.

In some embodiments, the authorization credentials include a number of types of authentication information, including without limitation, user names, client names, client addresses, passwords, PINs, voice samples, one-time passcodes, biometric data, digital certificates, tickets, etc. and combinations thereof. After receiving the gathered information 412, the policy engine 406 makes an access control decision based on the received information 412.

Figure 4B:
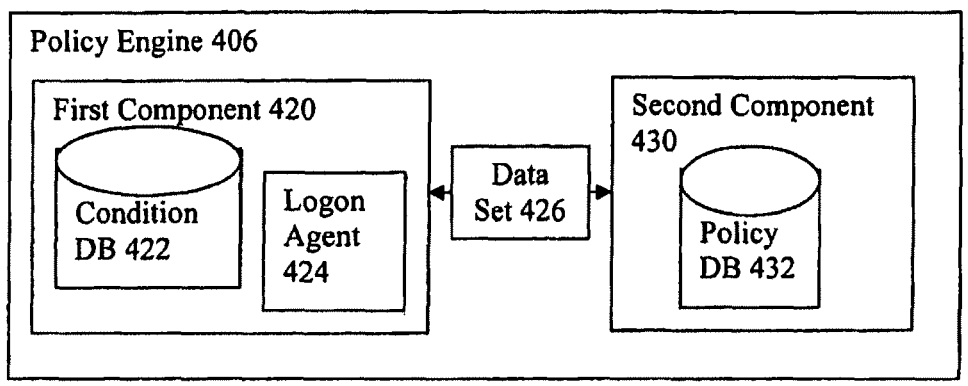
FIG. 4B is a block diagram depicting a more detailed embodiment of a policy engine.

Referring now to FIG. 4B, a block diagram depicts one embodiment of a policy engine 406, including a first component 420 comprising a condition database 422 and a logon agent 424, and including a second component 430 comprising a policy database 432. The first component 420 applies a condition from the condition database 422 to information received about local machine 10 and determines whether the received information satisfies the condition.

In some embodiments, a condition may require that the local machine 10 execute a particular operating system to satisfy the condition. In some embodiments, a condition may require that the local machine 10 execute a particular operating system patch to satisfy the condition. In still other embodiments, a condition may require that the local machine 10 provide a MAC address for each installed network card to satisfy the condition. In some embodiments, a condition may require that the local machine 10 indicate membership in a particular Active Directory to satisfy the condition. In another embodiment, a condition may require that the local machine 10 execute a virus scanner to satisfy the condition. In other embodiments, a condition may require that the local machine 10 execute a personal firewall to satisfy the condition. In some embodiments, a condition may require that the local machine 10 comprise a particular device type to satisfy the condition. In other embodiments, a condition may require that the local machine 10 establish a particular type of network connection to satisfy the condition.

If the received information satisfies a condition, the first component 420 stores an identifier for that condition in a data set 426. In one embodiment, the received information satisfies a condition if the information makes the condition true. For example, a condition may require that a particular operating system be installed. If the local machine 10 has that operating system, the condition is true and satisfied. In another embodiment, the received information satisfies a condition if the information makes the condition false. For example, a condition may address whether spyware exists on the local machine 10. If the local machine 10 does not contain spyware, the condition is false and satisfied.

In some embodiments, the logon agent 424 resides outside of the policy engine 406. In other embodiments, the logon agent 424 resides on the policy engine 406. In one embodiment, the first component 420 includes a logon agent 424, which initiates the information gathering about local machine 10. In some embodiments, the logon agent 424 further comprises a data store. In these embodiments, the data store includes the conditions for which the collection agent may gather information. This data store is distinct from the condition database 422.

In some embodiments, the logon agent 424 initiates information gathering by executing the collection agent 404. In other embodiments, the logon agent 424 initiates information gathering by transmitting the collection agent 404 to the local machine 10 for execution on the local machine 10. In still other embodiments, the logon agent 424 initiates additional information gathering after receiving information 412. In one embodiment, the logon agent 424 also receives the information 412. In this embodiment, the logon agent 424 generates the data set 426 based upon the received information 412. In some embodiments, the logon agent 424 generates the data set 426 by applying a condition from the database 422 to the information received from the collection agent 404.

In another embodiment, the first component 420 includes a plurality of logon agents 424. In this embodiment, at least one of the plurality of logon agents 424 resides on each network domain from which a local machine 10 may transmit a resource request. In this embodiment, the local machine 10 transmits the resource request to a particular logon agent 424. In some embodiments, the logon agent 424 transmits to the policy engine 406 the network domain from which the local machine 10 accessed the logon agent 424. In one embodiment, the network domain from which the local machine 10 accesses a logon agent 424 is referred to as the network zone of the local machine 10.

The condition database 422 stores the conditions that the first component 420 applies to received information. The policy database 432 stores the policies that the second component 430 applies to the received data set 426. In some embodiments, the condition database 422 and the policy database 432 store data in an ODBC-compliant database. For example, the condition database 422 and the policy database 432 may be provided as an ORACLE database, manufactured by Oracle Corporation of Redwood Shores, Calif. In other embodiments, the condition database 422 and the policy database 432 can be a Microsoft ACCESS database or a Microsoft SQL server database, manufactured by Microsoft Corporation of Redmond, Wash.

After the first component 420 applies the received information to each condition in the condition database 422, the first component transmits the data set 426 to second component 430. In one embodiment, the first component 420 transmits only the data set 426 to the second component 430. Therefore, in this embodiment, the second component 430 does not receive information 412, only identifiers for satisfied conditions. The second component 430 receives the data set 426 and makes an access control decision by applying a policy from the policy database 432 based upon the conditions identified within data set 426.

In one embodiment, policy database 432 stores the policies applied to the received information 412. In one embodiment, the policies stored in the policy database 432 are specified at least in part by the system administrator. In another embodiment, a user specifies at least some of the policies stored in the policy database 432. The user-specified policy or policies are stored as preferences. The policy database 432 can be stored in volatile or non-volatile memory or, for example, distributed through multiple servers.

In one embodiment, a policy allows access to a resource only if one or more conditions are satisfied. In another embodiment, a policy allows access to a resource but prohibits transmission of the resource to the local machine 10. Another policy might make connection contingent on the local machine 10 that requests access being within a secure network. In some embodiments, the resource is an application program and the local machine 10 has requested execution of the application program. In one of these embodiments, a policy may allow execution of the application program on the local machine 10. In another of these embodiments, a policy may enable the local machine 10 to receive a stream of files comprising the application program. In this embodiment, the stream of files may be stored and executed in an isolation environment. In still another of these embodiments, a policy may allow only execution of the application program on a remote machine, such as an application server, and require the remote machine to transmit application-output data to the local machine 10.

Figure 4C:
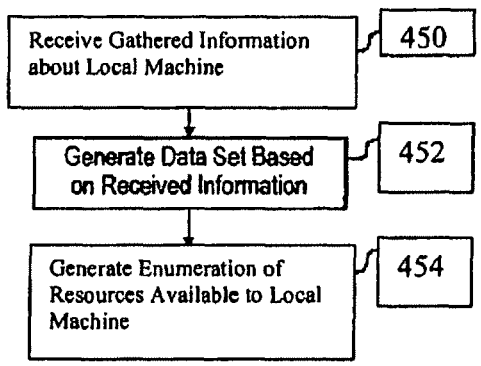
FIG. 4C a flow diagram depicting one embodiment of the steps taken by a policy engine to make an access control decision based upon information received about a local machine.

Referring now to FIG. 4C, a flow diagram depicts one embodiment of the steps taken by the policy engine 406 to make an access control decision based upon information received about a local machine 10. Upon receiving gathered information about the local machine 10 (Step 450), the policy engine 406 generates a data set based upon the information (Step 452). The data set 426 contains identifiers for each condition satisfied by the received information 412. The policy engine 406 applies a policy to each identified condition within the data set 426. That application yields an enumeration of resources which the local machine 10 may access (Step 454). The policy engine 406 then presents that enumeration to the local machine 10. In some embodiments, the policy engine 406 creates a Hypertext Markup Language (HTML) document used to present the enumeration to the local machine.

Figure 4D:
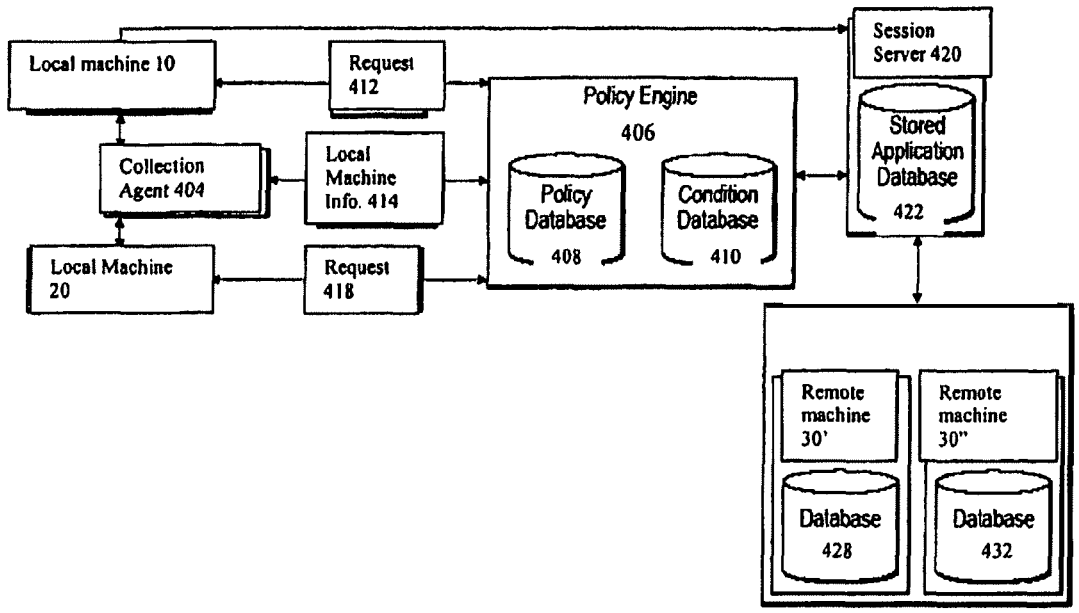
FIG. 4D is a block diagram depicting an embodiment of a computer network in which authorized remote access to a plurality of application sessions is provided.

Referring to FIG. 4D, one embodiment of a network constructed in accordance with the invention is depicted, which includes a local machine 10, a collection agent 404, a policy engine 406, a policy database 408, a condition database 410, a local machine 20, a session server 420, a stored application database 422, a remote machine 30', a first database 428, a remote machine 30", and a second database 432. In brief overview, when the local machine 10 transmits to the access control server 406 a request 412 for access to an application program, the collection agent 404 communicates with local machine 10, retrieves information about local machine 10, and transmits local machine information 414 to the policy engine 406. The policy engine 406 makes an access control decision, as discussed above in FIG. 4A and FIG. 4B. The local machine 10 receives an enumeration of available applications associated with the local machine 10.

In some embodiments, the session server 420 establishes a connection between the local machine 10 and a plurality of application sessions associated with the local machine 10. In other embodiments, the policy engine 406 determines that the local machine 10 has authorization to retrieve a plurality of application files comprising the application and to execute the application program locally. In one of these embodiments, the remote machine 30' stores application session data and a plurality of application files comprising the application program. In another of these embodiments, the local machine 10 establishes an application streaming session with a remote machine 30' storing the application session data and the plurality of application files comprising the application program.

Figure 4E:
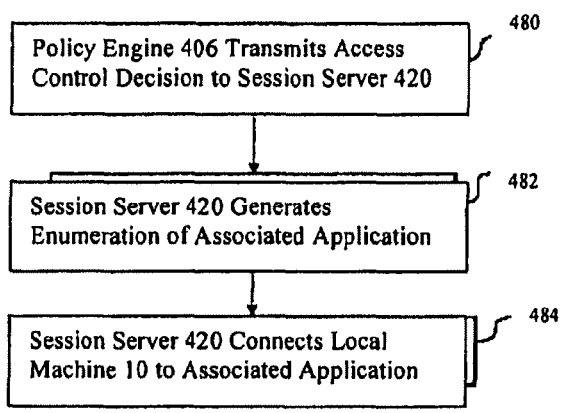
FIG. 4E is a flow diagram depicting one embodiment of the steps taken by a session server to connect a local machine with its associated application sessions.

Referring now to FIG. 4E, a flow diagram depicts one embodiment of the steps taken by the session server 420 to provide access for the local machine 10 to its associated application sessions. The session server 420 receives information about the local machine 10 from the policy engine 406 containing access control decision the policy engine 406 made (step 480). The session server 420 generates an enumeration of associated applications (step 482). The session server 420 may connect the local machine 10 to an associated application (step 484). In one embodiment, the information also includes the local machine information 414. In another embodiment, the information includes authorization to execute the application program locally.

The session server 420 generates an enumeration of associated applications (step 482). In some embodiments, the policy engine 406 identifies a plurality of application sessions already associated with the local machine 10. In other embodiments, the session server 420 identifies stored application sessions associated with the local machine 10. In some of these embodiments, the session server 420 automatically identifies the stored application sessions upon receiving the information from the policy engine 406. In one embodiment, the stored application database 422 resides on the session server 420. In another embodiment, the stored application database 422 resides on the policy engine 406.

The stored application database 422 contains data associated with a plurality of remote machines in the farm 38 executing application sessions or providing access to application session data and application files comprising application programs. In some embodiments, identifying the application sessions associated with the local machine 10 requires consulting stored data associated with one or more remote machines. In some of these embodiments, the session store 420 consults the stored data associated with one or more remote machines. In others of these embodiments, the policy engine 406 consults the stored data associated with one or more remote machines. In some embodiments, a first application session runs on a remote machine 30' and a second application session runs on a remote machine 30". In other embodiments, all application sessions run on a single remote machine 30 within the farm 38.

The session server 420 includes information related to application sessions initiated by users. The session server can be stored in volatile or non-volatile memory or, for example, distributed through multiple servers. Table 1 shows the data included in a portion of an illustrative session server 420:

TABLE 1

| | Application Session | | |
| --- | --- | --- | --- |
| | App Session 1 | App Session 2 | App Session 3 |
| User ID | User 1 | User 2 | User 1 |
| Client ID | First Client | | First Client |
| Client Address | 172.16.0.50 | | 172.16.0.50 |
| Status | Active | Disconnected | Active |
| Applications | Word Processor | Data Base | Spreadsheet |
| Process Number | 1 | 3 | 2 |
| Server | Server A | Server A | Server B |
| Server Address | 172.16.2.55 | 172.16.2.55 | 172.16.2.56 |

The illustrative session server 420 in Table 1 includes data associating each application session with the user that initiated the application session, an identification of the client computer 10 or 20, if any, from which the user is currently connected to the remote machine 30', and the IP address of that client computer 10 or 20. The illustrative session server 420 also includes the status of each application session. An application session status can be, for example, "active" (meaning a user is connected to the application session), or "disconnected" (meaning a user is not connected to the application session). In an alternative embodiment, an application session status can also be set to "executing-disconnected" (meaning the user has disconnected from the application session, but the applications in the application session are still executing), or "stalled-disconnected" (meaning the user is disconnected and the applications in the application session are not executing, but their operational state immediately prior to the disconnection has been stored). The session server 420 further stores information indicating the applications 116 that are executing within each application session and data indicating each application's process on the server. In embodiments in which the remote machine 30' is part of the farm 38, the session server 420 is at least a part of the dynamic store, and also includes the data in the last two rows of Table 1 that indicate on which remote machine 30 in the farm 38 each application is/was executing, and the IP address of that remote machine 30. In alternative embodiments, the session server 420 includes a status indicator for each application in each application session.

For example, in the example of Table 1, three application sessions exist, App Session 1, App Session 2, and App Session 3. App Session 1 is associated with User 1, who is currently using terminal 1. Terminal one's IP address is 152.16.2.50. The status of App Session 1 is active, and in App Session 1, a word processing program, is being executed. The word processing program is executing on Server A as process number 1. Server A's IP address is 152.16.2.55. App Session 2 in Table 1 is an example of a disconnected application session 118. App Session 2 is associated with User 2, but App Session 2 is not connected to a local machine 10 or 20. App Session 2 includes a database program that is executing on Server A, at IP address 152.16.2.55 as process number 3. App Session 3 is an example of how a user can interact with application sessions operating on different remote machines 30. App Session 3 is associated with User 1, as is App Session 1. App Session 3 includes a spreadsheet program that is executing on Server B at IP address 152.16.2.56 as process number 2, whereas the application session included in App Session 1 is executing on Server A.

In another example, a user may access a first application program through an application session executing on a remote machine 30', such as Server A, while communicating across an application streaming session with a second remote machine 30", such as Server B, to retrieve a second application program from the second remote machine 30" for local execution. The user of the local machine 10 may have acquired authorization to execute the second application program locally while failing to satisfy the execution pre-requisites of the first application program.

In one embodiment, the session server 420 is configured to receive a disconnect request to disconnect the application sessions associated with the local machine 10 and disconnects the application sessions in response to the request. The session server 420 continues to execute an application session after disconnecting the local machine 10 from the application session. In this embodiment, the session server 420 accesses the stored application database 422 and updates a data record associated with each disconnected application session so that the record indicates that the application session associated with the local machine 10 is disconnected.

After receiving authentication information associated with a local machine connecting to the network, the session server 420 consults the stored applications database 422 to identify any active application sessions that are associated with a user of the local machine, but that are connected to a different local machine, such as the local machine 10 if the authentication information is associated with local machine 20, for example. In one embodiment, if the session server 420 identifies any such active application sessions, the session server 420 automatically disconnects the application session(s) from the local machine 10 and connects the application session(s) to the current local machine 20. In some embodiments, the received authentication information will restrict the application sessions to which the local machine 10 may reconnect. In other embodiments, the received authentication information authorizes execution of an application program on the local machine 20, where the authorization may have been denied to local machine 10. In one of these embodiments, the session server 420 may provide the local machine access information for retrieving the application program for local execution.

A request is received to execute an enumerated application (step 206). In one embodiment, a user of the local machine 10 selects an application for execution from a received enumeration of available applications. In another embodiment, the user selects an application for execution independent of the received enumeration. In some embodiments, the user selects an application for execution by selecting a graphical representation of the application presented on the local machine 10 by a client agent. In other embodiments, the user selects an application for execution by selecting a graphical representation of the application presented to the user on a web server or other remote machine 30'''.

In still other embodiments, the user requests access a file. In one of these embodiments, execution of an application is required to provide the user with access to the file. In another of these embodiments, the application is automatically selected for execution upon selection of the file for access. In still another of these embodiments, prior to the request for access to the file, the application is associated with a type of file, enabling automatic selection of the application upon identification of a type of file associated with the requested file.

In one embodiment, the enumerated application comprises a plurality of application files. In some embodiments, the plurality of application files reside on the remote machine 30'. In other embodiments, the plurality of application files reside on a separate file server or remote machine 30". In still other embodiments, the plurality of application files may be transmitted to a local machine 10. In yet other embodiments, a file in the plurality of application files may be executed prior to transmission of a second file in the plurality of application files to the local machine 10.

In some embodiments, the remote machine 30 retrieves information about the enumerated application from a remote machine 30'. In one of these embodiments, the remote machine 30 receives an identification of a remote machine 30" hosting a plurality of application files. In another of these embodiments, the remote machine 30 receives identification of a location of a plurality of application files, the identification conforming to a Universal Naming Convention (UNC). In still another of these embodiments, the identification includes a network location and a socket for an application streaming protocol.

In one embodiment, the remote machine 30 retrieves a file containing information about the enumerated application. The file may include an identification of a location of a server hosting the enumerated application. The file may include an identification of a plurality of versions of the enumerated application. The file may include an enumeration of a plurality of application files comprising the enumerated application. The file may include an identification of a compressed file comprising a plurality of applications files comprising the enumerated application. The file may include an identification of pre-requisites to be satisfied by a machine executing the enumerated application. The file may include an enumeration of data files associated with the enumerated application. The file may include an enumeration of scripts to be executed on a machine executing the enumerated application. The file may include an enumeration of registry data associated with the enumerated application. The file may include an enumeration of rules for use in an embodiment where the enumerated application executes within an isolation environment. In one embodiment, the file may be referred to as a "manifest" file. The information that the file may contain is described in further detail in connection with FIG. 21 below.

In some embodiments, the remote machine 30 applies a policy to an identified characteristic of the local machine 10. In one of these embodiments, the remote machine 30 identifies a version of the enumerated application for execution responsive to the identified characteristic. In another of these embodiments, the remote machine 30 makes a determination to execute a version of the enumerated application compatible with a characteristic of the local machine 10. In still another of these embodiments, the remote machine 30 makes a determination to execute a version of the enumerated application compatible with an operating system executing on the local machine 10. In yet another of these embodiments, the remote machine 30 makes a determination to execute a version of the enumerated application compatible with a revision level of an operating system on the local machine 10. In one of these embodiments, the remote machine 30 makes a determination to execute a version of the enumerated application compatible with a language specified by an operating system on the local machine 10.

One of a predetermined number of methods for executing the enumerated application is selected, responsive to a policy, the predetermined number of methods including a method for application streaming of the enumerated application (step 208). In one embodiment, the selection is made responsive to an application of a policy to the received credentials associated with the local machine 10. In some embodiments, the selection is made by a policy engine such as the policy engine 406 described above in FIG. 4A, FIG. 4B and FIG. 4C. In other embodiments, the remote machine 30 receiving the credentials and the request to execute the enumerated application further comprises such a policy engine 406.

In one embodiment, the predetermined number of methods includes a method for executing the enumerated application on a remote machine 30'. In another embodiment, the predetermined number of methods includes a method for executing the enumerated application on the local machine 10. In still another embodiment, the predetermined number of methods includes a method for executing the enumerated application on a second remote machine 30'.

In some embodiments, the predetermined number of methods includes a method for providing the enumerated application to the local machine 10 across an application streaming session. In one of these embodiments, the local machine 10 comprises a streaming service agent capable of initiating a connection with a remote machine 30' and receiving from the remote machine 30' a stream of transmitted data packets.

The stream of data packets may include application files comprising the enumerated application. In some embodiments, application files include data files associated with an application program. In other embodiments, application files include executable files required for execution of the application program. In still other embodiments, the application files include metadata including information about the files, such as location, compatibility requirements, configuration data, registry data, identification of execution scripts rules for use in isolation environments, or authorization requirements.

In some embodiments, the streamed application executes prior to the transmission of each application file in a plurality of application files comprising the streamed application. In one of these embodiments, execution of the streamed application begins upon receipt by a local machine 10 of one application file in the plurality of applications. In another of these embodiments, execution of the streamed application begins upon receipt by a local machine 10 of an executable application file in the plurality of application files. In still another of these embodiments, the local machine 10 executes a first received application file in a plurality of application files and the first received application file requests access to a second application file in the plurality of application files.

In one embodiment, the streamed application executes on the local machine 10 without permanently residing on the local machine 10. In this embodiment, the streamed application may execute on the local machine 10 and be removed from the local machine 10 upon termination of the streamed application. In another embodiment, the streamed application executes on the local machine 10 after a pre-deployed copy of each application file is stored on the local machine 10. In still another embodiment, the streamed application executes on the local machine 10 after a copy of each application file is stored in an isolation environment on the local machine. In yet another embodiment, the streamed application executes on the local machine 10 after a copy of each application file is stored in a cache on the local machine 10.

In one embodiment, the method for streaming the application to the local machine 10 is selected from the predetermined number of methods responsive to a determination that the local machine 10 may receive the streamed application files. In another embodiment, the method for streaming the application to the local machine 10 is selected from the predetermined number of methods responsive to a determination that the local machine 10 has authority to execute the streamed application files locally.

In other embodiments, the predetermined number of methods includes a method for providing application-output data to the local machine 10, the application-output data generated from an execution of the enumerated application on a remote machine 30. In one of these embodiments, the remote machine 30 is the remote machine 30 receiving the request for execution of the enumerated application. In another of these embodiments, the remote machine 30 is a second remote machine 30', such as a file server or an application server. In some embodiments, the enumerated application resides on the remote machine 30' executing the enumerated application. In other embodiments, the remote machine 30' executing the enumerated application first receives the enumerated application from a second remote machine 30' across an application streaming session. In one of these embodiments, the remote machine 30' comprises a streaming service agent capable of initiating a connection with a second remote machine 30' and receiving from the second remote machine 30' a stream of transmitted data. In another of these embodiments, the second remote machine 30' may be identified using a load balancing technique. In still another of these embodiments, the second remote machine 30' may be identified based upon proximity to the remote machine 30'. These embodiments will be described in greater detail in connection with FIG. 9 below.

In some embodiments, the remote machine 30 selects from the predetermined number of methods for executing the enumerated application, a method for streaming the enumerated application to the remote machine 30, executing the enumerated application on the remote machine 30, and providing to the local machine 10 application-output data generated by the execution of the enumerated application. In one of these embodiments, the remote machine 30 selects the method responsive to an evaluation of the local machine 10. In another of these embodiments the determination is made responsive to an application of a policy to the evaluation of the local machine 10. In still another of these embodiments, the determination is made responsive to an evaluation of the received credentials. In one embodiment, the remote machine 30 receives a plurality of application files comprising the enumerated application. In another embodiment, the remote machine 30 provides the application-output data via a presentation level protocol, such as an ICA presentation level protocol or a Remote Desktop Windows presentation level protocol or an X-Windows presentation level protocol.

In some embodiments, the remote machine 30 also provides access information associated with the enumerated application, the access information generated responsive to the selected method. In one of these embodiments, the access information provides an indication to the local machine 10 of the selected method for execution of the enumerated application program. In another of these embodiments, the access information includes an identification of a location of the enumerated application, the identification conforming to a Universal Naming Convention (UNC). In still another of these embodiments, the access information includes an identification of a session management server.

In some embodiments, the access information includes a launch ticket comprising authentication information. In one of these embodiments, the local machine 10 may use the launch ticket to authenticate the access information received from the remote machine 30. In another of these embodiments, the local machine 10 may use the launch ticket to authenticate itself to a second remote machine 30 hosting the enumerated application. In still another of these embodiments, the remote machine 30 includes the launch ticket in the access information responsive to a request from the local machine 10 for the launch ticket.

Figure 5:
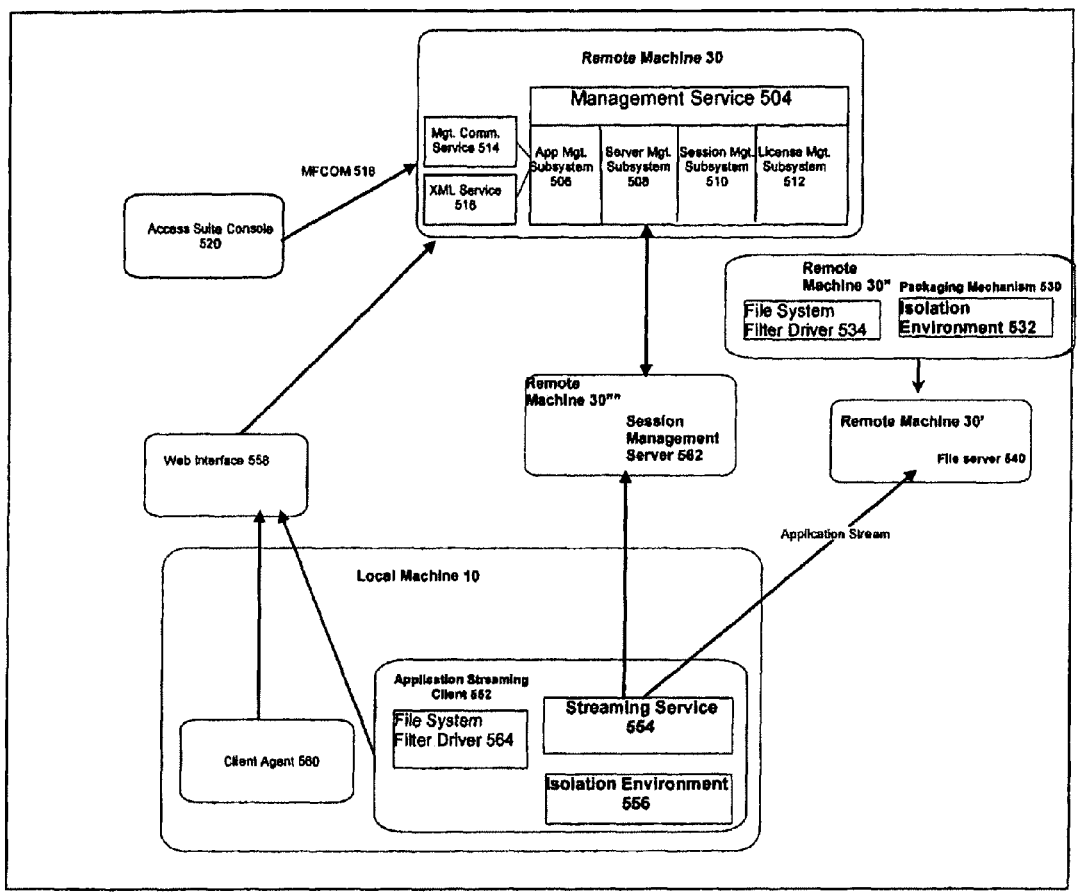
FIG. 5 is a flow diagram depicting one embodiment of the steps taken by a session server to connect a client node with its associated application sessions.

Referring now to FIG. 5, a block diagram depicts one embodiment of the present disclosure in which a local machine 10 requests execution of an application program and a remote machine 30 selects a method of executing the application program. In one embodiment, the remote machine 30 receives credentials from the local machine 10. In another embodiment, the remote machine 30 receives a request for an enumeration of available applications from the local machine 10.

In some embodiments, multiple, redundant, remote machines 30, 30', 30'', 30''', and 30'''' are provided. In one of these embodiments, there may be, for example, multiple file servers, multiple session management servers, multiple staging machines, multiple web interfaces, or multiple access suite consoles. In another of these embodiments, if a remote machine fails, a redundant remote machine 30 is selected to provide the functionality of the failed machine. In other embodiments, although the remote machines 30, 30', 30'', 30''', and 30'''', and the web interface 558 and access suite console 520 are described as separate remote machines 30 having the separate functionalities of a management server, a session management server, a staging machine, a file server, a web server, and an access suite console, a single remote machine 30 may be provided having the functionality of all of these machines. In still other embodiments, a remote machine 30 may provide the functionality and services of one or more of the other remote machines.

Referring now to FIG. 5 in greater detail, a block diagram depicts one embodiment of a remote machine 30 providing access to an application program. In addition to the interfaces and subsystems described above in connection with FIG. 1D, the remote machine 30 may further include a management communication service 514, an XML service 516, and a management service 504. The management service 504 may comprise an application management subsystem 506, a server management subsystem 508, a session management subsystem 510, and a license management subsystem 512. The remote machine 30 may be in communication with an access suite console 520.

In one embodiment, the management service 504 further comprises a specialized remote procedure call subsystem, the MetaFrame Remote Procedure Call (MFRPC) subsystem 522. In some embodiments, the MFRPC subsystem 522 routes communications between subsystems on the remote machine 30, such as the XML service 516, and the management service 504. In other embodiments, the MFRPC subsystem 522 provides a remote procedure call (RPC) interface for calling management functions, delivers RPC calls to the management service 504, and returns the results to the subsystem making the call.

In some embodiments, the remote machine 30 is in communication with a protocol engine, such as the protocol engine 406 described above in FIG. 4B. In one of these embodiments, the remote machine 30 is in communication with a protocol engine 406 residing on a remote machine 30'. In other embodiments, the remote machine 30 further comprises a protocol engine 406.

The remote machine 30 may be in communication with an access suite console 520. The access suite console 520 may host management tools to an administrator of a remote machine 30 or of a farm 38. In some embodiments, the remote machine 30 communicates with the access suite console 520 using XML. In other embodiments, the remote machine 30 communicates with the access suite console 520 using the Simple Object Access Protocol (SOAP).

For embodiments such as those described in FIG. 1D and in FIG. 5 in which the remote machine 30 comprises a subset of subsystems, the management service 504 may comprise a plurality of subsystems. In one embodiment, each subsystem is either a single-threaded or a multi-threaded subsystem. A thread is an independent stream of execution running in a multi-tasking environment. A single-threaded subsystem is capable of executing only one thread at a time. A multi-threaded subsystem can support multiple concurrently executing threads, i.e., a multi-threaded subsystem can perform multiple tasks simultaneously.

The application management subsystem 506 manages information associated with a plurality of applications capable of being streamed. In one embodiment, the application management subsystem 506 handles requests from other components, such as requests for storing, deleting, updating, enumerating or resolving applications. In another embodiment, the application management subsystem 506 handles requests sent by components related to an application capable of being streamed. These events can be classified into three types of events: application publishing, application enumeration and application launching, each of which will be described in further detail below. In other embodiments, the application management subsystem 506 further comprises support for application resolution, application publication and application publishing. In other embodiments, the application management subsystem 506, uses a data store to store application properties and policies.

The server management subsystem 508 handles configurations specific to application streaming in server farm configurations. In some embodiments, the server management subsystem 508 also handles events that require retrieval of information associated with a configuration of a farm 38. In other embodiments, the server management subsystem 508 handles events sent by other components related to remote machines providing access to applications across application streams and properties of those remote machines. In one embodiment, the server management subsystem 508 stores remote machine properties and farm properties.

In some embodiments, the remote machine 30 further comprises one or more common application subsystems 524 providing services for one or more specialized application subsystems. These remote machines 30 may also have one or more common remote machine subsystem providing services for one or more specialized remote machine subsystems. In other embodiments, no common application subsystems 524 are provided, and each specialized application and remote machine subsystem implements all required functionality.

In one embodiment in which the remote machine 30 comprises a common application subsystem 524, the common application subsystem 524 manages common properties for published applications. In some embodiments, the common application subsystem 524 handles events that require retrieval of information associated with published applications or with common properties. In other embodiments, the common application subsystem 524 handles all events sent by other components related to common applications and their properties.

A common application subsystem 524 can "publish" applications to the farm 38, which makes each application available for enumeration and launching by a local machine 10. Generally, an application is installed on each remote machine 30 on which availability of that application is desired. In one embodiment, to publish an application, an administrator runs an administration tool specifying information such as the remote machines 30 hosting the application, the name of the executable file on each remote machine, the required capabilities of a local machine for executing the application (e.g., audio, video, encryption, etc.), and a list of users that can use the application. This specified information is categorized into application-specific information and common information. Examples of application-specific information are: the path name for accessing the application and the name of the executable file for running the application. Common information (i.e., common application data) includes, for example, the user-friendly name of the application (e.g., "Microsoft WORD 2000"), a unique identification of the application, and the users of the application.

The application-specific information and common information may be sent to a specialized application subsystem controlling the application on each remote machine 30 hosting the application. The specialized application subsystem may write the application-specific information and the common information into a persistent store 240.

When provided, a common application subsystem 524 also provides a facility for managing the published applications in the farm 38. Through a common application subsystem 524, an administrator can manage the applications of the farm 38 using an administration tool such as the access suite console 520 to configure application groups and produce an application tree hierarchy of those application groups. Each application group may be represented as a folder in the application tree hierarchy. Each application folder in the application tree hierarchy can include one or more other application folders and specific instances of remote machines. The common application subsystem 524 provides functions to create, move, rename, delete, and enumerate application folders.

In one embodiment, the common application subsystem 524 supports the application management subsystem 506 in handling application enumeration and application resolution requests. In some embodiments, the common application subsystem 524 provides functionality for identifying an application for execution responsive to a mapping between a type of data file and an application for processing the type of data file. In other embodiments, a second application subsystem provides the functionality for file type association.

In some embodiments, the remote machine 30 may further comprise a policy subsystem. A policy subsystem includes a policy rule for determining whether an application may be streamed to a local machine 10 upon a request by the local machine 10 for execution of the application. In some embodiments, the policy subsystem identifies a server access option associated with a streamed application published in the access suite console 520. In one of these embodiments, the policy subsystem uses the server access option as a policy in place of the policy rule.

The session monitoring subsystem 510 maintains and updates session status of an application streaming session associated with a local machine 10 and enforces license requirements for application streaming sessions. In one embodiment the session management subsystem 510 monitors sessions and logs events, such as the launching of an application or the termination of an application streaming session. In another embodiment, the session monitoring subsystem 510 receives communications, such as heartbeat messages, transmitted from the local machine 10 to the remote machine 30. In still another embodiment, the session management subsystem 510 responds to queries about sessions from management tools, such as tools within the access suite console 520. In some embodiments, the management service 504 further comprises a license management subsystem communicating with the session management subsystem to provide and maintain licenses to local machines for execution of applications.

In one embodiment, the management service 504 provides functionality for application enumeration and application resolution. In some embodiments, the management service 504 also provides functionality for application launching, session monitoring and tracking, application publishing, and license enforcement.

Figure 6:
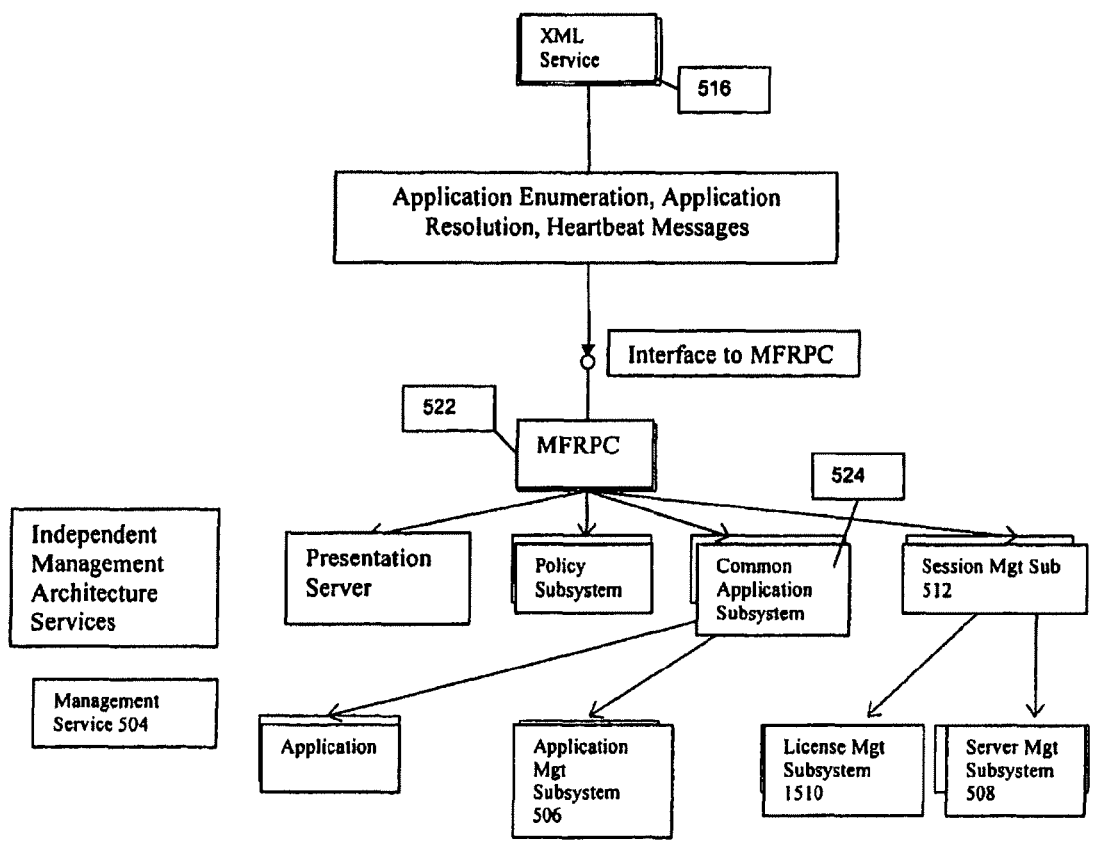
FIG. 6 is a block diagram depicting one embodiment of a remote machine including a management service providing an application enumeration.

Referring now to FIG. 6, a block diagram depicts one embodiment of a remote machine 30 comprising a management service providing an application enumeration. The management service 504 may provide application enumeration through the use of a web interface interacting with an XML service 516. In one embodiment, XML service 516 enumerates applications for a user of a local machine 10. In another embodiment, the XML service 516 implements the functionality of the ICA browser subsystem and the program neighborhood subsystem described above. The XML service 516 may interact with a management communications service 514. In one embodiment, the XML service 516 generates an application enumeration request using the management communications service 514. The application enumeration request may include a client type indicating a method of execution to be used when executing the enumerated application. The application enumeration request is sent to a common application subsystem 524. In one embodiment, the common application subsystem 524 returns an enumeration of applications associated with the client type of the application enumeration request. In another embodiment, the common application subsystem 524 returns an enumeration of applications available to the user of the local machine 10, the enumeration selected responsive to an application of a policy to a credential associated with the local machine 10. In this embodiment, a policy engine 406 may apply the policy to credentials gathered by a collection agent 404, as described in connection with FIG. 4B above. In still another embodiment, the enumeration of applications is returned and an application of a policy to the local machine 10 is deferred until an execution of an enumerated application is requested.

The management service 504 may provide application resolution service for identifying a second remote machine 30' hosting an application. In one embodiment, the second remote machine 30' is a file server or an application server. In some embodiments, the management service 504 consults a file including identifiers for a plurality of remote machines 30 hosting applications. In one embodiment, the management service 504 provides the application resolution service responsive to a request from a local machine 10 for execution of an application. In another embodiment, the management service 504 identifies a second remote machine 30' capable of implementing a different method of executing the application than a first remote machine 30. In some embodiments, the management service 504 identifies a first remote machine 30' capable of streaming an application program to a local machine 10 and a second remote machine 30' capable of executing the application program and providing application-output data generated responsive to the execution of the application program to the local machine 10.

In one embodiment, a web interface transmits an application resolution request to the XML service 516. In another embodiment, the XML service 516 receives a application resolution request and transmits the request to the MFRPC subsystem 522.

In one embodiment, the MFRPC subsystem 522 identifies a client type included with a received application resolution request. In another embodiment, the MFRPC subsystem applies a policy to the client type and determines to "stream" the application to the local machine 10. In this embodiment, the MFRPC subsystem 522 may forward the application resolution request to an application management subsystem 506. In one embodiment, upon receiving the application resolution request from the MFRPC subsystem 522, the application management subsystem 506 may identify a remote machine 30' functioning as a session management server 562 for the local machine 10. In some embodiments, the local machine transmits a heartbeat message to the session management server 562. In another embodiment, the application management subsystem 506 may identify a remote machine 30' hosting a plurality of application files comprising the application to be streamed to the local machine 10.

In some embodiments, the application management subsystem 506 use a file enumerating a plurality of remote machines hosting the plurality of application files to identify the remote machine 30'. In other embodiments, the application management subsystem 506 identifies a remote machine 30' having an IP address similar to an IP address of the local machine 10. In still other embodiments, the application management subsystem 506 identifies a remote machine 30' having an IP address in a range of IP addresses accessible to the local machine 10.

In still another embodiment, the MFRPC subsystem 522 applies a policy to the client type and determines that the application may be executed on a remote machine 30', the remote machine 30' transmitting application-output data generated by an execution of the application to the local machine 10. In this embodiment, the MFRPC subsystem 522 may forward the application resolution request to a common application subsystem 524 to retrieve an identifier of a host address for a remote machine 30'. In one embodiment, the identified remote machine 30' may transmit the application-output data to the local machine using a presentation level protocol such as ICA or RDP or X Windows. In some embodiments, the remote machine 30' receives the application from a second remote machine 30' across an application streaming session.

In one embodiment, upon completion of application enumeration and application resolution, access information is transmitted to the local machine 10 that includes an identification of a method of execution for an enumerated application and an identifier of a remote machine 30' hosting the enumerated application. In one embodiment where the management service 504 determines that the enumerated application will execute on the local machine 10, a web interface creates and transmits to the local machine 10 a file containing name-resolved information about the enumerated application. In some embodiments, the file may be identified using a ".rad" extension. The local machine 10 may execute the enumerated application responsive to the contents of the received file. Table 2 depicts one embodiment of information contained in the file:

TABLE 2

| Field | Description | Source |
| --- | --- | --- |
| UNC path | Points to a Container master manifest file on the file server | XML service |
| Initial program | Program to launch from container | XML service |
| Command line | For launching documents using FTA | XML service |
| Web server URL | For messages from RADE client to WI | WI config |
| Farm ID | The farm the application belongs to - needed for heartbeat messages | WI config |
| LaunchTicket | Application streaming client uses LaunchTicket to acquire a license authorizing execution of the program | XML/IMA |
| ICA fallback launch info | Embedded ICA file for fallback, if fallback is to be allowed | XML Service |

The file may also contain a launch ticket for use by the local machine in executing the application, as shown in Table 2. In some embodiments, the launch ticket expires after a predetermined period of time. In one embodiment, the local machine provides the launch ticket to a remote machine hosting the enumerated application to be executed. Use of the launch ticket to authorize access to the enumerated application by a user of the local machine assists in preventing the user from reusing the file or generating an unauthorized version of the file to inappropriately access to applications. In one embodiment, the launch ticket comprises a large, randomly-generated number.

As described above in connection with FIG. 2, a method for selecting a method of execution of an application program begins when credentials associated with the local machine 10 or with a user of the local machine 10 are received (step 202) and an enumeration of a plurality of application programs available to the local machine 10 is provided, responsive to the received credentials (step 204). A request is received to execute an enumerated application (step 206) and one of a predetermined number of methods for executing the enumerated application is selected, responsive to a policy, the predetermined number of methods including a method for application streaming of the enumerated application (step 208).

Figure 7:
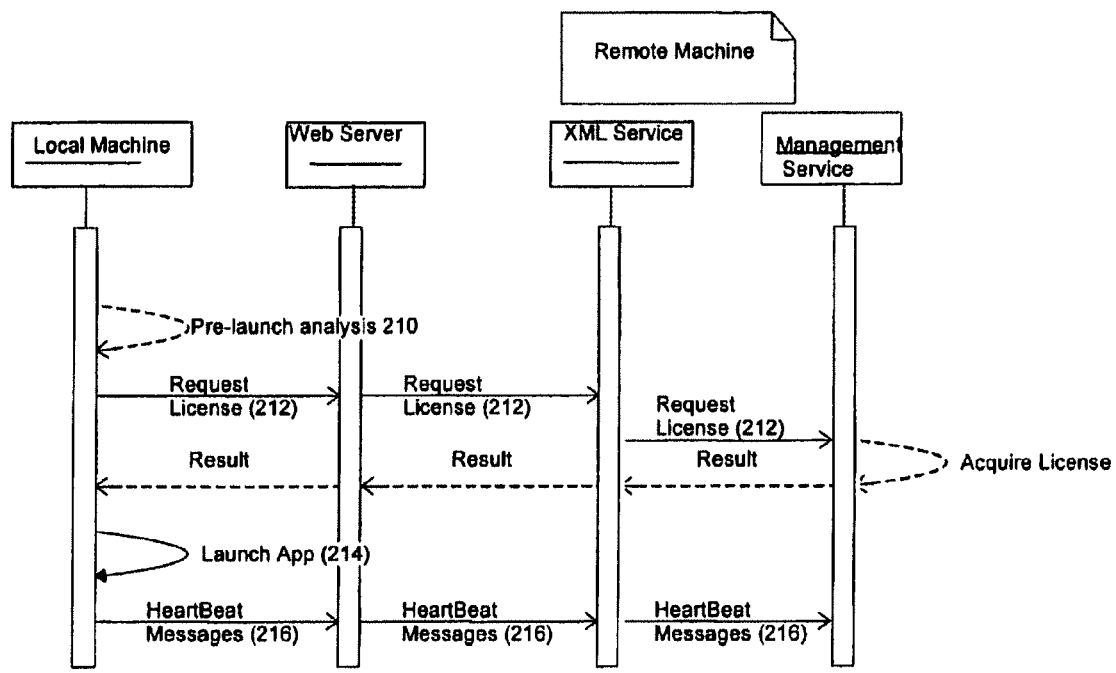
FIG. 7 is a flow diagram depicting one embodiment of the steps taken to access a plurality of files comprising an application program.

Referring now to FIG. 7, a flow diagram depicts one embodiment of the steps taken to access a plurality of files comprising an application program. A local machine performs a pre-launch analysis of the local machine (step 210). In one embodiment, the local machine 10 performs the pre-launch analysis prior to retrieving and executing a plurality of application files comprising an application program. In another embodiment, the local machine 10 performs the pre-launch analysis responsive to a received indication that the pre-launch analysis is a requirement for authorization to access the plurality of application files comprising an application program.

In some embodiments, the local machine 10 receives, from a remote machine 30, access information associated with the plurality of application files. In one of these embodiments, the access information includes an identification of a location of a remote machine 30' hosting the plurality of application files. In another of these embodiments, the local machine 10 receives an identification of a plurality of applications comprising one or more versions of the application program. In still another of these embodiments, the local machine 10 receives an identification of a plurality of application files comprising one or more application programs. In other embodiments, the local machine 10 receives an enumeration of application programs available to the local machine 10 for retrieval and execution. In one of these embodiments, the enumeration results from an evaluation of the local machine 10. In still other embodiments, the local machine 10 retrieves the at least one characteristic responsive to the retrieved identification of the plurality of application files comprising an application program.

In some embodiments, the access information includes a launch ticket capable of authorizing the local machine to access the plurality of application files. In one of these embodiments, the launch ticket is provided to the local machine 10 responsive to an evaluation of the local machine 10. In another of these embodiments, the launch ticket is provided to the local machine 10 subsequent to a pre-launch analysis of the local machine 10 by the local machine 10.

In other embodiments, the local machine 10 retrieves at least one characteristic required for execution of the plurality of application files. In one of these embodiments, the access information includes the at least one characteristic. In another of these embodiments, the access information indicates a location of a file for retrieval by the local machine 10, the file enumerating the at least one characteristic. In still another of these embodiments, the file enumerating the at least one characteristic further comprises an enumeration of the plurality of application files and an identification of a remote machine 30 hosting the plurality of application files.

The local machine 10 determines the existence of the at least one characteristic on the local machine. In one embodiment, the local machine 10 makes this determination as part of the pre-launch analysis. In another embodiment, the local machine 10 determines whether the local machine 10 has the at least one characteristic.

In one embodiment, determining the existence of the at least one characteristic on the local machine 10 includes determining whether a device driver is installed on the local machine. In another embodiment, determining the existence of the at least one characteristic on the local machine 10 includes determining whether an operating system is installed on the local machine 10. In still another embodiment, determining the existence of the at least one characteristic on the local machine 10 includes determining whether a particular operating system is installed on the local machine 10. In yet another embodiment, determining the existence of the at least one characteristic on the local machine 10 includes determining whether a particular revision level of an operating system is installed on the local machine 10.

In some embodiments, determining the existence of the at least one characteristic on the local machine 10 includes determining whether the local machine 10 has acquired authorization to execute an enumerated application. In one of these embodiments, a determination is made by the local machine 10 as to whether the local machine 10 has received a license to execute the enumerated application. In another of these embodiments, a determination is made by the local machine 10 as to whether the local machine 10 has received a license to receive across an application streaming session a plurality of application files comprising the enumerated application. In other embodiments, determining the existence of the at least one characteristic on the local machine 10 includes determining whether the local machine 10 has sufficient bandwidth available to retrieve and execute an enumerated application.

In some embodiments, determining the existence of the at least one characteristic on the local machine 10 includes execution of a script on the local machine 10. In other embodiments, determining the existence of the at least one characteristic on the local machine 10 includes installation of software on the local machine 10. In still other embodiments, determining the existence of the at least one characteristic on the local machine 10 includes modification of a registry on the local machine 10. In yet other embodiments, determining the existence of the at least one characteristic on the local machine 10 includes transmission of a collection agent 404 to the local machine 10 for execution on the local machine 10 to gather credentials associated with the local machine 10.

The local machine 10 requests, from a remote machine 30, authorization for execution of the plurality of application files, the request including a launch ticket (step 212). In some embodiments, the local machine 10 makes the request responsive to a determination that at least one characteristic exists on the local machine 10. In one of these embodiments, the local machine 10 determines that a plurality of characteristics exist on the local machine 10, the plurality of characteristics associated with an enumerated application and received responsive to a request to execute the enumerated application. In another of these embodiments, whether the local machine 10 receives an indication that authorization for execution of the enumerated application files depends upon existence of the at least one characteristic on the local machine 10. In one embodiment, the local machine 10 received an enumeration of application programs, requested execution of an enumerated application, and received access information including the at least one characteristic and a launch ticket authorizing the execution of the enumerated application upon the determination of the existence of the at least one characteristic on the local machine 10.

In one embodiment, the local machine 10 receives from the remote machine 30 a license authorizing execution of the plurality of application files. In some embodiments, the license authorizes execution for a specified time period. In one of these embodiments, the license requires transmission of a heart beat message to maintain authorization for execution of the plurality of application files.

In another embodiment, the local machine 10 receives from the remote machine 30 the license and an identifier associated with a remote machine 30 monitoring execution of the plurality of application files. In some embodiments, the remote machine is a session management server 562, as depicted above in FIG. 5. In one of these embodiments, the session management server 562 includes a session management subsystem 510 that monitors the session associated with the local machine 10. In other embodiments, a separate remote machine 30"" is the session management server 562.

The local machine 10 receives and executes the plurality of application files (step 214). In one embodiment, the local machine 10 receives the plurality of application files across an application streaming session. In another embodiment, the local machine 10 stores the plurality of application files in an isolation environment on the local machine 10. In still another embodiment, the local machine 10 executes one of the plurality of application files prior to receiving a second of the plurality of application files. In some embodiments, a remote machine transmits the plurality of application files to a plurality of local machines, each local machine in the plurality having established a separate application streaming session with the remote machine.

In some embodiments, the local machine 10 stores the plurality of application files in a cache and delays execution of the application files. In one of these embodiments, the local machine 10 receives authorization to execute the application files during a pre-defined period of time. In another of these embodiments, the local machine 10 receives authorization to execute the application files during the pre-defined period of time when the local machine 10 lacks access to a network. In other embodiments, the local machine stores the plurality of application files in a cache. In one of these embodiments, the application streaming client 552 establishes an internal application streaming session to retrieve the plurality of application files from the cache. In another of these embodiments, the local machine 10 receives authorization to execute the application files during a pre-defined period of time when the local machine 10 lacks access to a network.

The local machine 10 transmits at least one heartbeat message to a remote machine (step 216). In some embodiments, the local machine 10 transmits the at least one heartbeat message to retain authorization to execute the plurality of application files comprising the enumerated application. In other embodiments, the local machine 10 transmits the at least one heartbeat message to retain authorization retrieve an application file in the plurality of application files. In still other embodiments, the local machine 10 receives a license authorizing execution of the plurality of application files during a pre-determined period of time.

In some embodiments, the local machine 10 transmits the heartbeat message to a second remote machine 30"". In one of these embodiments, the second remote machine 30"" may comprise a session management server 562 monitoring the retrieval and execution of the plurality of application files. In another of these embodiments, the second remote machine 30"" may renew a license authorizing execution of the plurality of application files, responsive to the transmitted heartbeat message. In still another of these embodiments, the second remote machine 30"" may transmit to the local machine 10 a command, responsive to the transmitted heartbeat message.

Referring back to FIG. 5, the local machine 10 may include an application streaming client 552, a streaming service 554 and an isolation environment 556.

The application streaming client 552 may be an executable program. In some embodiments, the application streaming client 552 may be able to launch another executable program. In other embodiments, the application streaming client 552 may initiate the streaming service 554. In one of these embodiments, the application streaming client 552 may provide the streaming service 554 with a parameter associated with executing an application program. In another of these embodiments, the application streaming client 552 may initiate the streaming service 554 using a remote procedure call.

In one embodiment, the local machine 10 requests execution of an application program and receives access information from a remote machine 30 regarding execution. In another embodiment, the application streaming client 552 receives the access information. In still another embodiment, the application streaming client 552 provides the access information to the streaming service 554. In yet another embodiment, the access information includes an identification of a location of a file associated with a plurality of application files comprising the application program.

In one embodiment, the streaming service 554 retrieves a file associated with a plurality of application files. In some embodiments, the retrieved file includes an identification of a location of the plurality of application files. In one of these embodiments, the streaming service 554 retrieves the plurality of application files. In another of these embodiments, the streaming service 554 executes the retrieved plurality of application files on the local machine 10. In other embodiments, the streaming service 554 transmits heartbeat messages to a remote machine to maintain authorization to retrieve and execute a plurality of application files.

In some embodiments, the retrieved file includes an identification of a location of more than one plurality of application files, each plurality of application files comprising a different application program. In one of these embodiments, the streaming service 554 retrieves the plurality of application files comprising the application program compatible with the local machine 10. In another of these embodiments, the streaming service 554 receives authorization to retrieve a particular plurality of application files, responsive to an evaluation of the local machine 10.

In some embodiments, the plurality of application files are compressed and stored on a file server within an archive file such as a CAB, ZIP, SIT, TAR, JAR or other archive file. In one embodiment, a plurality of application files stored in an archive file comprise an application program. In another embodiment, multiple pluralities of application files stored in an archive file each comprise different versions of an application program. In still another embodiment, multiple pluralities of application files stored in an archive file each comprise different application programs. In some embodiments, an archive file includes metadata associated with each file in the plurality of application files. In one of these embodiments, the streaming service 554 generates a directory structure responsive to the included metadata. As will be described in greater detail in connection with FIG. 12 below, the metadata may be used to satisfy requests by application programs for directory enumeration.

In one embodiment, the streaming service 554 decompresses an archive file to acquire the plurality of application files. In another embodiment, the streaming service 554 determines whether a local copy of a file within the plurality of application files exists in a cache on the local machine 10 prior to retrieving the file from the plurality of application files. In still another embodiment, the file system filter driver 564 determines whether the local copy exists in the cache. In some embodiments, the streaming service 554 modifies a registry entry prior to retrieving a file within the plurality of application files.

In some embodiments, the streaming service 554 stores a plurality of application files in a cache on the local machine 10. In one of these embodiments, the streaming service 554 may provide functionality for caching a plurality of application files upon receiving a request to cache the plurality of application files. In another of these embodiments, the streaming service 554 may provide functionality for securing a cache on the local machine 10. In another of these embodiments, the streaming service 554 may use an algorithm to adjust a size and a location of the cache.

In some embodiments, the streaming service 554 creates an isolation environment 556 on the local machine 10. In one of these embodiments, the streaming service 554 uses an isolation environment application programming interface to create the isolation environment 556. In another of these embodiments, the streaming service 554 stores the plurality of application files in the isolation environment 556. In still another of these embodiments, the streaming service 554 executes a file in the plurality of application files within the isolation environment. In yet another of these embodiments, the streaming service 554 executes the application program in the isolation environment.

For embodiments in which authorization is received to execute an application on the local machine 10, the execution of the application may occur within an isolation environment 556. In some embodiments, a plurality of application files comprising the application are stored on the local machine 10 prior to execution of the application. In other embodiments, a subset of the plurality of application files are stored on the local machine 10 prior to execution of the application. In still other embodiments, the plurality of application files do not reside in the isolation environment 556. In yet other embodiments, a subset of the plurality of applications files do not reside on the local machine 10. Regardless of whether a subset of the plurality of application files or each application file in the plurality of application files reside on the local machine 10 or in isolation environment 556, in some embodiments, an application file in the plurality of application files may be executed within an isolation environment 556.

The isolation environment 556 may consist of a core system able to provide File System Virtualization, Registry System Virtualization, and Named Object Virtualization to reduce application compatibility issues without requiring any change to the application source code. The isolation environment 556 may redirect application resource requests using hooking both in the user mode for registry and named object virtualization, and in the kernel using a file system filter driver for file system virtualization. The following is a description of some embodiments of an isolation environment 556.

Figure 8A:
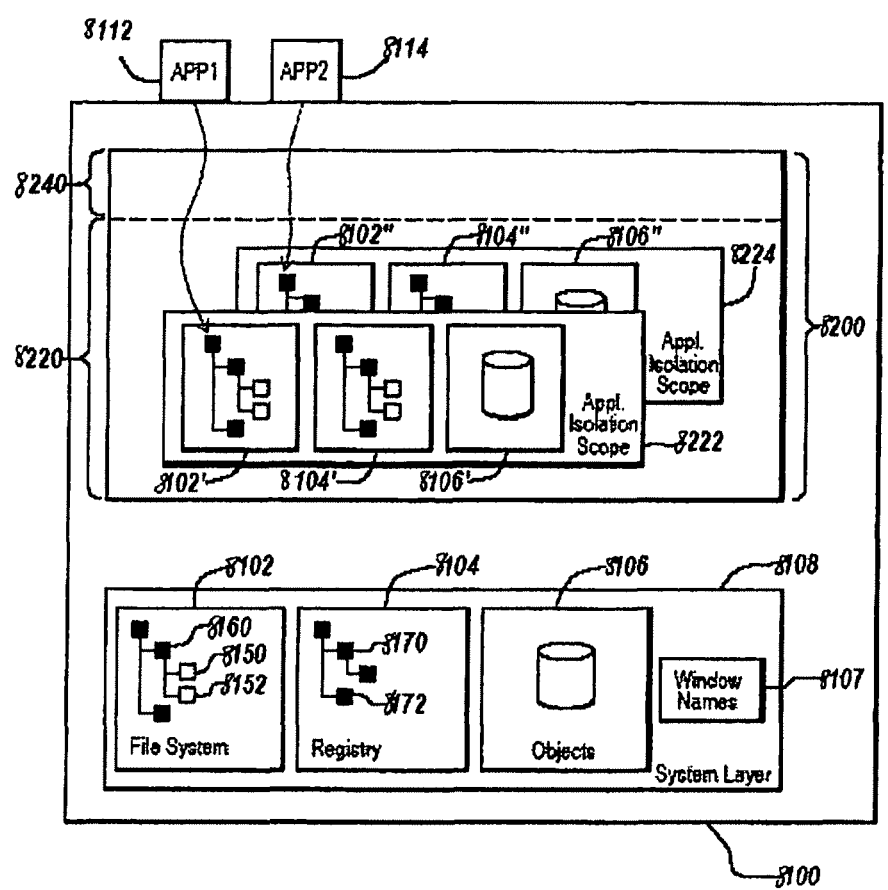
FIG. 8A is a block diagram depicting one embodiment of a computer running under control of an operating system that has reduced application compatibility and application sociability problems.

Referring now to FIG. 8A, one embodiment of a computer running under control of an operating system 8100 that has reduced application compatibility and application sociability problems is shown. The operating system 8100 makes available various native resources to application programs 8112, 8114 via its system layer 8108. The view of resources embodied by the system layer 8108 will be termed the "system scope". In order to avoid conflicting access to native resources 8102, 8104, 8106, 8107 by the application programs 8112, 8114, an isolation environment 8200 is provided. As shown in FIG. 8A, the isolation environment 8200 includes an application isolation layer 8220 and a user isolation layer 8240. Conceptually, the isolation environment 8200 provides, via the application isolation layer 8220, an application program 8112, 8114, with a unique view of native resources, such as the file system 8102, the registry 8104, objects 8106, and window names 8107. Each isolation layer modifies the view of native resources provided to an application. The modified view of native resources provided by a layer will be referred to as that layer's "isolation scope". As shown in FIG. 8A, the application isolation layer includes two application isolation scopes 8222, 8224. Scope 8222 represents the view of native resources provided to application 8112 and scope 8224 represents the view of native resources provided to application 8114. Thus, in the embodiment shown in FIG. 8A, APP1 8112 is provided with a specific view of the file system 8102', while APP2 8114 is provided with another view of the file system 8102" which is specific to it. In some embodiments, the application isolation layer 8220 provides a specific view of native resources 8102, 8104, 8106, 8107 to each individual application program executing on top of the operating system 8100. In other embodiments, application programs 8112, 8114 may be grouped into sets and, in these embodiments, the application isolation layer 8220 provides a specific view of native resources for each set of application programs. Conflicting application programs may be put into separate groups to enhance the compatibility and sociability of applications. In still further embodiments, the applications belonging to a set may be configured by an administrator. In some embodiments, a "passthrough" isolation scope can be defined which corresponds exactly to the system scope. In other words, applications executing within a passthrough isolation scope operate directly on the system scope.

In some embodiments, the application isolation scope is further divided into layered sub-scopes. The main sub-scope contains the base application isolation scope, and additional sub-scopes contain various modifications to this scope that may be visible to multiple executing instances of the application. For example, a sub-scope may contain modifications to the scope that embody a change in the patch level of the application or the installation or removal of additional features. In some embodiments, the set of additional sub-scopes that are made visible to an instance of the executing application is configurable. In some embodiments, that set of visible sub-scopes is the same for all instances of the executing application, regardless of the user on behalf of which the application is executing. In others, the set of visible sub-scopes may vary for different users executing the application. In still other embodiments, various sets of sub-scopes may be defined and the user may have a choice as to which set to use. In some embodiments, sub-scopes may be discarded when no longer needed. In some embodiments, the modifications contained in a set of sub-scopes may be merged together to form a single sub-scope.

Figure 8B:
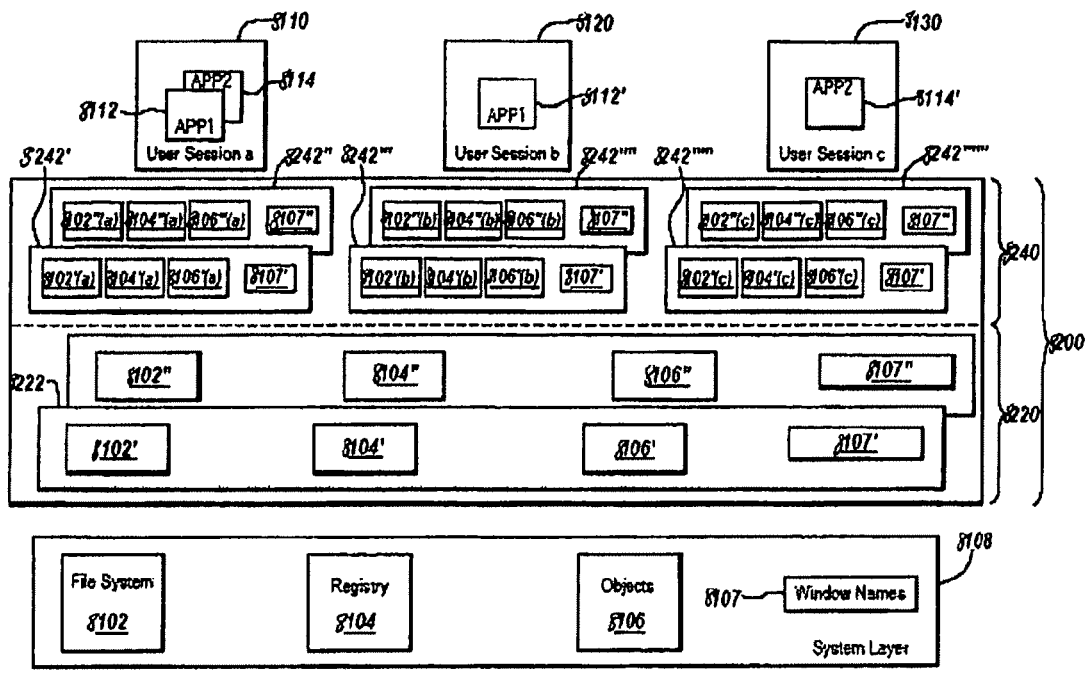
FIG. 8B is a block diagram depicting a multi-user computer having reduced application compatibility and application sociability problems.

Referring now to FIG. 8B, a multi-user computer having reduced application compatibility and application sociability problems is depicted. The multi-user computer includes native resources 8102, 8104, 8106, 8107 in the system layer 8108, as well as the isolation environment 8200 discussed immediately above. The application isolation layer 8220 functions as discussed above, providing an application or group of applications with a modified view of native resources. The user isolation layer 8240, conceptually, provides an application program 8112, 8114, with a view of native resources that is further altered based on user identity of the user on whose behalf the application is executed. As shown in FIG. 8B, the user isolation layer 8240 may be considered to comprise a number of user isolation scopes 8242', 8242", 8242'", 8242"", 8242""', 8242"""" (generally 8242). A user isolation scope 8242 provides a user-specific view of application-specific views of native resources. For example, APP1 8112 executing in user session 8110 on behalf of user "a" is provided with a file system view 8102'(a) that is altered or modified by both the user isolation scope 8242' and the application isolation scope 8222.

Put another way, the user isolation layer 8240 alters the view of native resources for each individual user by "layering" a user-specific view modification provided by a user isolation scope 8242' "on top of" an application-specific view modification provided by an application isolation scope 8222, which is in turn "layered on top of" the system-wide view of native resources provided by the system layer. For example, when the first instance of APP1 8112 accesses an entry in the registry database 8104, the view of the registry database specific to the first user session and the application 8104'(a) is consulted. If the requested registry key is found in the user-specific view of the registry 8104'(a), that registry key is returned to APP1 8112. If not, the view of the registry database specific to the application 8104' is consulted. If the requested registry key is found in the application-specific view of the registry 8104', that registry key is returned to APP1 8112. If not, then the registry key stored in the registry database 8104 in the system layer 8108 (i.e. the native registry key) is returned to APP1 8112.

In some embodiments, the user isolation layer 8240 provides an isolation scope for each individual user. In other embodiments, the user isolation layer 8240 provides an isolation scope for a group of users, which may be defined by roles within the organization or may be predetermined by an administrator. In still other embodiments, no user isolation layer 8240 is provided. In these embodiments, the view of native resources seen by an application program is that provided by the application isolation layer 8220. The isolation environment 8200, although described in relation to multi-user computers supporting concurrent execution of application programs by various users, may also be used on single-user computers to address application compatibility and sociability problems resulting from sequential execution of application programs on the same computer system by different users, and those problems resulting from installation and execution of incompatible programs by the same user.

In some embodiments, the user isolation scope is further divided into sub-scopes. The modifications by the user isolation scope to the view presented to an application executing in that scope is the aggregate of the modifications contained within each sub-scope in the scope. Sub-scopes are layered on top of each other, and in the aggregate view modifications to a resource in a higher sub-scope override modifications to the same resource in lower layers.

In some of these embodiments, one or more of these sub-scopes may contain modifications to the view that are specific to the user. In some of these embodiments, one or more sub-scopes may contain modifications to the view that are specific to sets of users, which may be defined by the system administrators or defined as a group of users in the operating system. In some of these embodiments, one of these sub-scopes may contain modifications to the view that are specific to the particular login session, and hence that are discarded when the session ends. In some of these embodiments, changes to native resources by application instances associated with the user isolation scope always affects one of these sub-scopes, and in other embodiments those changes may affect different sub-scopes depending on the particular resource changed.

The conceptual architecture described above allows an application executing on behalf of a user to be presented with an aggregate, or unified, virtualized view of native resources, specific to that combination of application and user. This aggregated view may be referred to as the "virtual scope". The application instance executing on behalf of a user is presented with a single view of native resources reflecting all operative virtualized instances of the native resources. Conceptually this aggregated view consists firstly of the set of native resources provided by the operating system in the system scope, overlaid with the modifications embodied in the application isolation scope applicable to the executing application, further overlaid with the modifications embodied in the user isolation scope applicable to the application executing on behalf of the user. The native resources in the system scope are characterized by being common to all users and applications on the system, except where operating system permissions deny access to specific users or applications. The modifications to the resource view embodied in an application isolation scope are characterized as being common to all instances of applications associated with that application isolation scope. The modifications to the resource view embodied in the user isolation scope are characterized as being common to all applications associated with the applicable application isolation scope that are executing on behalf of the user associated with the user isolation scope.

This concept can be extended to sub-scopes; the modifications to the resource view embodied in a user sub-scope are common to all applications associated with the applicable isolation sub-scope executing on behalf of a user, or group of users, associated with a user isolation sub-scope. Throughout this description it should be understood that whenever general reference is made to "scope," it is intended to also refer to sub-scopes, where those exist.

When an application requests enumeration of a native resource, such as a portion of the file system or registry database, a virtualized enumeration is constructed by first enumerating the "system-scoped" instance of the native resource, that is, the instance found in the system layer, if any. Next, the "application-scoped" instance of the requested resource, that is the instance found in the appropriate application isolation scope, if any, is enumerated. Any enumerated resources encountered in the application isolation scope are added to the view. If the enumerated resource already exists in the view (because it was present in the system scope, as well), it is replaced with the instance of the resource encountered in the application isolation scope. Similarly, the "user-scoped" instance of the requested resource, that is the instance found in the appropriate user isolation scope, if any, is enumerated. Again, any enumerated resources encountered in the user isolation scope are added to the view. If the native resource already exists in the view (because it was present in the system scope or in the appropriate application isolation scope), it is replaced with the instance of the resource encountered in the user isolation scope. In this manner, any enumeration of native resources will properly reflect virtualization of the enumerated native resources. Conceptually the same approach applies to enumerating an isolation scope that comprises multiple sub-scopes. The individual sub-scopes are enumerated, with resources from higher sub-scopes replacing matching instances from lower sub-scopes in the aggregate view.

In other embodiments, enumeration may be performed from the user isolation scope layer down to the system layer, rather than the reverse. In these embodiments, the user isolation scope is enumerated. Then the application isolation scope is enumerated and any resource instances appearing in the application isolation scope that were not enumerated in the user isolation scope are added to the aggregate view that is under construction. A similar process can be repeated for resources appearing only in the system scope.

In still other embodiments, all isolation scopes may be simultaneously enumerated and the respective enumerations combined.

If an application attempts to open an existing instance of a native resource with no intent to modify that resource, the specific instance that is returned to the application is the one that is found in the virtual scope, or equivalently the instance that would appear in the virtualized enumeration of the parent of the requested resource. From the point of view of the isolation environment, the application is said to be requesting to open a "virtual resource", and the particular instance of native resource used to satisfy that request is said to be the "literal resource" corresponding to the requested resource.

If an application executing on behalf of a user attempts to open a resource and indicates that it is doing so with the intent to modify that resource, that application instance is normally given a private copy of that resource to modify, as resources in the application isolation scope and system scope are common to applications executing on behalf of other users. Typically a user-scoped copy of the resource is made, unless the user-scoped instance already exists. The definition of the aggregate view provided by a virtual scope means that the act of copying an application-scoped or system-scoped resource to a user isolation scope does not change the aggregate view provided by the virtual scope for the user and application in question, nor for any other user, nor for any other application instance. Subsequent modifications to the copied resource by the application instance executing on behalf of the user do not affect the aggregate view of any other application instance that does not share the same user isolation scope. In other words, those modifications do not change the aggregate view of native resources for other users, or for application instances not associated with the same application isolation scope.

Applications may be installed into a particular isolation scope (described below in more detail). Applications that are installed into an isolation scope are always associated with that scope. Alternatively, applications may be launched into a particular isolation scope, or into a number of isolation scopes. In effect, an application is launched and associated with one or more isolation scopes. The associated isolation scope, or scopes, provide the process with a particular view of native resources. Applications may also be launched into the system scope, that is, they may be associated with no isolation scope. This allows for the selective execution of operating system applications such as Internet Explorer, as well as third party applications, within an isolation environment.

This ability to launch applications within an isolation scope regardless of where the application is installed mitigates application compatibility and sociability issues without requiring a separate installation of the application within the isolation scope. The ability to selectively launch installed applications in different isolation scopes provides the ability to have applications which need helper applications (such as Word, Notepad, etc.) to have those helper applications launched with the same rule sets.

Further, the ability to launch an application within multiple isolated environments allows for better integration between isolated applications and common applications.

Figure 8C:
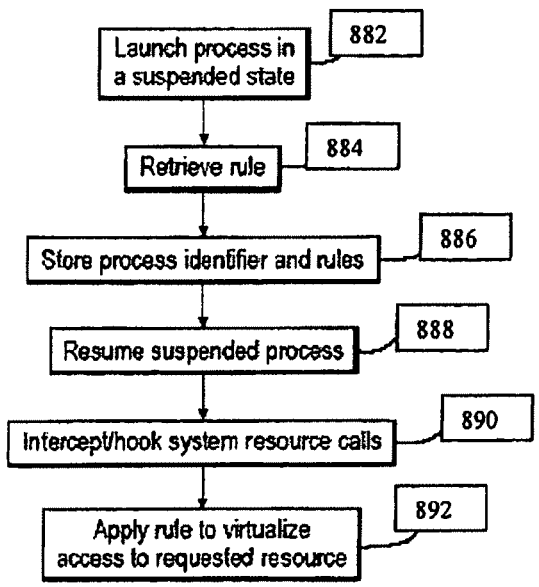
FIG. 8C is a flow diagram depicting one embodiment of the steps taken in a method for associating a process with an isolation scope.

Referring now to FIG. 8C, and in brief overview, a method for associating a process with an isolation scope includes the steps of launching the process in a suspended state (step 882). The rules associated with the desired isolation scope are retrieved (step 884) and an identifier for the process and the retrieved rules are stored in a memory element (step 886) and the suspended process is resumed (step 888). Subsequent calls to access native resources made by the process are intercepted or hooked (step 890) and the rules associated with the process identifier, if any, are used to virtualize access to the requested resource (step 892).

Still referring to FIG. 8C, and in more detail, a process is launched in a suspended state (step 882). In some embodiments, a custom launcher program is used to accomplish this task. In some of these embodiments, the launcher is specifically designed to launch a process into a selected isolation scope. In other embodiments, the launcher accepts as input a specification of the desired isolation scope, for example, by a command line option.

The rules associated with the desired isolation scope are retrieved (step 884). In some embodiments, the rules are retrieved from a persistent storage element, such as a hard disk drive or other solid state memory element. The rules may be stored as a relational database, flat file database, tree-structured database, binary tree structure, or other persistent data structure. In other embodiments, the rules may be stored in a data structure specifically configured to store them.

An identifier for the process, such as a process id (PID), and the retrieved rules are stored in a memory element (step 886). In some embodiments, a kernel mode driver is provided that receives operating system messages concerning new process creation. In these embodiments, the PID and the retrieved rules may be stored in the context of the driver. In other embodiments, a file system filter driver, or mini-filter, is provided that intercepts native resource requests. In these embodiments, the PID and the retrieved rules may be stored in the filter. In other embodiments still, all interception is performed by user-mode hooking and no PID is stored at all. The rules are loaded by the user-mode hooking apparatus during the process initialization, and no other component needs to know the rules that apply to the PID because rule association is performed entirely in-process.

The suspended process is resumed (step 888) and subsequent calls to access native resources made by the process are intercepted or hooked (step 890) and the rules associated with the process identifier, if any, are used to virtualize access to the requested resource (step 892). In some embodiments, a file system filter driver, or mini-filter, or file system driver, intercepts requests to access native resources and determines if the process identifier associated with the intercepted request has been associated with a set of rules. If so, the rules associated with the stored process identifier are used to virtualize the request to access native resources. If not, the request to access native resources is passed through unmodified. In other embodiments, a dynamically-linked library is loaded into the newly-created process and the library loads the isolation rules. In still other embodiments, both kernel mode techniques (hooking, filter driver, mini-filter) and user-mode techniques are used to intercept calls to access native resources. For embodiments in which a file system filter driver stores the rules, the library may load the rules from the file system filter driver.

Processes that are "children" of processes associated with isolation scopes are associated with the isolation scopes of their "parent" process. In some embodiments, this is accomplished by a kernel mode driver notifying the file system filter driver when a child process is created. In these embodiments, the file system filter driver determines if the process identifier of the parent process is associated with an isolation scope. If so, file system filter driver stores an association between the process identifier for the newly-created child process and the isolation scope of the parent process. In other embodiments, the file system filter driver can be called directly from the system without use of a kernel mode driver. In other embodiments, in processes that are associated with isolation scopes, operating system functions that create new processes are hooked or intercepted. When request to create a new process are received from such a process, the association between the new child process and the isolation scope of the parent is stored.

In some embodiments, a scope or sub-scope may be associated with an individual thread instead of an entire process, allowing isolation to be performed on a per-thread basis. In some embodiments, per-thread isolation may be used for Services and COM+ servers.

In some embodiments, isolation environments are used to provide additional functionality to the application streaming client 552. In one of these embodiments, an application program is executed within an isolation environment. In another of these embodiments, a retrieved plurality of application files resides within the isolation environment. In still another of these embodiments, changes to a registry on the local machine 10 are made within the isolation environment.

In one embodiment, the application streaming client 552 includes an isolation environment 556. In some embodiments, the application streaming client 552 includes a file system filter driver 564 intercepting application requests for files. In one of these embodiments, the file system filter driver 564 intercepts an application request to open an existing file and determines that the file does not reside in the isolation environment 556. In another of these embodiments, the file system filter driver 564 redirects the request to the streaming service 554 responsive to a determination that the file does not reside in the isolation environment 556. The streaming service 554 may extract the file from the plurality of application files and store the file in the isolation environment 556. The file system filter driver 564 may then respond to the request for the file with the stored copy of the file. In some embodiments, the file system filter driver 564 may redirect the request for the file to a file server 540, responsive to an indication that the streaming service 554 has not retrieved the file or the plurality of application files and a determination the file does not reside in the isolation environment 556.

In some embodiments, the file system filter driver 564 uses a strict isolation rule to prevent conflicting or inconsistent data from appearing in the isolation environment 556. In one of these embodiments, the file system filter driver 564 intercepting a request for a resource in a user isolation environment may redirect the request to an application isolation environment. In another of these embodiments, the file system filter driver 564 does not redirect the request to a system scope.

In one embodiment, the streaming service 554 uses IOCTL commands to communicate with the filter driver. In another embodiment, communications to the file server 540 are received with the Microsoft SMB streaming protocol.

In some embodiments, the packaging mechanism 530 stores in a manifest file a list of file types published as available applications and makes this information available to application publishing software. In one of these embodiments, the packaging mechanism 530 receives this information from monitoring an installation of an application program into the isolation environment on the staging machine. In another of these embodiments, a user of the packaging mechanism 530 provides this information to the packaging mechanism 530. In other embodiments, application publishing software within the access suite console 520 consults the manifest file to present to a user of the access suite console 520 the possible file types that can be associated with the requested application being published. The user selects a file type to associate with a particular published application. The file type is presented to the local machine 10 at the time of application enumeration.

The local machine 10 may include a client agent 560. The client agent 560 provides functionality for associating a file type with an application program and selecting a method of execution of the application program responsive to the association. In one embodiment, the client agent 560 is a program neighborhood application.

When an application program is selected for execution, the local machine 10 makes a determination as to a method of execution associated with a file type of the application program. In one embodiment, the local machine 10 determines that the file type is associated with a method of execution requiring an application streaming session for retrieval of the application files and execution within an isolation environment. In this embodiment, the local machine 10 may redirect the request to the application streaming client 552 instead of launching a local version of the application program. In another embodiment, the client agent 560 makes the determination. In still another embodiment, the client agent 560 redirects the request to the application streaming client 552.

In one embodiment, the application streaming client 552 requests access information associated with the application program from the remote machine 30. In some embodiments, the application streaming client 552 receives an executable program containing the access information. In one of these embodiments, the application streaming client 552 receives an executable program capable of displaying on the local machine 10 application-output data generated from an execution of the application program on a remote machine. In another of these embodiments, the application streaming client 552 receives an executable program capable of retrieving the application program across an application streaming session and executing the application program in an isolation environment on the local machine 10. In this embodiment, the application streaming client 552 may execute the received executable program. In still another of these embodiments, the remote machine 30 selects an executable program to provide to the local machine 10 responsive to performing an application resolution as described above.

Figure 9:
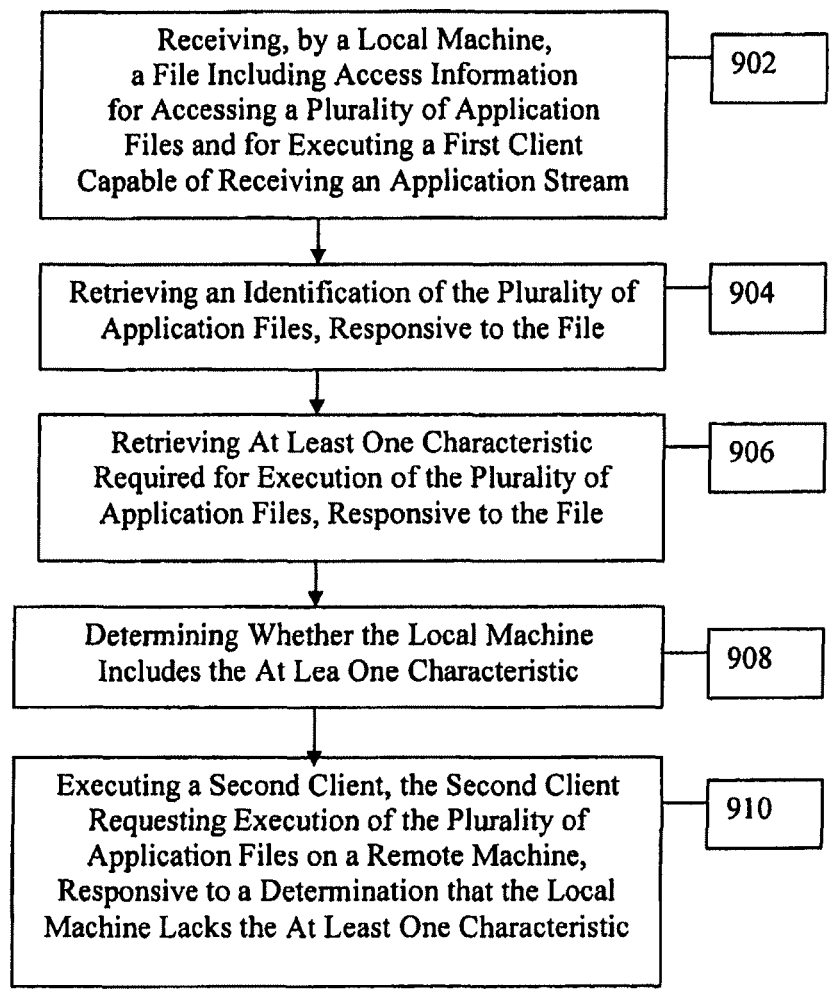
FIG. 9 is a flow diagram depicting one embodiment of steps taken in a method for executing an application program.

Referring now to FIG. 9, a flow diagram depicts one embodiment of steps taken in a method for executing an application. As described above in FIG. 7, regarding step 214, a local machine 10 receives and executes the plurality of application files. In brief overview, the local machine 10 receives a file including access information for accessing a plurality of application files and for executing a first client capable of receiving an application stream (step 902). The local machine 10 retrieves an identification of the plurality of application files, responsive to the file (step 904). The local machine 10 retrieves at least one characteristic required for execution of the plurality of application files, responsive to the file (step 906). The local machine 10 determines whether the local machine 10 includes the at least one characteristic (step 908). The local machine 10 executes a second client, the second client requesting execution of the plurality of application files on a remote machine, responsive to a determination that the local machine 10 lacks the at least one characteristic (step 910).

Referring to FIG. 9, and in greater detail, the local machine 10 receives a file including access information for accessing a plurality of application files and for executing a first client capable of receiving an application stream (step 902). In one embodiment, the local machine 10 receives access information including an identification of a location of a plurality of application files comprising an application program. In another embodiment, the local machine 10 receives the file responsive to requesting execution of the application program. In still another embodiment, the access information includes an indication that the plurality of application files reside on a remote machine 30' such as an application server or a file server. In yet another embodiment, the access information indicates that the local machine 10 may retrieve the plurality of application files from the remote machine 30 over an application streaming session.

The local machine 10 retrieves an identification of the plurality of application files, responsive to the file (step 904). In one embodiment, the local machine 10 identifies a remote machine on which the plurality of application files reside, responsive to the file including access information. In another embodiment, the local machine 10 retrieves from the remote machine 30 a file identifying the plurality of application files. In some embodiments, the plurality of application files comprise an application program. In other embodiments, the plurality of application files comprise multiple application programs. In still other embodiments, the plurality of application files comprise multiple versions of a single application program.

Figure 10:
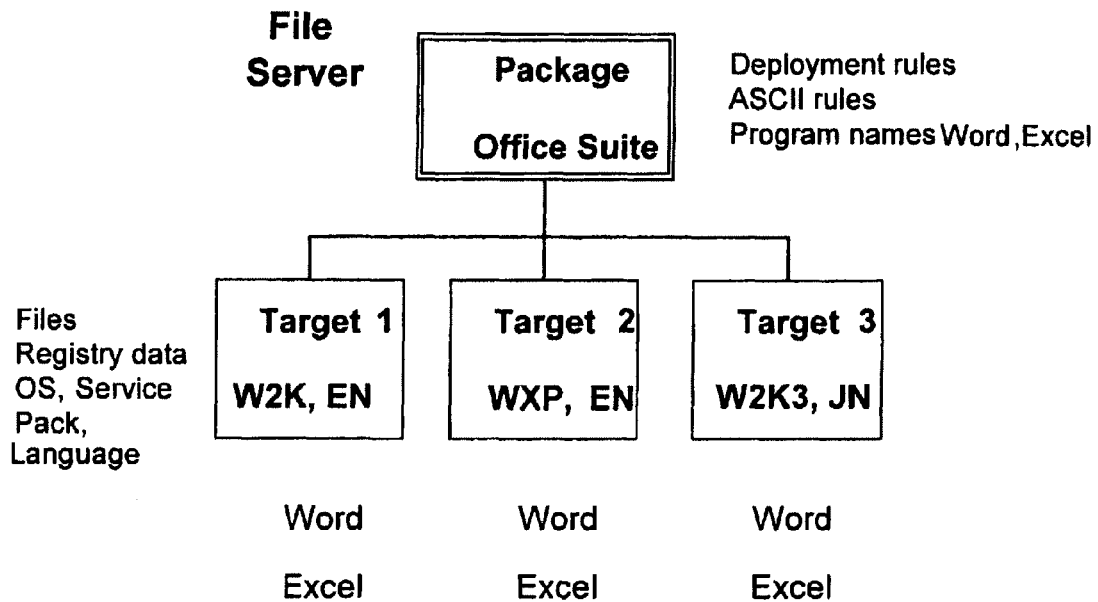
FIG. 10 is a flow diagram depicting one embodiment of a plurality of application files residing on a remote machine.

Referring ahead to FIG. 10, a flow diagram depicts one embodiment of a plurality of application files residing on a remote machine 30', such as file server 540. In FIG. 10, a plurality of application files, referred to as a package, includes application files comprising three different versions of one or more application programs.

In one embodiment, each subset of application files comprising a version of one or more application programs and stored within the package is referred to as a target. Target 1, for example, includes a version of a word processing application program and of a spreadsheet program, the version compatible with the English language version of the Microsoft Windows 2000 operating system. Target 2 includes a version of a word processing application program and of a spreadsheet program, the version compatible with the English language version of the Microsoft XP operating system. Target 3 a version of a word processing application program and of a spreadsheet program, the version compatible with the Japanese language version of the Microsoft Windows 2000 operating system with service pack 3.

Returning now to FIG. 9, in some embodiments, the file retrieved from the remote machine 30 hosting the plurality of application files includes a description of the package and the targets included in the plurality of application files. In other embodiments, the file retrieved from the remote machine 30 identifies the plurality of application files comprising an application program requested for execution by the local machine 10.

The local machine 10 retrieves at least one characteristic required for execution of the plurality of application files, responsive to the file (step 906). In some embodiments, the local machine 10 may not execute an application program unless the local machine includes certain characteristics. In one of these embodiments, different application programs require local machines 10 to include different characteristics from the characteristics required by other application programs. In another of these embodiments, the local machine 10 receives an identification of the at least one characteristic required for execution of the plurality of application files comprising the application program requested by the local machine 10.

The local machine determines whether the local machine 10 includes the at least one characteristic (step 908). In one embodiment, the local machine 10 evaluates an operating system on the local machine 10 to determine whether the local machine 10 includes the at least one characteristic. In another embodiment, the local machine 10 identifies a language used by an operating system on the local machine 10 to determine whether the local machine 10 includes the at least one characteristic. In still another embodiment, the local machine 10 identifies a revision level of an operating system on the local machine 10 to determine whether the local machine 10 includes the at least one characteristic. In yet another embodiment, the local machine 10 identifies an application version of an application program residing on the local machine 10 to determine whether the local machine 10 includes the at least one characteristic. In some embodiments, the local machine 10 determines whether the local machine 10 includes a device driver to determine whether the local machine 10 includes the at least one characteristic. In other embodiments, the local machine 10 determines whether the local machine 10 includes an operating system to determine whether the local machine 10 includes the at least one characteristic. In still other embodiments, the local machine 10 determines whether the local machine 10 includes a license to execute the plurality of application files to determine whether the local machine 10 includes the at least one characteristic.

The local machine 10 executes a second client, the second client requesting execution of the plurality of application files on a remote machine 30, responsive to a determination that the local machine 10 lacks the at least one characteristic (step 910). In one embodiment, when the local machine 10 determines that the local machine 10 lacks the at least one characteristic, the local machine 10 does not execute the first client capable of receiving an application stream. In another embodiment, a policy prohibits the local machine 10 from receiving the plurality of application files over an application stream when the local machine 10 lacks the at least one characteristic. In some embodiments, the local machine 10 determines that the local machine 10 does include the at least one characteristic. In one of these embodiments, the local machine 10 executes the first client, the first client receiving an application stream comprising the plurality of application files from a remote machine 30 for execution on the local machine.

In some embodiments, the local machine 10 executes the second client requesting execution of the plurality of application files on a remote machine upon determining that the local machine 10 lacks the at least one characteristic. In one of these embodiments, the second client transmits the request to a remote machine 30 hosting the plurality of application files. In another of these embodiments, the remote machine 30 executes the plurality of application files comprising the application program and generates application-output data. In still another of these embodiments, the second client receives application-output data generated by execution of the plurality of application files on the remote machine. In some embodiments, the second client receives the application-output data via an Independent Computing Architecture presentation level protocol or a Remote Desktop Windows presentation level protocol or an X-Windows presentation level protocol. In yet another of these embodiments, the second client displays the application-output on the local machine 10.

In some embodiments, the second client transmits the request to a remote machine 30 that does not host the plurality of application files. In one of these embodiments, the remote machine 30 may request the plurality of application files from a second remote machine 30 hosting the plurality of application files. In another of these embodiments, the remote machine 30 may receive the plurality of application files from the second remote machine 30 across an application streaming session. In still another of these embodiments, the remote machine 30 stores the received plurality of application files in an isolation environment and executes the application program within the isolation environment. In yet another of these embodiments, the remote machine transmits the generated application-output data to the second client on the local machine.

Referring back to FIG. 5, in one embodiment, the first client, capable of receiving the application stream, is an application streaming client 552. The application streaming client 552 receiving the file, retrieving an identification of a plurality of application files and at least one characteristic required for execution of the plurality of application files, responsive to the file, and determining whether the local machine 10 includes the at least one characteristic. In another embodiment, the second client is a client agent 560. In some embodiments, the client agent 560 receives the file from the application streaming client 552 responsive to a determination, by the application streaming client 552, that the local machine 10 lacks the at least one characteristic.

In some embodiments, an application 566 executing on the local machine 10 enumerates files associated with the application 566 using the Win32 FindFirstFile( ) and FindNextFile( ) API calls. In one of these embodiments, a plurality of application files comprise the application 566. In another of these embodiments, not all files in the plurality of application files reside on the local machine 10. In still another of these embodiments, the streaming service 554 retrieved the plurality of application file in an archived files but extracted only a subset of the plurality of application files. In yet another of these embodiments, the streaming service 554 and the file system filter driver 564 provide functionality for satisfying the enumeration request, even when the requested file does not reside on the local machine 10.

In one embodiment, the functionality is provided by intercepting the enumeration requests and providing the data as if all files in the plurality of application files reside on the local machine 10. In another embodiment, the functionality is provided by intercepting, by the file system filter driver 564, an enumeration request transmitted as an IOCTL command, such as IRP_MJ_DIRECTORY_CONTROL IOCTL. When the file system filter driver 564 intercepts the call, the file system filter driver 564 redirects the request to the streaming service 554. In one embodiment, the file system filter driver 564 determines that the requested enumeration resides in an isolation environment on the local machine 10 prior to redirecting the request to the streaming service 554. In another embodiment, the streaming service 554 fulfills the request using a file in the plurality of application files, the file including an enumeration of a directory structure associated with the plurality of application files. In still another embodiment, the streaming service 554 provides the response to the request to the file system filter driver 564 for satisfaction of the enumeration request.

Figure 11:
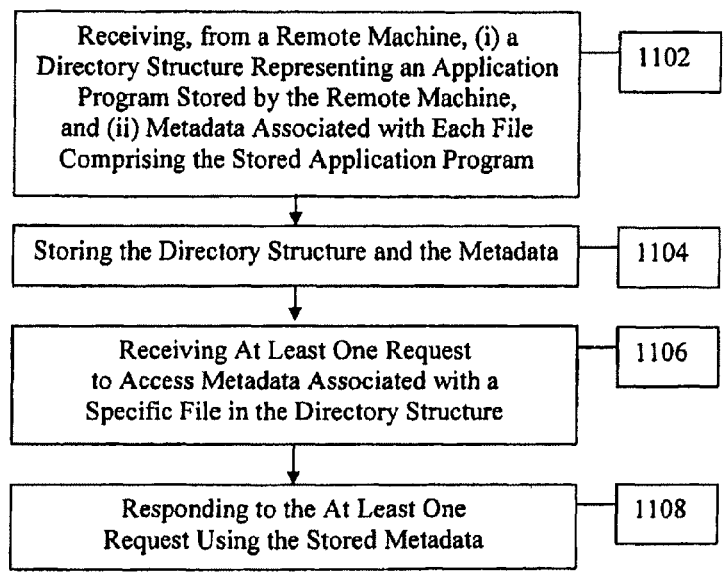
FIG. 11 is a flow diagram depicting one embodiment of the steps taken in a method for responding locally to requests for file metadata associated with files stored remotely.

Referring now to FIG. 11, a flow diagram depicts one embodiment of the steps taken in a method for responding locally to requests for file metadata associated with files stored remotely. In brief overview, (i) a directory structure representing an application program stored by the remote machine, and (ii) metadata associated with each file comprising the stored application program, are received from a remote machine (step 1102). The directory structure and the metadata are stored (step 1104). At least one request to access metadata associated with a specific file in the directory structure is received (step 1106). The at least one request is responded to using the stored metadata (step 1108).

Referring to FIG. 11 in greater detail, a directory structure representing an application program stored by the remote machine, and metadata associated with each file comprising the stored application program, are received from a remote machine (step 1102). In one embodiment, the streaming service 554 receives the directory structure and the metadata. In another embodiment, the streaming service 554 receives the directory structure and the metadata when the streaming service 554 retrieves a plurality of application files comprising the stored application program. In still another embodiment, the directory structure and the metadata are stored in a file in the plurality of application files.

In one embodiment, the metadata associated with each file comprises an alternate name for the at least one file. In another embodiment, the metadata associated with each file includes a short name for the at least one file, the name having a length of eight characters, a dot, and a three-character extension. In still another embodiment, the metadata associated with each file includes a mapping between the alternate name for the at least one file and the short name for the at least one file. In some embodiments, a file in the plurality of application files has an alternate filename. In one of these embodiments, when the file is retrieved by a streaming service 554 to a local machine, the file is associated with a short name, responsive to the mapping between the alternate name for the file and the short name for the at least one file.

The directory structure and the metadata are stored (step 1104). In one embodiment, the directory structure and the metadata are stored in an isolation environment 556. In another embodiment, the directory structure and the metadata are stored in a cache memory element. In still another embodiment, the directory structure representing an application program stored by the remote machine is used to generate an enumeration of a directory structure representing an application program executing on the local machine.

At least one request to access metadata associated with a specific file in the directory structure is received (step 1106). In one embodiment, the request is a request for enumeration of the file. In another embodiment, the request is a request to determine whether a copy of the file comprising the stored application program resides locally.

In one embodiment, the request is made by an application 566 executing in an isolation environment on a local machine. In another embodiment, the request is made by the application streaming client 552. In still another embodiment, the request is made on behalf of the application 566.

In one embodiment, the request is intercepted by a file system filter driver 564. In another embodiment, the request is forwarded to the application streaming client 552 by the file system filter driver 564. In still another embodiment, the request is forwarded to the streaming service 554 by the file system filter driver 564.

In some embodiments, the request is hooked by a function that replaces the operating system function or functions for enumerating a directory. In another embodiment, a hooking dynamically-linked library is used to intercept the request. The hooking function may execute in user mode or in kernel mode. For embodiments in which the hooking function executes in user mode, the hooking function may be loaded into the address space of a process when that process is created. For embodiments in which the hooking function executes in kernel mode, the hooking function may be associated with an operating system resource that is used in dispatching requests for file operations. For embodiments in which a separate operating system function is provided for each type of file operation, each function may be hooked separately. Alternatively, a single hooking function may be provided which intercepts create or open calls for several types of file operations.

The at least one request is responded to using the stored metadata (step 1108). In one embodiment, the file system filter driver 564 responds to the request. In another embodiment, the application streaming client 552 responds to the request. In still another embodiment, the streaming service 554 responds to the request. In one embodiment, the stored metadata is accessed to respond to the at least one request. In another embodiment, the request is responded to with a false indication that a remote copy of the file resides locally.

In one embodiment, a Windows Operating System FindFirst operation is satisfied responsive to the received metadata. In another embodiment, a Windows Operating System FindNext operation is satisfied responsive to the received metadata. In still another embodiment, an operation for identifying a root node in a directory structure is satisfied responsive to the received metadata. In some embodiments, an application layer API such as WIN32_FIND_DATA API is used to respond to the operation. In other embodiments, a kernel layer API such as FILE_BOTH_DIR_INFORMATION is used to respond to the operation.

In one embodiment, the metadata satisfies an operation for identifying a time of access associated with a node in a directory structure. In another embodiment, the metadata satisfies an operation for identifying a time of modification associated with a node in a directory structure. In still another embodiment, the metadata satisfies an operation for identifying a modified node in a directory structure.

Figure 12:
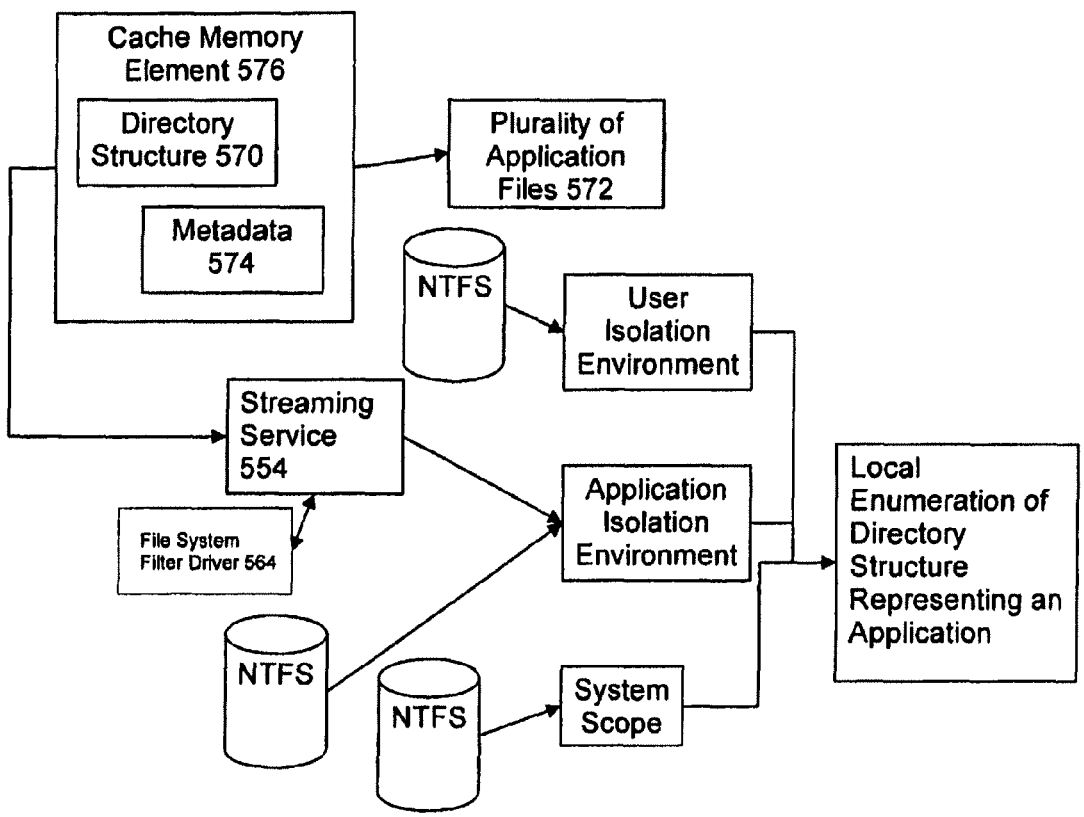
FIG. 12 is a block diagram depicting one embodiment of a system for responding locally to requests for file metadata associated with files stored remotely.

Referring now to FIG. 12, a block diagram depicts one embodiment of a system for responding locally to requests for file metadata associated with files stored remotely, including a streaming service 554, a file system filter driver 564, a directory structure 570, a plurality of application files 572, metadata 574, and a cache memory element 576. In brief overview, the directory structure 570 identifies a plurality of files associated with at least one application program. The metadata 574 is associated with at least one of the plurality of files, at least one of the plurality of files residing on a remote machine. In one embodiment, the directory structure 570 includes the metadata 574. The cache memory element 576 stores the directory structure 570. The file system filter driver 564 intercepts a request to access metadata associated with the at least one remotely stored file, accesses the cache memory element, and responds to the at least one request using the stored directory structure.

In some embodiments, the streaming service 554 receives the directory structure 570 and metadata 574. In one of these embodiments, the directory structure 570 represents a plurality of application files 572 associated with an application program, the plurality of application files 572 residing on a remote machine, such as the remote machine 30. In another of these embodiments, the metadata 574 comprises information for responding to a Windows Operating System FindFirst request. In still another of these embodiments, the metadata 574 comprises information for responding to a Windows Operating System FindNext request. In yet another of these embodiments, the metadata 574 comprises information for responding to a request for identification of a root node in a directory structure. In another of these embodiments, the metadata 574 comprises information for responding to a request for identification of a node in a directory structure. In some embodiments, an application layer API such as WIN32_FIND_DATA API is used to respond to the operation. In other embodiments, a kernel layer API such as FILE_BOTH_DIR_INFORMATION is used to respond to the operation.

In some embodiments, small amounts of metadata 574 about a file may be stored directly in the literal filename, such as by suffixing the virtual name with a metadata indicator, where a metadata indicator is a string uniquely associated with a particular metadata state. The metadata indicator may indicate or encode one or several bits of metadata. Requests to access the file by virtual filename check for possible variations of the literal filename due to the presence of a metadata indicator, and requests to retrieve the name of the file itself are hooked or intercepted in order to respond with the literal name. In other embodiments, one or more alternate names for the file may be formed from the virtual file name and a metadata indicator, and may be created using hard link or soft link facilities provided by the file system. The existence of these links may be hidden from applications by the isolation environment by indicating that the file is not found if a request is given to access a file using the name of a link. A particular link's presence or absence may indicate one bit of metadata for each metadata indicator, or there may be a link with a metadata indicator that can take on multiple states to indicate several bits of metadata. In still other embodiments, where the file system supports alternate file streams, an alternate file stream may be created to embody metadata, with the size of the stream indicating several bits of metadata. In still other embodiments, a file system may directly provide the ability to store some 3rd party metadata for each file in the file system. In yet other embodiment, a separate sub-scope may be used to record deleted files, and existence of a file (not marked as a placeholder) in that sub-scope is taken to mean that the file is deleted.

In one embodiment, data in a user isolation environment, an application isolation environment, and a system scope is combined to form a local enumeration of a directory structure representing an application. In another embodiment, the streaming service 554 accesses metadata 574 and the directory structure 570 to populate the application isolation environment. In still another embodiment, the file system filter driver 564 generates the local enumeration of the directory structure. In yet another embodiment, the local enumeration of the directory structure identifies at least one file in the plurality of application files 572, the at least one file residing on a remote machine and not on the local machine. In some embodiments, the local enumeration of the directory structure is stored on the cache memory element 576. In other embodiments, the streaming service 554 generates the application isolation environment and the local enumeration of the directory structure.

In one embodiment, the file system filter driver 564 intercepts a request transmitted to a system scope for access to the local enumeration of the directory structure. In another embodiment, file system filter driver 564 generates the local enumeration after intercepting the request. In still another embodiment, the file system filter driver 564 redirects the request for the local enumeration to the user isolation environment. In yet another embodiment, the file system filter driver 564 redirects the request for the local enumeration to the application isolation environment.

In some embodiments, the file system filter driver 564 intercepts a request for access to a file identifies in the local enumeration of the directory, the file residing on a remote machine. In one of these embodiments, the file system filter driver 564 requests retrieval of the file by the streaming service 554, as described in greater detail in connection with FIG. 13 below.

As applications running in an isolation environment make requests for files, a filter driver intercepts these requests. If the request is to open a file, the filter driver will first redirect the request to an isolation environment, to determine whether the request may be satisfied by the isolation environment. If the call is successful, the filter driver will respond to the request with the instance of the file located in the isolation environment.

However if the requested file does not reside in the isolation environment, the filter driver sends a request to streaming service 554 to retrieve the file from the plurality of application files, blocks until the request is complete, and then retries the original open. In some embodiments, the functionality of the streaming service 554 for retrieving files from the plurality of application files upon receipt of a request from the filter driver is referred to as "on-demand caching."

Figure 13:
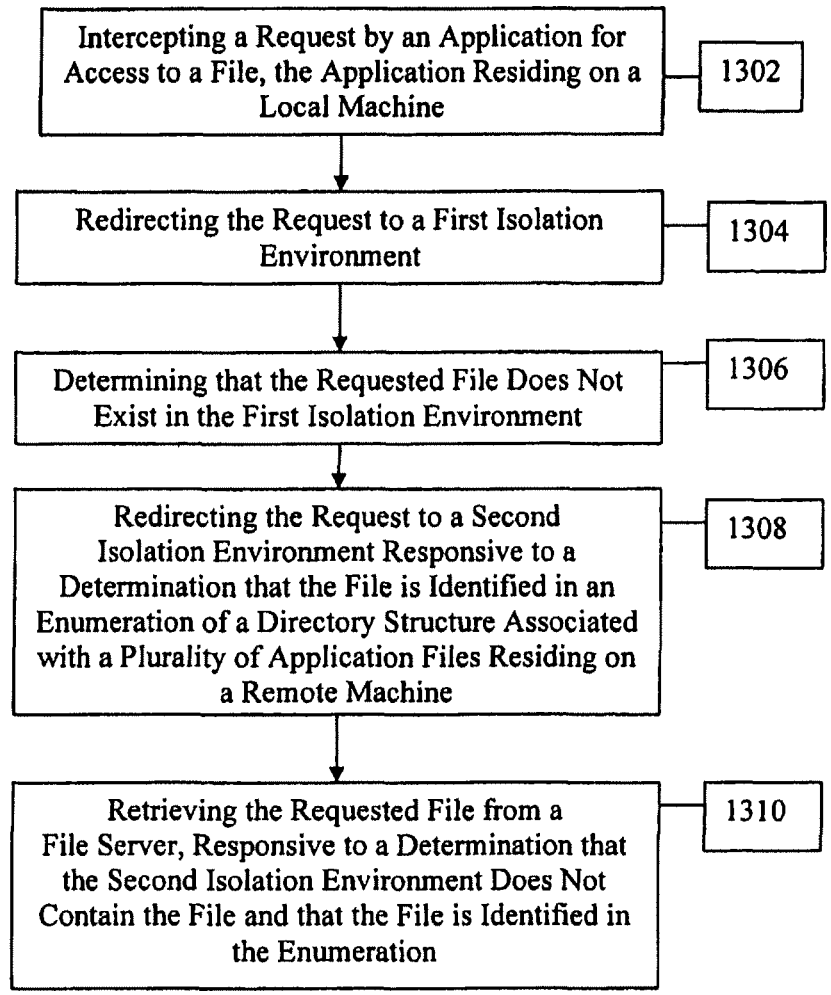
FIG. 13 is a flow diagram depicting one embodiment of the steps taken in a method for accessing a remote file in a directory structure associated with an application program executing locally.

Referring now to FIG. 13, a flow diagram depicts one embodiment of the steps taken in a method for accessing a remote file in a directory structure associated with an application program executing locally. In brief overview, a request by an application for access to a file is intercepted (step 1302). The request is redirected to a first isolation environment (step 1304). A determination is made that the requested file does not exist in the first isolation environment (step 1306). The request is redirected to a second isolation environment responsive to a determination that the file is identified in an enumeration of a directory structure associated with a plurality of application files residing on a remote machine (step 1308). The requested file is retrieved from the remote machine, responsive to a determination that the second isolation environment does not contain the file and that the file is identified in the enumeration (step 1310).

Referring to FIG. 13, and in greater detail, a request by an application for access to a file is intercepted (step 1302). In one embodiment, the request is intercepted by a file system filter driver. In another embodiment, the file system filter driver intercepts all requests for access to files. In still another embodiment, an application streaming client 552 intercepts the request. In some embodiments, a request by an application for access to an executable file is intercepted. In other embodiments, a request by an application for access to a file, a portion of the application executing on a local machine 10 is intercepted.

The request is redirected to a first isolation environment (step 1304). In one embodiment, the application executes within the first isolation environment. In one embodiment, the application is an application program such as a word processing program or spreadsheet program. In another embodiment, the application is the application streaming client 552. In still another embodiment, the application is a component within the application streaming client 552 attempting to launch an application program on behalf of a user of the local machine 10. In another embodiment, the file system filter driver redirects the request to the first isolation environment.

A determination is made that the requested file does not exist in the first isolation environment (step 1306). In one embodiment, the file system filter driver receives an indication that the requested file does not exist in the first isolation environment.

The request is redirected to a second isolation environment responsive to a determination that the file is identified in an enumeration of a directory structure associated with a plurality of application files residing on a remote machine (step 1308). In one embodiment, the enumeration of the directory structure is received with access information regarding execution of the first application. In another embodiment, the enumeration identifies a plurality of application files comprising a second application. In this embodiment, the first application is a local copy of the second application.

The requested file is retrieved from the remote machine, responsive to a determination that the second isolation environment does not contain the file and that the file is identified in the enumeration (step 1310). In one embodiment, the requested file is retrieved from a second remote machine. In another embodiment, the requested file is retrieved from a file server. In some embodiments, the enumeration of the directory structure identifies a plurality of application files residing on the local machine. In other embodiments, the enumeration of the directory structure indicates that the plurality of application files resides on the local machine. In one of these embodiments, when the application requests access to the file in the plurality of application files which the enumeration of the directory structure has indicated resides on the local machine, the file is acquired from the file server upon interception of the access request. In another of these embodiments, the file server streams the requested file to the local machine. In still another of these embodiments, upon receiving the requested file, the requested file is stored in the second isolation environment. In still other embodiments, when the application requests access to the file in the plurality of application files which the enumeration of the directory structure has indicated resides on the local machine, a copy of the file is provided to the application from a local cache.

In some embodiments, the requested file is encrypted. In other embodiments, the requested file is stored in an encrypted form. In still other embodiments, the application requesting the file may be prevented from decrypting the requested file if the application lacks authorization to access the requested file.

In one embodiment, a determination is made that the enumeration of the directory structure does not identify the file. In this embodiment, the request to access the file may be redirected to an environment outside the first isolation environment and outside the second isolation environment.

In some embodiments, a second request to access the file is intercepted. In one of these embodiments, the request to access the file is made by a second application. In another of these embodiments, the second application executes in a third isolation environment. In still another of these embodiments, the request is redirected to the second isolation environment, responsive to a determination that the file is enumerated in the enumeration and that the second isolation environment does contain the file. The determination may be made that the local machine stored the file in the second isolation environment upon receipt of the file from the file server. In yet another embodiment, the file is stored in the third isolation environment.

Figure 14:
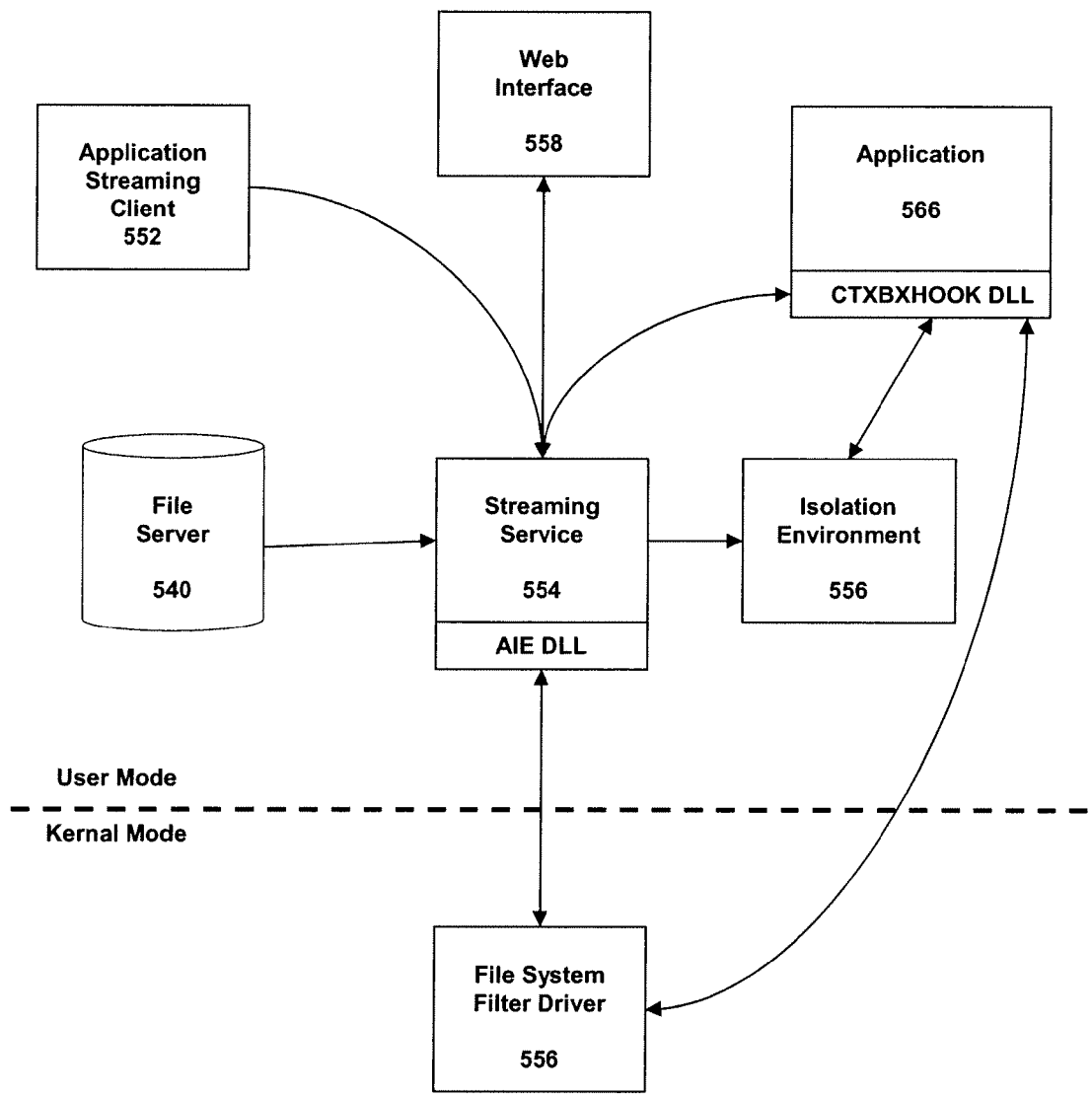
FIG. 14 is a block diagram depicting one embodiment of a system for accessing a file in a directory structure associated with an application.

Referring now to FIG. 14, a block diagram depicts one embodiment of a system for accessing a file in a directory structure associated with an application. In brief overview, a local machine 10 includes an application streaming client 552, a streaming service 554, an isolation environment 556, a file system filter driver 564, and a first application 566. The local machine 10 may interact with a file server 540, a remote machine 30, a web interface 558, and a second application 566'.

The local machine 10 initializes the application streaming client 552 to execute the first application 566. In one embodiment, the application streaming client 552 initializes a streaming service 554 to retrieve and execute the first application 566. In some embodiments a plurality of application files comprise the first application 566. in one of these embodiments, the streaming service 554 retrieves the plurality of application files and stores them in the isolation environment 566. In another of these embodiments, the streaming service 554 identifies a location of a remote machine on which the plurality of application files resides but does not retrieve the plurality of application files. In still another of these embodiments, the streaming service 554 retrieves a subset of the files in the plurality of application files. In yet another of these embodiments, the streaming service 554 retrieves an archive file containing the plurality of application files.

In one embodiment, the first application 566 comprises a local copy of a second application 566' residing on a remote machine 30. In another embodiment, the plurality of application files reside on the remote machine 30 and comprise the second application 566' residing on a remote machine 30. In still another embodiment, to execute the second application 566', the local machine 10 retrieves the plurality of application files, creating the first application 566 on the local machine, and executes the first application 566. In some embodiments, the applications 566 and 566' are user applications such as word processing applications or spreadsheet applications or presentation applications.

In some embodiments, the plurality of application files include a file identifying a directory structure associated with the plurality of application files on the remote machine 30. In one of these embodiments, the file includes metadata about each application file in the plurality of application files. In another of these embodiments, the streaming service 554 retrieves the metadata from the file to generate an enumeration of the directory structure associated with the plurality of application files, as described in connection with FIG. 12 above. In still another of these embodiments, the streaming service 554 stores the enumeration of the directory structure associated with the plurality of application files comprising the second application 566'. In some embodiments, the streaming service 554 stores the enumeration in a second isolation environment.

In one embodiment, the streaming service 554 retrieves an initial executable file associated with the first application 566. In another embodiment, the streaming service 554 executes the first application 566 on the local machine 10 upon retrieval of the initial executable file. In still another embodiment, the first application 566 requests access to other files in the plurality of application files as the files are needed for continued execution of the first application 566. In some embodiments, the first application 566 executes in the isolation environment 556.

The file system filter driver 564 intercepts requests by the first application 566 executing within the isolation environment 556 for access to a file in the plurality of application files. The file system filter driver 564 redirects the request to the isolation environment 556. If the requested file resides in the isolation environment 556, access to the requested file is provided to the first application 566.

If the requested file does not reside in the isolation environment 556, the file system filter driver 564 redirects the request to a second isolation environment. In one embodiment, the second isolation environment includes the enumeration of the directory structure generated by the streaming service 554 and associated with the plurality of application files comprising the second application 566'. In another embodiment, a determination is made that the requested file is identified in the enumeration of the directory structure.

In some embodiments, the streaming service 554 provides a semaphore to the isolation environment 556. In one of these embodiments, the file system filter driver 564, using the semaphore, indicates to the streaming service 554 that access to a file in the plurality of application files is required. In other embodiments, the file system filter driver 564 uses a thread to indicate to the streaming service 554 that access to the file is required.

Upon receiving the notification from the file system filter driver 564, the streaming service 554 retrieves the requested file from the plurality of application files. In still another of these embodiments, the streaming service 554 stores the requested file in the second application isolation environment. In one embodiment, the request for access to the file is satisfied with the instance of the file retrieved from the plurality of application files and stored in the second isolation environment. In another embodiment, the requested file is also stored in the first isolation environment.

In some embodiments, a determination is made that the second isolation environment does not contain the file and that the file is identified in the enumeration. In one of these embodiments, the file is identified in the enumeration of the directory structure associated with the plurality of application files comprising the second application 566' and the file is a file in the plurality of application files. In another of these embodiments, the streaming service 554 did not retrieve the file from the remote machine. In still another of these embodiments, the streaming service 554 did not retrieve a plurality of application files including the requested file. In yet another of these embodiments, the streaming service 554 retrieved the plurality of application files in an archived file but did not retrieve the requested file from the archive file.

In one embodiment, the streaming service 554 includes a transceiver, in communication with the file system filter driver. In another embodiment, the transceiver receives the redirected request from the file system filter driver. In still another embodiment, the transceiver forwards the request for the file to a remote machine hosting the requested file. In one embodiment, the remote machine is a file server 540. In another embodiment, the request is forwarded to a remote machine 30 which routes the request to a file server 540. In some embodiments, the file server 540 streams the requested file to the transceiver on the local machine 10. In other embodiments, the remote machine 30 streams the requested file to the transceiver on the local machine 10. In still other embodiments, upon receiving the requested file from the file server 540, the transceiver stores the received file in the second isolation environment.

In one embodiment, the file system filter driver 564 intercepts a second request for access to the file made by a third application 566", executing on the local machine 10, in a third isolation environment. In another embodiment, the file system filter driver 564 redirects the request for access to the file to the second isolation environment. In still another embodiment, the file system filter driver 564 determines that the streaming service 554 stored the received file in the second isolation environment prior to the interception of the request for access by the third application 566".

In some embodiments, upon initialization, the streaming service 554 may populate a cache in an isolation environment prior to execution of an application program. In one of these embodiments, the streaming service 554 installs a registry file into the isolation environment. In another of these embodiments, the streaming service 554 stores a mapping between a long name of a file and a short file name.

In one embodiment, to save space on the local machine, the size of the cache may be limited. In some embodiments, when the cache nears its size limit, the oldest files in the cache will automatically be purged to make room for new files. In one of these embodiments, the age of a file is determined by a timestamp maintained by the operating system indicating a time of 'last access' timestamp. In addition to the age of a file, the file type may be taken into account—binary executable files (.EXE, .DLL, etc) may be kept longer than similarly aged files of other types.

Upon initialization, the streaming service 554 may enumerate files currently in a cache, and determine the total size of the cache. After a file is added to the cache, either by an isolation environment 556 or by the streaming service 554, the streaming service 554 calls a function to inform the cache system of the new file, its location and its size. The size of each newly cached file is added to the running total of the current cache size. This new total is then compared against the cache size limit, and if the limit has been exceeded the code fires off a thread to age the cache. There can only ever be one instance of this thread running at any given time.

The thread generates a list of all files currently in the cache, sorts this list by last-access timestamp, and then starts walking down the list deleting files until we have freed enough disk space to satisfy the exit criteria for the thread. The exit criteria is based on dropping to cache size down to a level below the limit that is determined as a percentage of the limit (the default value is 10%). Deleting more than is needed to prevent exceeding the limit prevents the cache from thrashing each time a new file is added.

In some embodiments, the streaming service 554 provides the ability to copy every file in a plurality of application files comprising an application program, in a compressed file format, to the local machine 10. This ability may be referred to as "pre-caching." In one of these embodiments, when the application program is subsequently executed, all the package requests go to the local copy rather than traversing the network. These embodiments may enable a user of the local machine 10 to execute the application program at a time when the user has no access to the network.

A remote machine 30 includes functionality for monitoring application usage by a local machine 10. The remote machine 30 may monitor the status of each application used by the local machine 10, for example when execution or termination of an application. In one embodiment, the remote machine 30 requires the local machine 10 to transmit messages about the status of an application executed by the local machine 10. In another embodiment, when a local machine 10 connects to a network on which the remote machine 30 resides, the local machine 10 transmits a message indicating that the local machine 10 has connected to the network.

In one embodiment, the local machine 10 is said to have a session when the local machine 10 interacts with the remote machine 30 and executes one or more applications. In another embodiment, the remote machine 30 requires the local machine to maintain, for the duration of a session, a license authorizing execution of applications received from a remote machine. In still another embodiment, sessions have unique session identifiers assigned by the remote machine.

In one embodiment, the local machine 10 transmits the messages to the remote machine 30 with which is interacted to receive and execute the application program. In another embodiment, the local machine 10 receives from the remote machine 30 an identifier of a second remote machine, such as a session management server 562, the second remote machine receiving and storing all transmitted messages associated with the session on the local machine 10.

In some embodiments, the session management server 562 is a remote machine 30 providing license management and session monitoring services. In one of these embodiments, the session management server 562 includes a server management subsystem 508 providing these services.

In one embodiment, the local machine 10 transmits messages directly to the session management server 562. In another embodiment, the local machine 10 transmits messages to a remote machine 30, the remote machine 30 forwarding the messages to the session management server 562 with an identification of the local machine 10.

A local machine 10 may transmit a heartbeat message to the remote machine 30. In one embodiment, the heartbeat message includes a request for a license. In this embodiment, the local machine 10 may transmit the heartbeat message after receiving access information associated with an application program which the local machine 10 requested authorization to execute. The local machine 10 may transmit the heartbeat message prior to executing the application. In one embodiment, the local machine 10 includes with the heartbeat message a launch ticket received with the access information. In this embodiment, the remote machine 30 may grant the local machine 552 a license upon successful verification of the launch ticket.

In another embodiment, the heartbeat message includes an indication that the local machine has initiated execution of an application. In still another embodiment, the heartbeat message includes an indication that the local machine has terminated execution of an application. In yet another embodiment, the heartbeat message includes an indication of a failure to execute an application.

In one embodiment, the heartbeat message includes a request for an identification of a second session management server, such as a session management server 562. In another embodiment, the heartbeat message includes an indication that the local machine 10 has connected to a network on which the remote machine 30 resides.

In some embodiments, the heartbeat message includes a request to reset an application streaming session. In one of these embodiments, the local machine 10 transmits this heartbeat message when an error has occurred and a connection is terminated between a network on which the remote machine 30 resides and the local machine 10. In another of these embodiments, the local machine 10 transmits with the heartbeat message information associated with the session. In still another of these embodiments, the remote machine 30 may transmit to the local machine 10 session-related data if the session has not expired.

In another of these embodiments, if a remote machine 30 disconnects from a network on which it replies, the local machine 10 may not receive a reply to a heartbeat message transmitted to the remote machine 30. In one embodiment, the local machine 10 may re-establish a session by transmitting a message requesting a session reset to the remote machine 30. In another embodiment, the local machine 10 may re-establish a session by transmitting a message requesting a session reset to a second remote machine 30. In some embodiments, when the remote machine 30 reconnects to the network, it will create a new session for each session reset request received while the remote machine 30 was disconnected. In one of these embodiments, the new session will be associated with the reconnected and unlicensed state. In another of these embodiments, no new license will be acquired for the new session. In still another of these embodiments, when the local machine 10 executes an application, a new license will be acquired and all sessions associated with the local machine 10 will be associated with an active and licensed state.

In some embodiments, an application streaming client 552 on the local machine 10 generates the heartbeat message. In one of these embodiments, the application streaming client 552 forwards the heartbeat message to a web interface 558 for transmission to the local machine 10 for transmission to the remote machine 30. In other embodiments, the management service 504 on the remote machine 30 receives the heartbeat message from the local machine 10 via the web interface 558. In still other embodiments, a remote machine 30 comprising a collector point 240 (described above in connection with FIG. 1D) receives and stores the heartbeat messages.

In some embodiments, the application streaming client 552 requests a license from the remote machine 30. In one of these embodiments, the license authorizes execution of an application program on the local machine 552. In another of these embodiments, the remote machine 30 may access a second remote machine to provide the license. In still another of these embodiments, the remote machine 30 may provide the license to the local machine. In yet another of these embodiments, the remote machine 30 may provide a license acceptable for authorization purposes to a second remote machine. In some embodiments, the license is revoked upon termination of execution of an application program.

In some embodiments, a remote machine 30 in the farm 38 includes a license management subsystem for configuring and maintaining licenses for those subsystems that require a license to operate and for controlling the number of connections to such subsystems. In other embodiments, the remote machine 30 incorporates functionality of a license management subsystem within other subsystems, such as the application management subsystem and the session management subsystem. In one embodiment, each remote machine 30 includes a license management subsystem or the functionality associated with a license management subsystem. The license management subsystem manages two types of licenses (1) feature licenses, and (2) connection licenses. In brief overview, the license management subsystem uses feature licenses to control access to "features" of licensed software products, such as load management, and connection licenses to control the number of user connections allowed by those licensed software products. A feature can be some aspect or particular functionality of the software product, or the feature can be the entire product that will not work without a feature license.

Figure 15:
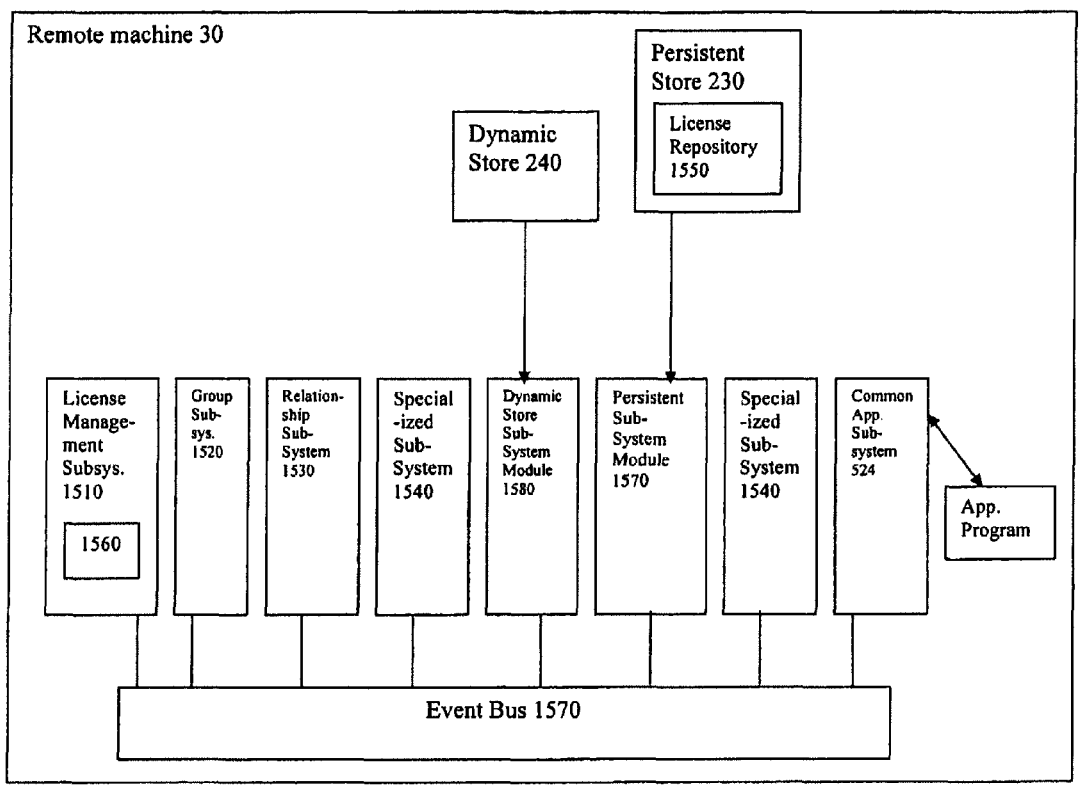
FIG. 15 is a block diagram of one embodiment of a remote machine including a license management subsystem.

FIG. 15 shows one embodiment of the remote machine 30 in the farm 38 in which the remote machine 30 includes a license management subsystem 1510, a group subsystem 1520, a persistent store system service module 1570, a dynamic store system service module 1580, a relationship subsystem 1530, a specialized remote machine subsystem 1540, and a common access point subsystem 524 in communication with an event bus 1570. Those subsystems shown in FIG. 15 are for purposes of describing the behavior of the license management subsystem 1510. The remote machine 30 can include other types of subsystems.

The license management subsystem 1510 communicates with the group subsystem 1520 over an event bus to form and maintain a logical grouping of licenses (hereafter, "license groups") to facilitate license pools, assignments, and groups. A license group includes a collection of license strings, described below, and/or other license groups. License groups collect licenses of similar features and consequently enable pooling of licenses. A pooled license is a license that is available for use by any remote machine 30 in the farm 38. Each license group holds the collective capabilities of the licenses in the license group and the other license subgroups (i.e. other license groups within a license group). Information relating to license pools is, in one embodiment, maintained in the dynamic store 240. In this embodiment, each license management subsystem 1610 stores locally the total number of licenses and the number of license assigned to a remote machine 30 in the farm 38. Upon granting a pooled license, the granting license management subsystem 1510 makes an entry in the dynamic store 240 indicating that a pooled license is "in use." Every other license management subsystem 1510 recognizes that such pooled license is unavailable for granting. In one particular embodiment, the dynamic store 240 store remote machine ID/client ID pairs associated with each license group to identify pooled licenses that are in use.

The relationship subsystem 1530 maintains associations between licenses and remote machines 30 and between license groups and remote machines 30. The associations define the number of licenses for each license and license group that only the associated remote machine 30 may obtain (i.e., "local licenses"). A local license is a license that is assigned to one remote machine in the farm 38 and is not shared by other remote machines 38. The license management subsystem 1510 communicates with the relationship subsystem 1530 to create, delete, query, and update such associations. The common access point subsystem 524 provides remote procedure calls (RPCs) for use by software products residing on the remote machine 30. These RPC interfaces enable such software products to communicate through the common access subsystem 524 to access licensing information.

Still referring to FIG. 15, the specialized remote machine subsystem 1540 communicates with the license management subsystem 1510 to obtain a feature license for each capability of the specialized remote machine subsystem 1540 for which a license is required. This occurs at initialization of specialized remote machine subsystem 1540 and after any license event. If unable to obtain the feature license, the specialized remote machine subsystem 1540 restricts the functionality that the subsystem would provide with a license. Also, the specialized remote machine subsystem 1540 uses the license management subsystem 1510 to obtain client connection licenses whenever a client session is initiated with the remote machine 30.

The license management subsystem 1510 communicates with the persistent store system service module 352 to store feature and connection licenses in a license repository 1550 as license strings formed in accordance with a naming convention. The license repository 1550 resides in the persistent store 230. Cyclical redundancy checks (CRC) prevent tampering of the licenses while such licenses are stored in the license repository 1550. The license management subsystem 1510 also stores information related to the license strings in the license repository 1550. For example, the information may indicate which licenses are assigned to which remote machines 30 of the farm 38 and, in some embodiments, the activation status of each license. In one embodiment, a connection license table 1560 stores identifiers of those local machines that have obtained a connection license.

In one embodiment, the license management subsystem 1510 supports events from subsystems requesting use of a licensed capability, such as a request for an available pooled license. The event includes the UID of the subsystem requesting the license and the UID of the remote machine 30 upon which that subsystem resides. The event also contains the license type requested (i.e., feature or connection license) in the form of a license group ID. The actual license group ID stored in the persistent store 230 is arbitrary, but adherence to the naming convention provides flexibility for the future addition of new software products (i.e., subsystems) to the remote machine 30.

The event sent by a requesting subsystem seeking a license includes (1) an indication of the license group type, the identity of the local machine and remote machine requesting the license, and a "force acquire" flag. An indication of license group type may include identification of a feature license, such as a load management, or a connection type license, such as a software application product. The field identifying the local machine and remote machine seeking the license may include the unique identifier associated with the remote machine and the local machine. The force acquire flag may be used, for example, to reacquire connection licenses after a license change event. A license change event indicates that licensing information in the persistent store 230 has changed; for example, a license has been deleted, added, or assigned. Upon a license change event, each remote machine 30 attempts to reacquire all connection licenses that it possessed before the license change event because the particular cause of the license change event is unknown to that remote machine. This flag, if set, indicates that a connection license may be acquired even if doing so increases the number of connections to the remote machine 30 in excess of the predetermined maximum number of allowable connections. No new connection licenses are subsequently granted until the number of connection licenses in use drops below this predetermined maximum number. In this manner, a local machine connection will not be terminated in mid-session due to a license change event.

Figure 16:
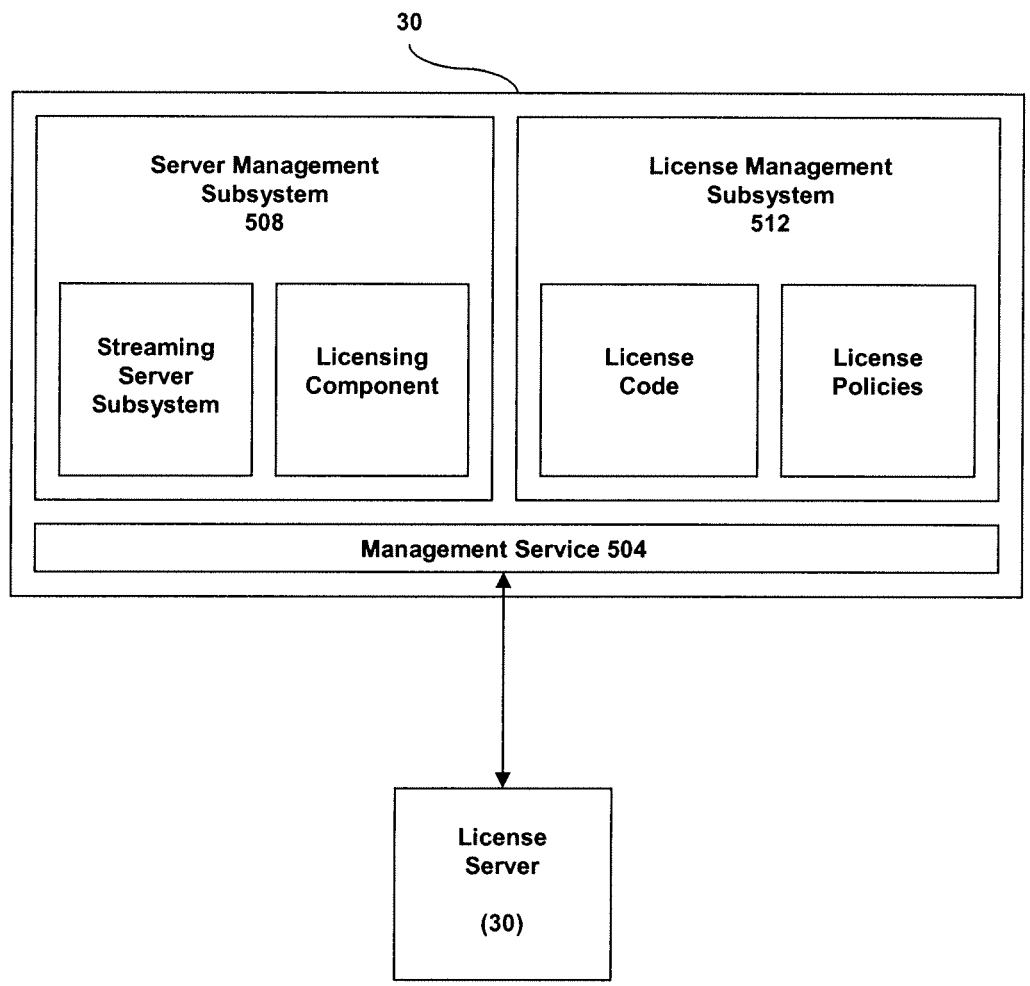
FIG. 16 is a block diagram depicting one embodiment of components in a management service on a remote machine.

Referring now to FIG. 16, a block diagram depicts one embodiment of the components involved in licensing enforcement. A remote machine 30 includes a server management subsystem 508 and a license management subsystem 512. In some embodiments, the server management subsystem 508 and the license management subsystem 512 provide the functionality of the license management subsystem 1510 described above. In other embodiments, an application management subsystem 506 and a session management subsystem 510 provide the functionality of the license management subsystem 1510 described above. In still other embodiments, other subsystems provide the functionality of the license management subsystem 1510 described above.

In one embodiment, the server management subsystem 508 may include a licensing component used to request issuance and revocation of licenses. In another embodiment, the license management subsystem 512 may apply a policy to a request for issuance or revocation of a license received from the server management subsystem 508. In still another embodiment, the license management subsystem 512 may transmit the request to a remote machine 30 providing license enforcement functionality. In some embodiments, the management service 504 may maintain a connection with a second remote machine 30 providing license enforcement functionality. In other embodiments, the remote machine 30 provides the license enforcement functionality.

In some embodiments, a license expires and ceases to be valid upon a failure of the local machine 10 to transmit a predetermined number of heartbeat messages to the remote machine. In one of these embodiments, expiration of the license revokes authorization for execution of an application program by the local machine 10.

In other embodiments, a session times out upon the expiration of a predetermined period of time. In one embodiment, the management service 504 maintains session-related data after the expiration of a license until an expiration of a session. In some embodiments, the session-related data may include information such as session name, session id, client id, client name, session start time, server name (UNC Path of File Server), application name (Unique name generated by local machine, based on browser name), alias name, session state (active/licensed, active/unlicensed, reconnected/unlicensed). In another embodiment, the local machine 10 ceases transmission of heartbeat messages and restarts transmission of heartbeat messages at a later point in time. In still another embodiment, the management service 504 may reissue a license and make the maintained session-related data available to the local machine 10 if the local machine 10 restarts transmission of heartbeat messages prior to the expiration of the session.

Figure 17:
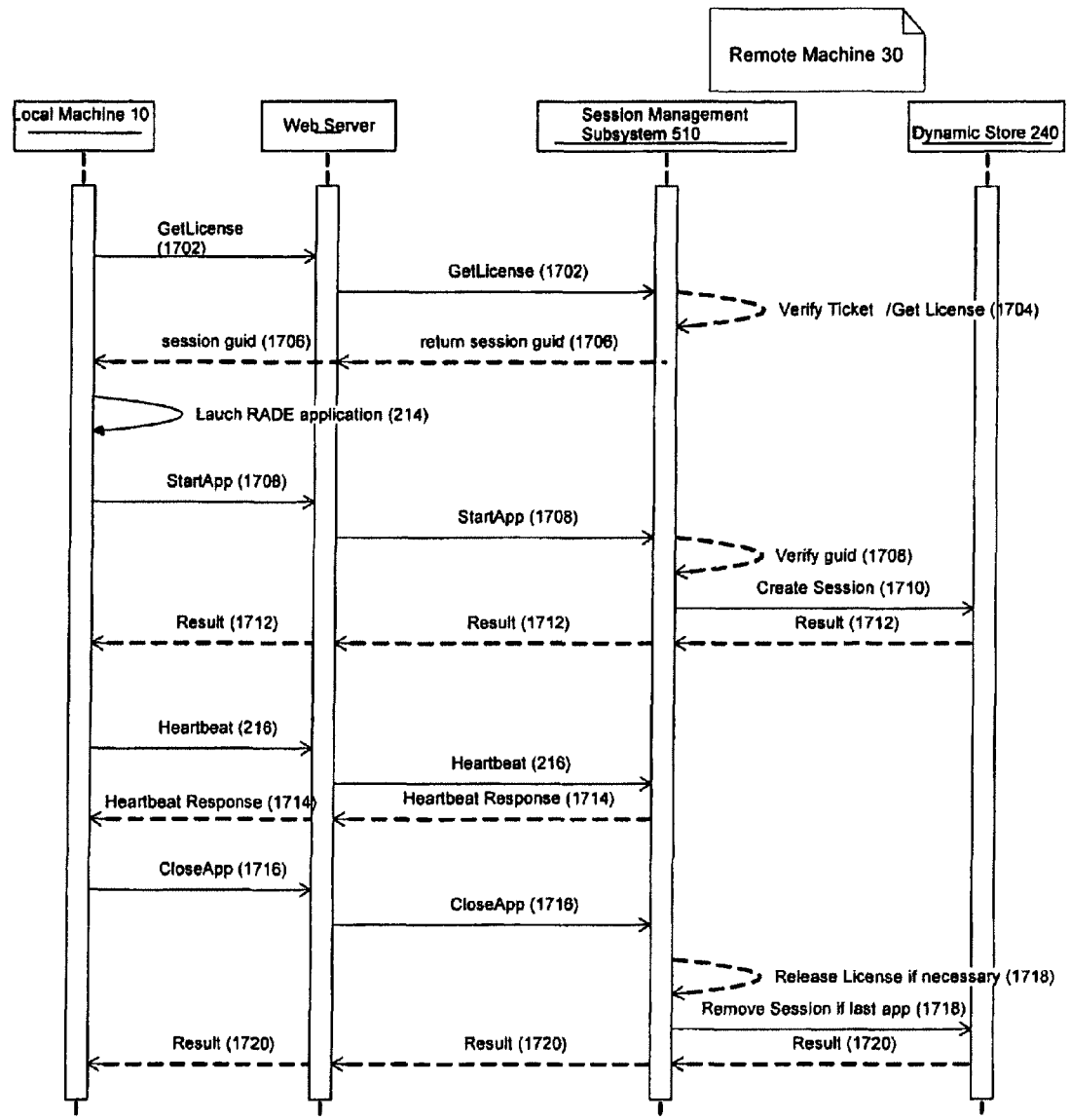
FIG. 17 is a flow diagram depicting one embodiment of the steps taken to request and maintain a license from a remote machine.

Referring now to FIG. 17, a flow diagram depicts one embodiment of the steps taken to request and maintain a license from a remote machine 30 for the duration of a session on a local machine 10. In brief overview, an application streaming client requests a license (step 1702). A remote machine 30 receives the request for the license, verifies a ticket associated with the request, and generates a license (step 1704). The remote machine 30 provides the license and information associated with the license to the local machine 10 (step 1706). The local machine 10 executes the application as described above in connection to step 214 in FIG. 7. The local machine transmits a heartbeat message indicating that the local machine has executed an application (step 1708). The remote machine 30 receives the heartbeat message and verifies identifying information transmitted with the heartbeat message (step 1708). The remote machine 30 creates a session associated with the executed application and with the local machine 10 (step 1710). A result of creating the session is transmitted to the local machine 10 (step 1712). The local machine transmits heartbeat messages throughout the execution of the application, as described above in connection with step 216 of FIG. 7. The local machine receives a response to a transmitted heartbeat message (step 1714). The local machine transmits a heartbeat message indicating a termination of an execution of the application (step 1716). The remote machine 30 receives the heartbeat message and determines whether to remove session related data and whether to release the license associated with the local machine 10 and the terminated application (step 1718). A result of the determination made by the remote machine 30 is transmitted to the local machine 10 (step 1720).

Referring now to FIG. 17, and in greater detail, an application streaming client on a local machine 10 requests a license (step 1702). In some embodiments, the local machine 10 requests the license upon receiving access information associated with an application program. In one of these embodiments, the local machine requests a license from the remote machine 30 granting authorization for execution of the application program by the local machine 10. In some embodiments, the request for the license includes a launch ticket received from the remote machine 30 with the access information. In other embodiments, an application streaming client 552 on the local machine 10 transmits the request to a web interface 558 and the web interface 558 transmits the request to the remote machine 30. In still other embodiments, a session management subsystem 510 on the remote machine receives and processes the request for the license.

A remote machine 30 receives the request for the license, verifies a ticket associated with the request, and generates a license (step 1704). In one embodiment, the remote machine 30 verifies that the local machine 10 is authorized to execute the application. In another embodiment, the remote machine 30 determines whether the local machine 10 is already associated with an existing license. In still another embodiment, the remote machine 30 determines that the local machine 10 is associated with an existing license and provides the local machine 10 with an identifier for a session management server 562 managing the existing license. In yet another embodiment, the remote machine 30 generates and provides to the local machine 10 a new license, a session identifier, and an identification of a session management server 562 managing the new license.

In some embodiments, the remote machine 30 uses a license management subsystem 1510 to respond to a license request in an embodiment in which. The license management subsystem 1510 receives a license request. The request can be for a feature license or for a connection license. The license management subsystem 1510 determines if the license has already been granted, i.e., the feature has already been started or a connection for a local machine already exists. If the license is already granted, the license management subsystem 1510 sends a "grant" event to the license requestor. If the license has not been previously granted, the license management subsystem 1510 determines if a local license, i.e., a license that has been permanently assigned to the remote machine 30, is available. In some embodiments, the license management subsystem 1510 performs this determination by checking local memory. If a local license is available, i.e., the remote machine 30 has more licenses permanently assigned than currently granted, the license management subsystem 1510 sends a "grant" event to the license requestor.

The remote machine 30 provides the license and information associated with the license to the local machine 10 (step 1706). In one embodiment, upon receiving the license, the session identifier, and the identification of the session management server 562 from the remote machine 30, the local machine 10 executes the application. The local machine 10 may execute the application as described above in connection to step 214 in FIG. 7. The local machine transmits a heartbeat message indicating that the local machine has executed an application (step 1708). In one embodiment, the local machine transmits the heartbeat message to the remote machine 30 for transmission of the heartbeat message to a session management server 562. In another embodiment, the local machine 10 transmits a heartbeat message directly to a session management server 562, responsive to an identifier of the session management server 562 received from the remote machine 30.

The remote machine 30 receives the heartbeat message and verifies identifying information transmitted with the heartbeat message (step 1708). In one embodiment, a remote machine 30' is the session management server 562. In another embodiment, the session management server 562 verifies a server identifier provided with the heartbeat message by the local machine 10. In still another embodiment, the server identifier is the identifier provided to the local machine 10 by a remote machine 30.

The remote machine 30 creates a session associated with the executed application and with the local machine 10 (step 1710). In one embodiment, the session management server 562 creates a new session associated with the executing application upon receiving the heartbeat message. In another embodiment, a third remote machine 30 creates the new session. In some embodiments, the session management server 562 stores session-related information upon the creation of the new session.

A result of creating the session is transmitted to the local machine 10 (step 1712). In some embodiments, the result confirms the creation of the session. In other embodiments, the result identifies the application or applications associated with the session. The local machine transmits heartbeat messages throughout the execution of the application, as described above in connection with step 216 of FIG. 7. In one embodiment, the local machine 10 continues to transmit heartbeat messages at regular intervals to the session management server 562 at periodic intervals throughout the execution of the application program. The local machine receives a response to a transmitted heartbeat message (step 1714). In one embodiment, the local machine 10 receives a confirmation of receipt of the heartbeat messages from the session management server 562. In another embodiment, the local machine 10 receives a command for execution from the session management server 562, responsive to the receipt of a heartbeat message by the session management server 562.

The local machine transmits a heartbeat message indicating a termination of an execution of the application (step 1716). The remote machine 30 receives the heartbeat message and determines whether to remove session related data and whether to release the license associated with the local machine 10 and the terminated application (step 1718). A result of the determination made by the remote machine 30 is transmitted to the local machine 10 (step 1720).

Figure 18:
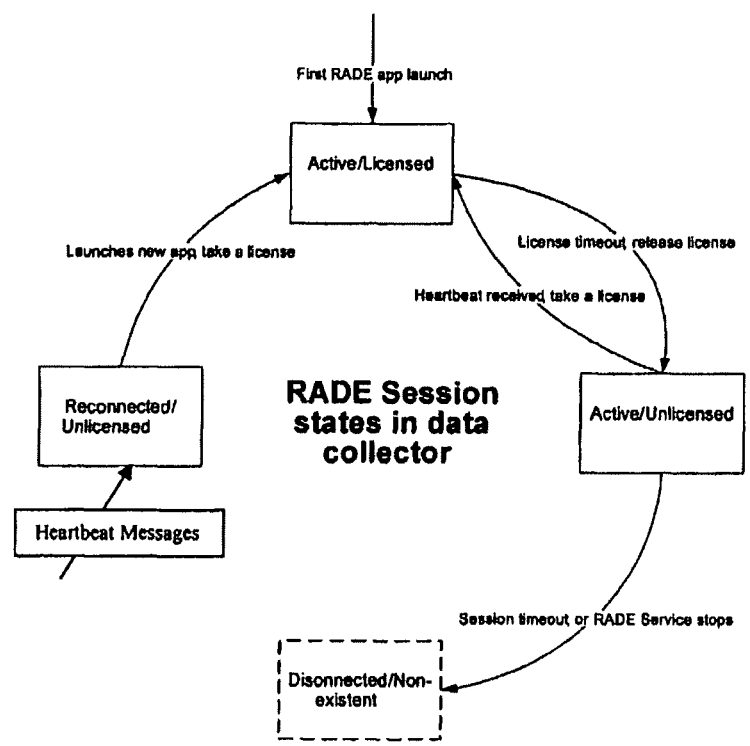
FIG. 18 is a block diagram depicting one embodiment of states that may be associated with a session monitored by a management service.

Referring now to FIG. 18, a block diagram depicts one embodiment of states that may be associated with a session monitored by a management service 504. In one embodiment, a session maintenance subsystem 510 on the management service 504 monitors a session of a local machine 10 and assigns a state to the session. In another embodiment, the session maintenance subsystem 510 maintains a list of license-related data, which may include an identifier associated with the local machine, an identifier associated with the session, a session state, and a timestamp indicating the last time the remote machine 30 received a message from the local machine 10. In some embodiments, the session maintenance subsystem 510 includes a session monitoring thread. In one of these embodiments, the session monitoring thread awakens at a periodic license timeout interval to scan the list of license-related data and update the session status of a session.

A first state that a session may be in is an active and licensed state. In one embodiment, when in this state, the local machine 10 has maintained a valid license authorizing execution of an application. In another embodiment, a session management server 562 maintains session-related data. In some embodiments, the session management server 562 stores the session-related data on a second remote machine. In one embodiment, when a local machine 10 initially executes an application, the session for the local machine is in the active and licensed state.

A second state that a session may be in is an active and unlicensed state. In one embodiment, a session is in this state when the local machine 10 fails to transmit heartbeat messages and a license to the local machine 10 has expired. In another embodiment, if a session is in this state then, while the license has expired, insufficient time has elapsed for the session to expire, and the session is considered active. In some embodiments, while a session is in this state, a remote machine 30 or a session management server 562 may store session-related data on behalf of the local machine 10. In other embodiments, if a local machine 10 transmits a heartbeat message prior to the expiration of the session, session-related data is transmitted to the local machine 10 with a new license and the session returns to the active and licensed state. In one embodiment, a remote machine 30 uses session identifiers and identifiers associated with the local machine to verify that the session has not expired and to provide the local machine with the appropriate session-related data.

A third state that a session may be in is a disconnected and non-existent state. When a session expires, session-related data is deleted.

A fourth state that a session may be in is a reconnected and unlicensed state. In one embodiment, when a session on a local machine 10 expires, session-related data is deleted. In another embodiment, when the local machine 10 transmits a new heartbeat message, a new session identifier and local machine identifier are generated for the local machine 10. In some embodiments, the local machine 10 re-authenticates to the remote machine 30, receives a new license, and enters the active and licensed state.

Table 3 summarizes the states that may be associated with a session.

TABLE 3

| Session Status | Description |
| --- | --- |
| Active\Licensed | Normal mode of operation |
| Active\Unlicensed | Duration of missing heartbeats > License Timeout AND Duration of missing heartbeats < Session Timeout |

TABLE 3-continued

| Session Status | Description |
| --- | --- |
| Reconnected\Unlicensed | Duration of missing heartbeats > Session Timeout OR CPS/RADE hosting the session is down and back online |

In some embodiments, a packaging mechanism enables creation of a plurality of application files associated with an application program. In one of these embodiments, the packaging mechanism enables identification of a plurality of application files. In another of these embodiments, the packaging mechanism enables grouping of individual application files into the plurality of application files. In still another of these embodiments, the packaging mechanism enables hosting of the plurality of application files on a remote machine, such as a file server or application server.

In one embodiment, the packaging mechanism executes on a remote machine described as a "staging machine." In another embodiment, the packaging mechanism executes on a "clean machine." A clean machine may be a remote machine having only an operating system installed on it, without additional software, drivers, registry entries, or other files. In still another embodiment, the packaging machine executes on a remote machine, the remote machine resembling a local machine on which an application program may execute. In some embodiments, the remote machine on which the packaging mechanism executes includes an isolation environment providing a clean machine environment into which an application may be installed, even where the remote machine is not itself a clean machine.

In one embodiment, the plurality of application files is referred to as a "package." In another embodiment, the package may be an archive file storing the plurality of application files. In still another embodiment, the package may be an archive file storing the plurality of application files and a file including metadata associated with at least one file in the plurality of application files. In some embodiments, a package includes a plurality of application files comprising an application program. In other embodiments, a package includes a plurality of application files comprising a suite of application programs. In yet other embodiments, a package includes a plurality of application files comprising an application program and a prerequisite required for execution of the application program.

In one embodiment, the packaging mechanism initiates execution of an installation program in an isolation environment. In another embodiment, the packaging mechanism monitors a change to the isolation environment generated by the installation program. In still another embodiment, the packaging mechanism monitors a creation by the installation program of a file in the isolation environment. In yet another embodiment, the packaging mechanism monitors a modification by the installation program of a file in the isolation environment. In some embodiments, the plurality of application files includes a file created or modified by the installation program. In other embodiments, the packaging mechanism implements a file system filter driver 564 to monitor the isolation environment.

In some embodiments, a packaging mechanism may generate multiple pluralities of application files, each comprising a different version of an application program configured for execution in a different target environment. In one of these embodiments, a plurality of application files is configured to execute on a local machine having a particular operating system, revision level, language configurations and master drive (e.g., one plurality of application files may be configured to execute on a local machine having the Windows XP Professional operating system with revision level SP2 and above, using English and having a master Drive C:\). In another of these embodiments, more than one plurality of application files may be combined in a single archive file. In still another of these embodiments, each plurality of application files may be referred to as a "target." In yet another of these embodiments, an archive file containing one or more pluralities of application files may be referred to as a "package."

Figure 19:
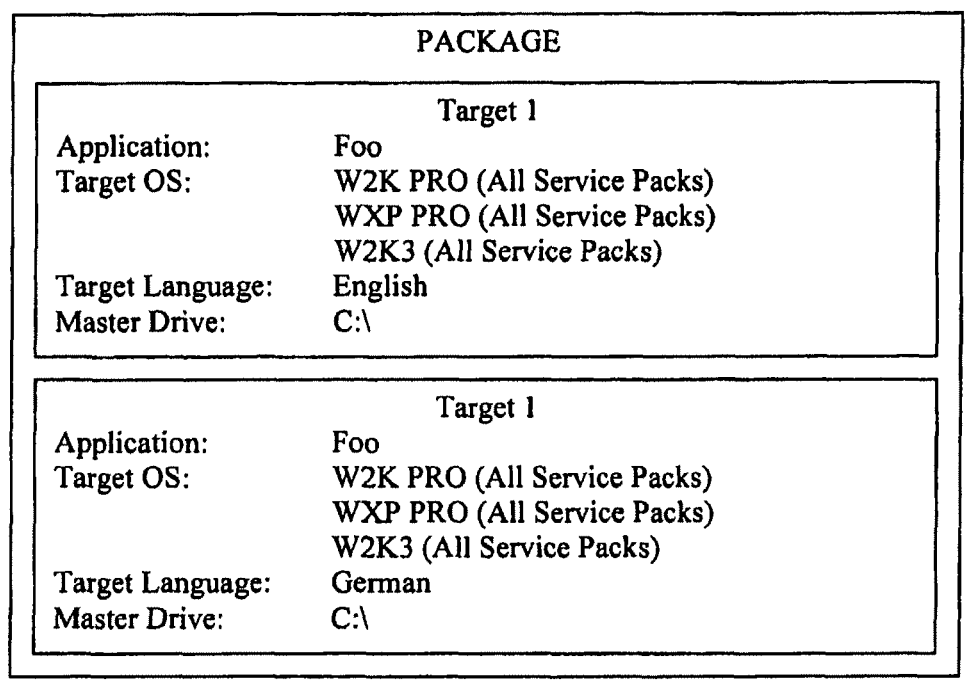
FIG. 19 is a block diagram depicting a package including two targets, each target comprising a plurality of application files comprising an application.

Referring now to FIG. 19, a block diagram depicts a package including two targets, each target comprising a plurality of application files comprising an application. In FIG. 19, the application program 'Foo' is packaged in two targets. The difference between the two targets is 'Target Language'. Specifically, target 1 supports 'English' and target 2 supports 'German'. In one embodiment, an enumeration of available application programs may list the application program 'Foo.' In another embodiment, the appropriate plurality of files is transmitted to a local machine requesting access to the application program. In still another embodiment, a determination is made to transmit a particular target to a local machine, responsive to an evaluation of the local machine. In yet another embodiment, a file associated with the package identifies at least one characteristic associated with a target in the package and required for execution on a local machine.

In some embodiments, the packaging mechanism 530 prepares an application program for streaming by executing an installation program associated with the application program. In one of these embodiments, the packaging mechanism generates an isolation environment on the remote machine 30 on which the packaging mechanism executes. In another of these embodiments, the packaging mechanism executes the application program in the isolation environment. In still another of these embodiment, the packaging mechanism identifies a plurality of application files generated or modified by the installation program. In yet another of these embodiment, the packaging mechanism creates an archive file including the plurality of application files. In one of these embodiments, the packaging mechanism creates a .CAB file including the plurality of application files. In another of these embodiments, the packaging mechanism creates a directory and stores the plurality of application files in the directory. In some embodiments, the packaging mechanism stores the plurality of application files on a file server or other remote machine 30. In other embodiments, the packaging mechanism stores the plurality of application files on multiple remote machines.

Figure 20:
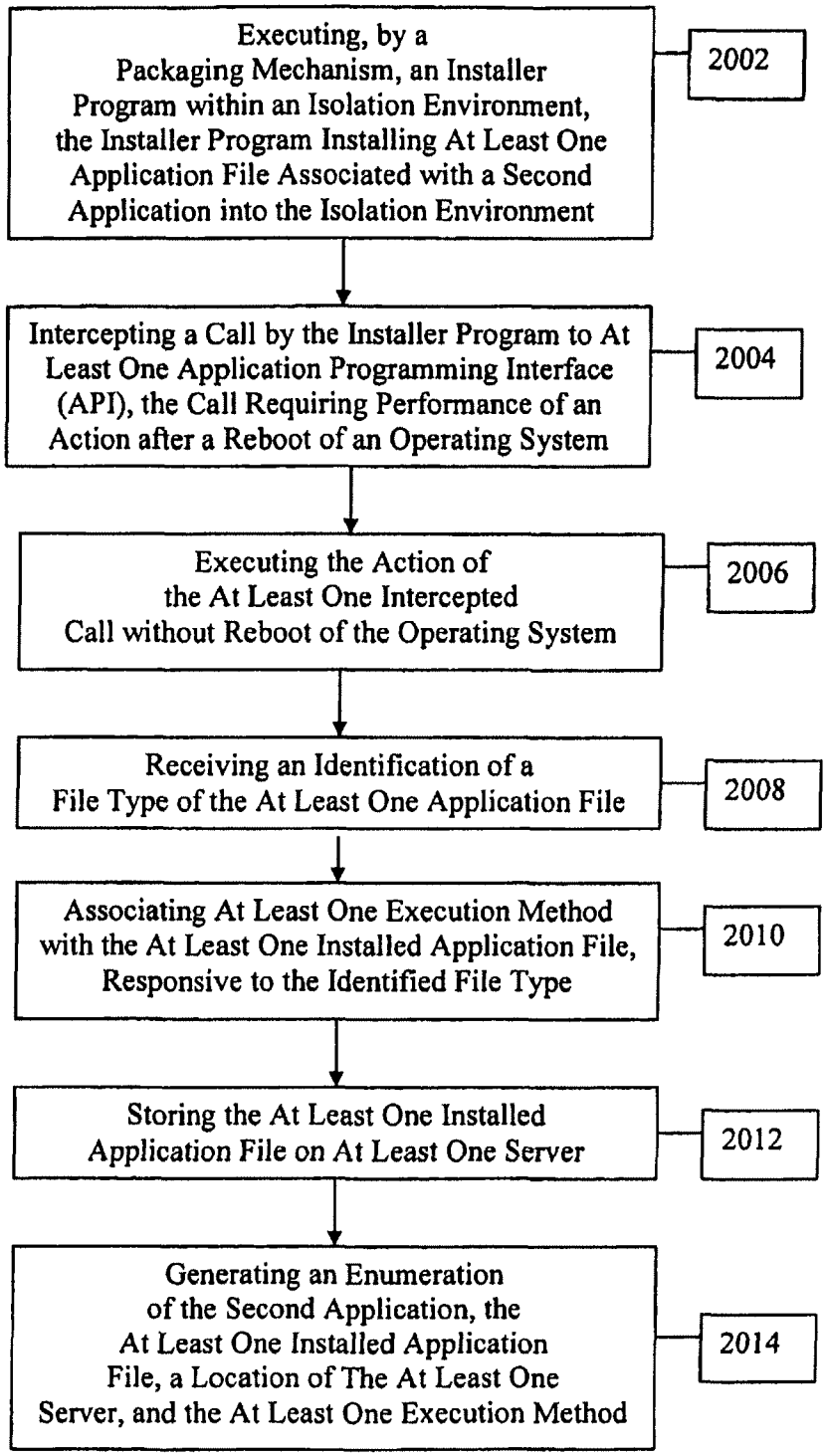
FIG. 20 is a flow diagram depicting one embodiment of the steps taken in a policy-based method for installing an application program without rebooting an operating system.

Referring now to FIG. 20, a flow diagram depicts one embodiment of the steps taken in a policy-based method for effectively installing an application program without rebooting an operating system. In brief overview, a packaging mechanism executes an installer program within an isolation environment, the installer program installing at least one application file associated with a second application into the isolation environment (step 2002). A call by the installer program to at least one application programming interface (API) is intercepted, the call requiring performance of an action after a reboot of an operating system (step 2004). The action of the at least one intercepted call is executed without reboot of the operating system (step 2006). An identification of a file type of the at least one application file is received (step 2008). At least one execution method is associated with the at least one installed application file, responsive to the identified file type (step 2010). The at least one installed application file is stored on at least one server (step 2012). An enumeration is generated of the second application, the at least one installed application file, a location of the at least one server, and the at least one execution method (step 2014).

Referring now to FIG. 20, and in greater detail, a packaging mechanism executes an installer program within an isolation environment, the installer program installing at least one application file associated with a second application into the isolation environment (step 2002). In one embodiment, executing the installer program within the isolation environment enables the packaging mechanism to isolate changes made by the installer program to a file or registry on the local machine. In another embodiment, the packaging mechanism intercepts a change requested by the installer program and redirects the change to the isolation environment to prevent the change from occurring on the local machine. In still another embodiments, the packaging mechanism executes a second installer program within the isolation environment, the second application installing at least one application file associated with a third application into the isolation environment.

In some embodiments, the packaging mechanism executes the installer program within the isolation environment, the installer program executing at least one executable application associated with an application inside the isolation environment. In one embodiment in which the installer executes an application, execution of the application enables installation of a second application.

In another of these embodiments, installation of an application requires execution of the at least one executable application, in addition to the execution of the installer program. In still another of these embodiments, installation of an application requires execution of an Internet browser application, in addition to the execution of the installer program. In some embodiments, an installer program is executed to install a program and execution of the installer program includes execution of a second program required to install the program. In one of these embodiments, the program is a plug-in. In another of these embodiments, the program is an Active X component. In still another of these embodiments, the program is a Flash component. In yet another of these embodiments, the program is a customized toolbar, such as a Yahoo! or Google toolbar. In other embodiments, the program is a component installed into the second program and not executable independent of the second program.

A call by the installer program to at least one application programming interface (API) is intercepted, the call requiring performance of an action after a reboot of an operating system (step 2004). The action of the at least one intercepted call is executed without reboot of the operating system (step 2006). In some embodiments, execution of the action comprises executing an action of a registry entry modified during installation. Further details regarding the execution of the at least one intercepted call without reboot of the operating system are provided in connection with FIG. 25 below.

An identification of a file type of the at least one application file is received (step 2008). At least one execution method is associated with the at least one installed application file, responsive to the identified file type (step 2010). In one embodiment, the at least one execution method enables streaming of the at least one application file to a client. In another embodiment, the at least one execution method enables execution of the at least one installed application file on a client. In still another embodiment, the at least one execution method enables execution of the at least one installed application file on a server. In yet another embodiment, the at least one execution method enables streaming of the at least one application file to a server.

The at least one installed application file is stored on at least one server (step 2012). In some embodiments, the installed application program is executed within the isolation environment prior to storing the at least one installed application file on at least one server. In one of these embodiments, an additional application file is generated responsive to the execution of the installed application program. In another of these embodiments, a data file is generated. In still another of these embodiments, the installed application program requires information to complete installation, the information being required after an initial installation process. In yet another of these embodiments, information such as software product identifiers, license identifiers, or other credentials is required.

In some embodiments, an identifier is provided identifying a location of the at least one installed application file on the at least one server. In one of these embodiments, the identifier conforms to a Universal Naming Convention (UNC). In other embodiments, the at least one installed application file is placed in an archive file, such as a .CAB file. In one of these embodiments, a plurality of application files are stored in an archive file and the archive file is stored on the at least one server. In still another of these embodiments, the at least one installed application file is stored on multiple servers. In still other embodiments, the at least one application file is placed in a directory storing application files.

An enumeration is generated of the second application, the at least one installed application file, a location of the at least one server, and the at least one execution method (step 2014). In some embodiments, the enumeration is stored in a file. In other embodiments, the enumeration is stored in a manifest file. In still other embodiments, the enumeration is stored in an XML file.

In one embodiment, an enumeration is generated of multiple applications, a plurality of installed application files associated with each of the multiple application, and a location of at least one server storing the plurality of installed application files. In another embodiment, a enumeration is generated including an association between the second application and a plurality of installed application files. In still another embodiment, an enumeration is generated including an association between the second application and a compressed file containing the at least one installed application file Referring now to FIG. 21, a flow diagram depicts one embodiment of the steps taken in a policy-based method for installing an application program without rebooting an operating system. In brief overview, a packaging mechanism executes an installer program within an isolation environment, the installer program installing at least one application file associated with a second application into the isolation environment (step 2102). A call by the installer program to at least one application programming interface (API) is intercepted, the call requiring performance of an action after a reboot of an operating system (step 2104). The action of the at least one intercepted call is executed without reboot of the operating system (step 2106). An identification of a characteristic of the at least one application file is received (step 2108). At least one execution pre-requisite is associated with the at least one installed application file, responsive to the identified characteristic (step 2110). The at least one installed application file is stored on at least one server (step 2112). An enumeration is generated of the second application, the at least one installed application file, a location of the at least one server, and the at least one execution pre-requisite (step 2114).

Figure 21:
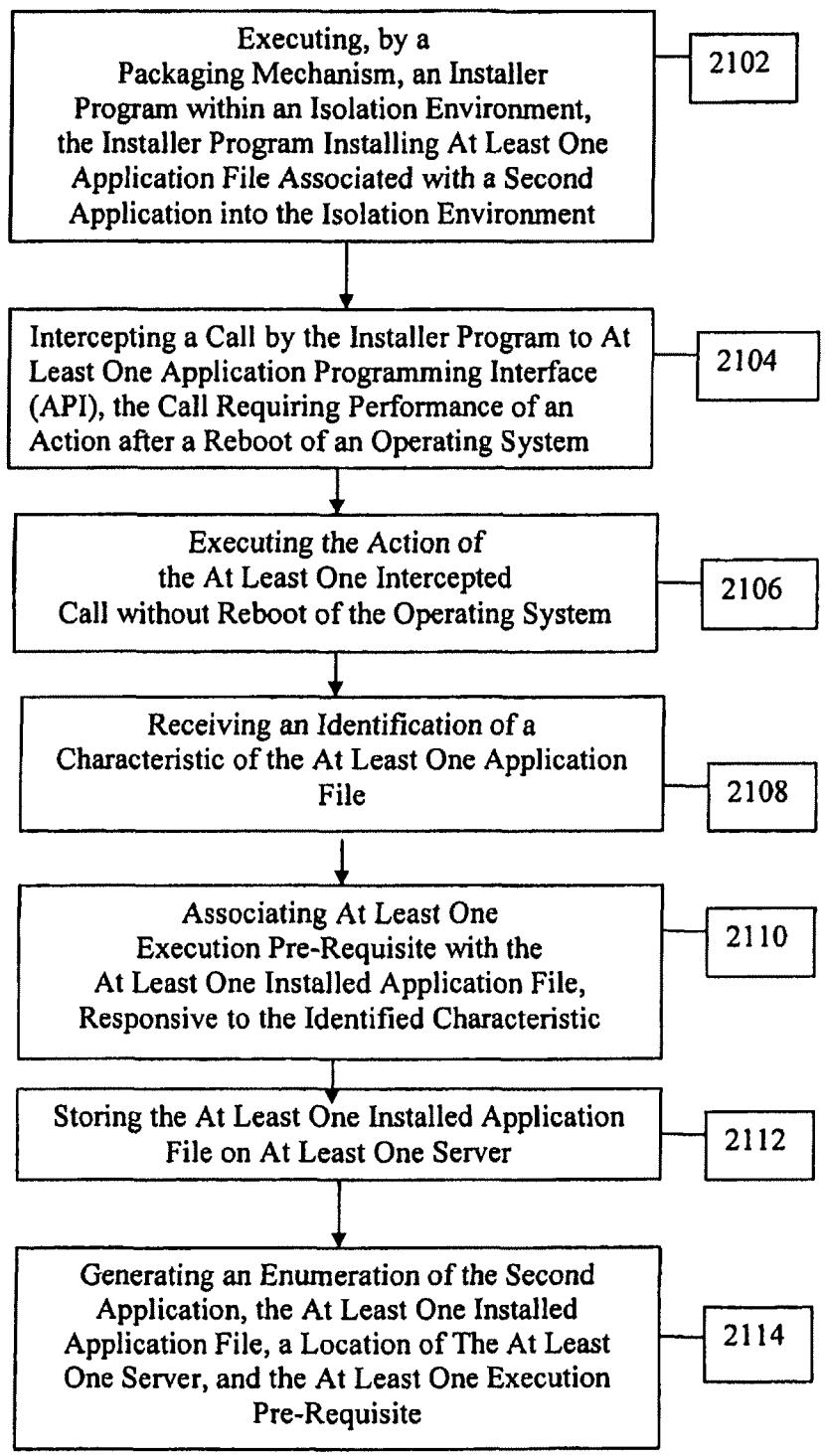
FIG. 21 is a flow diagram depicting one embodiment of the steps taken in a policy-based method for installing an application program without rebooting an operating system.

Referring now to FIG. 21, and in greater detail, a packaging mechanism executes an installer program within an isolation environment, the installer program installing at least one application file associated with a second application into the isolation environment (step 2102). In one embodiment, executing the installer program within the isolation environment enables the packaging mechanism to isolate changes made by the installer program to a file or registry on the local machine. In another embodiment, the packaging mechanism intercepts a change requested by the installer program and redirects the change to the isolation environment to prevent the change from occurring on the local machine. In still another embodiments, the packaging mechanism executes a second installer program within the isolation environment, the second application installing at least one application file associated with a third application into the isolation environment.

In some embodiments, the packaging mechanism executes the installer program within the isolation environment, the installer program executing at least one executable application associated with an application inside the isolation environment. In one embodiment in which the installer executes an application, execution of the application enables installation of a second application. In another of these embodiments, installation of an application requires execution of at least one executable application, in addition to the execution of the installer program. In still another of these embodiments, installation of an application requires execution of an Internet browser application, in addition to the execution of the installer program.

Figure 23:
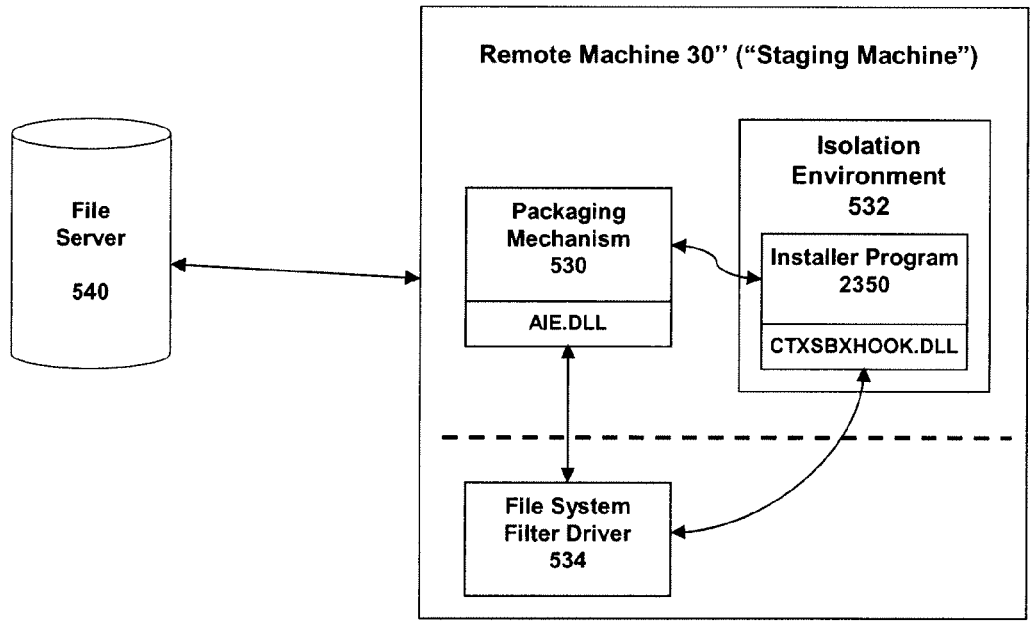
FIG. 23 is a block diagram depicts an embodiment of a system including a packaging mechanism executing an installer program into an isolation environment.

Referring ahead to FIG. 23, a block diagram depicts one embodiment of a system including a packaging mechanism 530 executing an installer program 2350 into an isolation environment 532 and a file system filter driver 534 in communication with the packaging mechanism 530 and the isolation environment 532.

In one embodiment, the packaging mechanism 530 generates a package (as described above in connection with FIG. 21) by installing an application program into an isolation environment 532. In another embodiment, the packaging mechanism 530 installs the application program into the isolation environment 532 by executing the installer program 2350. In some embodiments, the packaging mechanism 530 includes a graphical user interface. In one of these embodiments, the graphical user interface enables a user of the packaging mechanism 530 to customize the generation of a package by the packaging mechanism 530. In another of these embodiments the packaging mechanism 530 is in communication with a graphical user interface on the access control suite 520, enabling a user of the access control suite 520 to customize the generation of a package by the packaging mechanism 530.

In some embodiments, the file system filter driver 532 enables the installation of the application program in an isolation environment 532. In one of these embodiments, the file system filter driver 532 intercepts a request by the installer program 2350. In another of these embodiments, the file system filter driver 532 redirects the request by the installer program 2350 to the isolation environment 532. In still another of these embodiments, the file system filter driver 532 stores a record of the request made by the installer program 2350. In yet another of these embodiments, the file system filter driver 532 stores a copy of a file created or modified by the installer program 2350. In some embodiments, the stored records generated by the file system filter driver 532 are stored together as a plurality of application files comprising an application program. In other embodiments, the plurality of application files is stored on a file server 540.

Referring back to FIG. 21, a call by the installer program to at least one application programming interface (API) is intercepted, the call requiring performance of an action after a reboot of an operating system (step 2104). The action of the at least one intercepted call is executed without reboot of the operating system (step 2106). In some embodiments, execution of the action comprises installation of a driver configured to be started upon the boot of the computer system. In other embodiments, execution of the action comprises executing an action of a registry entry modified during installation.

An identification of a characteristic of the at least one application file is received (step 2108). In some embodiments, an identification of an operating system type is received. In other embodiments, an identification of a language used by operating system is received. In still other embodiments, an identification of a version of the second application is received.

Figure 22:
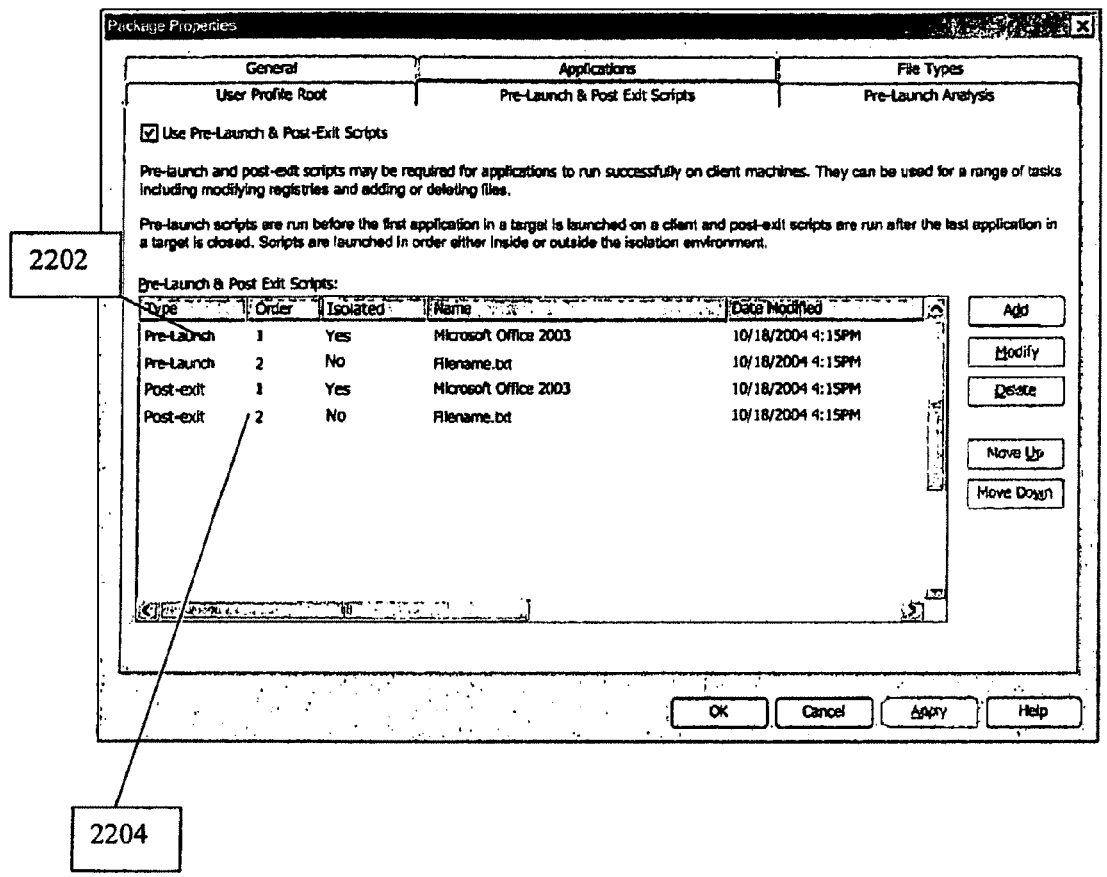
FIG. 22 is a screen shot depicting one embodiment of an enumeration of scripts to be executed on the local machine.

At least one execution pre-requisite is associated with the at least one installed application file, responsive to the identified characteristic (step 2110). In one embodiment, the at least one execution pre-requisite is associated with the at least one installed application file responsive to an application of a policy to the characteristic. In another embodiment, a script is associated with the at least one installed application file, the script comprising an executable program determining the existence of the at least one execution pre-requisite on a client. Referring ahead to FIG. 22, a screen shot depicts one embodiment of an enumeration of scripts to be executed on the local machine. A type of script 2202 indicates when the script should be executed, for example, either before the execution of the application, or after termination of execution of the application. An isolation indicator 24 indicates whether the script should be executed in an isolation environment on the local machine 10. As shown in FIG. 22, in some embodiments, the script was associated with the application program at the time the plurality of application files were packaged together and stored on the remote machine 30' hosting the plurality of application files.

In some embodiments, the at least one execution pre-requisite requires installation of a version of an operating system on a system executing the at least one installed application file. In other embodiments, the at least one execution pre-requisite requires installation of a version of the second application on a system executing the at least one installed application file. In still other embodiments, an instruction is associated with the at least one installed application file, the instruction indicating a second installed application file for use by a client failing to satisfy the at least one execution pre-requisite. In yet other embodiments, an instruction is associated with the at least one installed application file, the instruction indicating a second execution method for execution of the at least one installed application file on a client failing to satisfy the at least one execution pre-requisite. In one of these embodiments, an execution method is associated with the at least one installed application file, the execution method authorizing streaming of a plurality of application files comprising the second application to a local machine for execution on the local machine. In another of these embodiments, an evaluation of a local machine identifies at least one characteristic associated with the at least one installed application file not included on the local machine. In still another of these embodiments, authorization for execution of the plurality of application files is revoked. In yet another of these embodiments, a second execution method is provided for executing the plurality of application files, the second execution method enabling execution of the plurality of application files on a remote machine and transmission of application output data from the remote machine to the local machine.

The at least one installed application file is stored on at least one server (step 2112). In some embodiments, the installed application program is executed within the isolation environment prior to storing the at least one installed application file on at least one server. In one of these embodiments, an additional application file is generated responsive to the execution of the installed application program. In another of these embodiments, a data file is generated. In still another of these embodiments, the installed application program requires information to complete installation, the information being required after an initial installation process. In yet another of these embodiments, information such as software product identifiers, license identifiers, or other credentials is required.

In some embodiments, an identifier is provided identifying a location of the at least one installed application file on the at least one server. In one of these embodiments, the identifier conforms to a Universal Naming Convention (UNC). In other embodiments, the at least one installed application file is placed in an archive file, such as a .CAB file. In one of these embodiments, a plurality of application files are stored in an archive file and the archive file is stored on the at least one server. In still another of these embodiments, the at least one installed application file is stored on multiple servers. In still other embodiments, the at least one installed application file is placed in a directory storing application files.

An enumeration is generated of the second application, the at least one installed application file, a location of the at least one server, and the at least one execution pre-requisite (step 2114). In some embodiments, the enumeration is stored in a file. In other embodiments, the enumeration is stored in a manifest file. In still other embodiments, the enumeration is stored in an XML file.

In one embodiment, an enumeration is generated of multiple applications, a plurality of installed application files associated with each of the multiple application, and a location of at least one server storing the plurality of installed application files. In another embodiment, a enumeration is generated including an association between the second application and a plurality of installed application files. In still another embodiment, an enumeration is generated including an association between the second application and a compressed file containing the at least one installed application file Referring back to step 2106, where an action of the at least one intercepted call is executed without reboot of the operating system, in some embodiments, a virtualized installation and execution environment is provided that removes the requirement of rebooting the system before executing an installed application.

Figure 24:
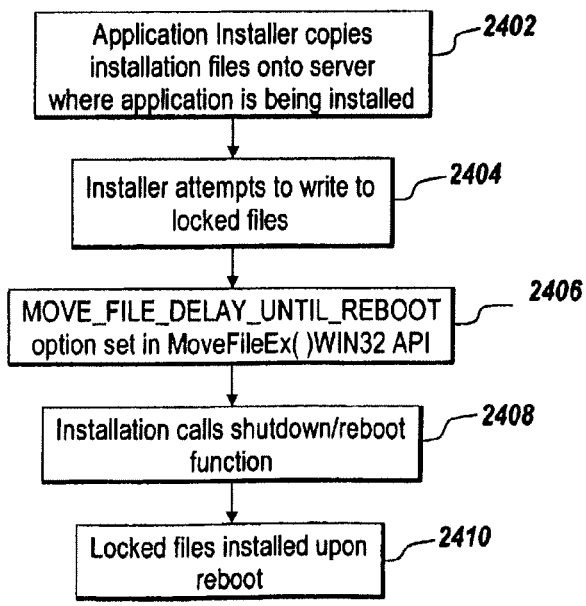
FIG. 24 is a flow chart depicting one embodiment of the steps taken in an environment in which execution of an installer program requires rebooting an operating system.

Referring now to FIG. 24, a flow chart depicts an embodiment in which execution of an installer program requires rebooting of an operating system on a local machine on which the installer program executes. A conventional application installer copies files onto a remote machine where the application is being installed (step 2402). In some embodiments, copying the files may cause a reboot of the remote machine. The application installer attempts to copy at least one of the files to locked files (step 2404). In one embodiment, a locked file may only be written to when an operating system is executed (or "rebooted"). The MOVE_FILE_DELAY_UNTIL_REBOOT option is set in the MoveFileEx( )Win32 API (step 2406), and the application installer calls system shutdown/reboot function (step 2408). Following a reboot, the originally locked files are then installed upon reboot (step 2410).

Figure 25:
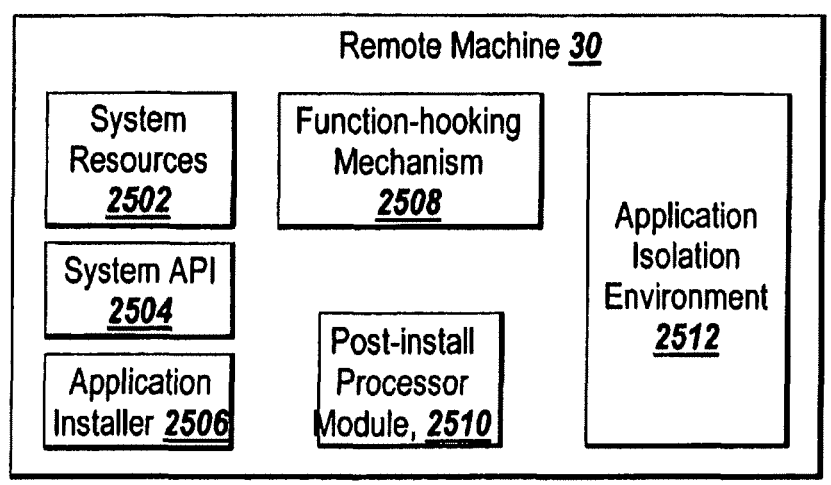
FIG. 25 is a block diagram depicting one embodiment of a remote machine onto which a packaging mechanism installs an application program.

Referring now to FIG. 25, a block diagram depicts one embodiment of a remote machine 30 onto which a packaging mechanism installs an application program. The remote machine 30 includes system resources 2502, system APIs 2504 and an application installer 2506 used to install an application. The remote machine 30 also includes a function-hooking mechanism 2508, a post-install processor module 2510 and an application isolation environment 2512. In some embodiments, installing an application program into an isolation environment 2512 enables installation without reboot of the remote machine 30. In one of these embodiments, a change made to a system resource 2502 virtualized in an isolation environment 2512 does not change a corresponding system resource 2502 on the remote machine 30. Since the system resource on the remote machine 30 is not changed, rebooting the machine to protect the system resource from inappropriate changes is not required.

Referring now to FIG. 25, and in greater detail, the system resources 2502 may include registry entries, system DLLs, and other locked files that the operating system prevents from being written to while the remote machine 30 is executing. The system APIs 2504 include APIs used to reboot the system that are called by the application installer 2506 and hooked by the function-hooking mechanism 2508 to prevent the rebooting of the remote machine 30.

The application isolation environment 2512 provides an environment with a view of operating system resources to an application installer 2506. In one embodiment, the application isolation environment 2512 is an isolation environment 556. In some embodiments, the application isolation environment 2512 provides virtualization of operating system resources such as the file system, registry and named objects. In one embodiment, the application installer 2506 executes within the application isolation environment 2512. In another embodiment, the application installer 2506 installs the application program into the application isolation environment 2512. In still another embodiment, the application installer 2506 executes outside the application isolation environment 2512 and installs the application program inside the application isolation environment 2512.

In some embodiments, the application isolation environment 2512 circumvents the requirement for rebooting the remote machine 30 when the application installer 2506 installs an application into the application isolation environment 2512. In one embodiment, the application isolation environment 2512 intercepts a request to copy an application file to a locked file. In another embodiment, the application isolation environment 2512 redirects the request to copy the application file to an unlocked file. In still another embodiment, the application isolation environment 2512 redirects the request to copy the application file to a virtualized file. In yet another embodiment, redirecting the request to copy the application file enables installation of application files without requiring a reboot of the remote machine 30. As an example, if an application installer 2506 attempts to write to a locked file, such as c:\windows\system32\mfc40.dll, the application isolation environment 2512 intercepts the request and redirect the file to another, unlocked, location. This ability to avoid locked files means the file can be installed without having to make use of the MoveFileEx( ) API and MOVE_FILE_DELAY_UNTIL_REBOOT flag. This ability in removes the need for a reboot of the remote machine 30.

In one embodiment, the function-hooking mechanism 2508 is a file system filter driver 564. In another embodiment, a file system filter driver 564 includes the function-hooking mechanism 2508. In still another embodiment, the function-hooking mechanism 2508 intercepts requests from the application installer 2506 to restart the remote machine 30. In some embodiments, the application isolation environment 2512 provides for copying of application files to unlocked files. However, the application isolation environment 2512 does not address a request by the application installer 2506 for reboot of the remote machine 30. The function-hooking mechanism 2508 intercepts the request for reboot and responds to the application installer 2506.

The application isolation environment 2512 enables copying of application files to unlocked files. However, in some embodiments, other actions are required for installation of an application, and these actions may occur upon the reboot. Preventing the reboot does not prevent the need to complete these actions in the installation process. The function-hooking mechanism 2508 may provide functionality for carrying out an action associated with an installation of an application For example, during the installation of an application, registry entries such as HKLM\SYSTEM\CurrentControlSet\Control\Session_Manager\Pending-FileRenameOperations may be written. Other applications may install services or drivers which need to be started upon boot of a machine. The Post Install Processor Module 2510 identifies application files that have been modified during installation, and carries out the actions associated with the application files.

Figure 26:
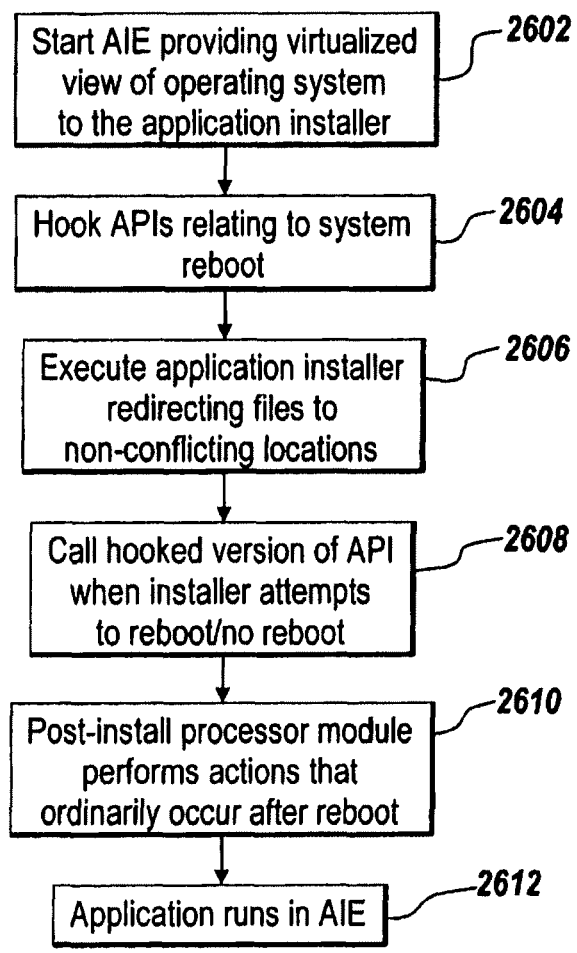
FIG. 26 is a flow diagram depicting one embodiment of the steps taken to install an application in an application isolation environment.

Referring now to FIG. 26, a flow diagram depicts one embodiment of the steps followed to install an application in an application isolation environment 2512. The application isolation environment 2512 provides a virtualized view of the server operating system to the application installer (step 2602). The APIs on the server relating to system reboots and shutdowns are hooked (step 2604) to prevent the application installer 2506 from causing a reboot. The application installer 2506 requests file-copying operations to locked files, the request being intercepted and redirected to non-conflicting locations (step 2606). When the application installer 2506 attempts to reboot by calling a system API, the request is intercepted and the reboot is prevented (step 2608). The post-install processor module 2510 performs actions that ordinarily occur after reboot (step 2610) and the application may then be executed in the application isolation environment 2512 without reboot of a remote machine 30 (step 2612).

In some embodiments, following installation of the application program into the application isolation environment 2512, a packaging mechanism identifies a plurality of application files created or modified during installation of an application program. In one of these embodiments, the plurality of application files are stored on a remote machine. In another of these embodiments, a local machine retrieving the plurality of application files may execute the application program.

In some embodiments, the packaging mechanism 530 executes on a remote machine including an isolation environment 532 and a file system filter driver 534 and installs an application program into the isolation environment 532. In one of these embodiments, the remote machine is referred to as a "clean machine" or a "staging machine." In another of these embodiments, the isolation environment 532 includes an application isolation scope providing a modifiable, virtualized instance of a native resource provided by an operating system on the clean machine. In still another of these embodiments, the isolation environment 532 includes a system isolation scope providing a read-only view of the native resource. In yet another of these embodiments, the read-only view of the native resource comprises a snapshot of a file system and registry residing on the clean machine.

In one embodiment, a redirector intercepts a request for a change to the native resource. In some embodiments, the redirector is a file system filter driver 534. In another embodiment, an installer program executed by the packaging mechanism 530 makes the request for the change. In still another embodiment, the change to the native resource is required to install an application program on to the clean machine. In yet another embodiment, the redirector redirects the request to the isolation environment 532.

In some embodiments, redirecting requests to change native resources to the isolation environment 532 results in isolation of changes associated with installation of an application program. In other embodiments, the requests to change native resources are recorded and stored in a storage element. In one of these embodiments, all changes associated with installation of an application program reside in the storage element. In another of these embodiments, a local machine 552 retrieving the contents of the storage element and implementing the changes to native resources residing in an isolation environment 556 on the local machine 552 result in installation of the application program on the local machine 552.

In some embodiments, a pre-launch analysis of the local machine 10 may be required. In one of these embodiments, the local machine 10 verifies that at least one characteristic is included in the local machine 10. In another of these embodiments, the at least one characteristic is added to the local machine 10 after the pre-launch analysis determines that the local machine 10 lacks the at least one characteristic. In still another of these embodiments, the at least one characteristic is included in a remote machine hosting an application program and failure of the local machine to include the at least one characteristic will prevent execution of the application program. In yet another embodiment, the application program requires existence of the at least one characteristic on the local machine for execution.

In some embodiments, the packaging mechanism enables identification of at least one characteristic for use in a pre-launch analysis on the local machine. In other embodiments, the packaging mechanism enables association of at least one characteristic with an application program available for execution on the local machine. In still other embodiments, the packaging mechanism enables association of an executable script with an application program, the local machine executing the executable script to complete the pre-launch analysis. In yet other embodiments, the at least one characteristic is required to exist on the local machine after the execution of the application program.

The packaging mechanism may provided functionality for signing a plurality of application files. In one embodiment, signing the plurality of application files enables a local machine to verify integrity of the plurality of application files. In another embodiment, signing the plurality of application files prevents a local machine from executing a corrupted application program. In some embodiments, a cryptographic checksum, such as an MD4 hash, an MD5 hash, or a SHA-1 hash, of a file in the plurality of application files is computed.

In other embodiments, a cryptographic checksum of every file in the plurality of application files is computed. In one of these embodiments, the cryptographic checksum is stored in a second file. In another of these embodiments, the second file is associated with the plurality of application files. In some embodiments, the second file is added to the plurality of application files. In other embodiments, the second file is signed using a certificate, such as an X.509 certificate. In still other embodiments, a local machine retrieving the plurality of application files verifies the signature using a public portion of the certificate. In yet other embodiments, the local machine receives the public portion of the certificate and an identification of a certificate trust list for verification of the signature. In one of these embodiments, local machine receives a registry key containing the identification of a certificate trust list.

In one embodiment, the packaging mechanism provides functionality for customizing an isolation environment. In another embodiment, the packaging mechanism provides functionality for generating a file storing a definition of an isolation environment. In still another embodiment, the packaging mechanism includes the file with the plurality of application files comprising an application program. In yet another embodiment, a local machine receives the file with access information from a remote machine.

In some embodiments, a plurality of application files are stored in an archive file. In one of these embodiments, the archive file is in a CAB file format. In another of these embodiments, the archive file format does not provide support for specification by an application program of a short file names of a file. In still another of these embodiments, an operating system, such as WINDOWS 2000 may not provide support for specification by an application program of a short file names of a file. In other embodiments, an operating system, such as WINDOWS XP, provides support for specification by an application program of a short file name of a file. In one of these embodiments, a request to execute the file may include the correct short file name of the file.

In one embodiment, a mapping may be generated to associate a long file name of a file in the plurality of application files with a short name of the file. In another embodiment, the mapping is stored in a file in the plurality of application files. In still another embodiment, a file has a short file name only if the long file name of the file is longer than twelve characters. In some embodiments, the short file name is a virtual file name associated with the file. In one of these embodiments, the file is transmitted to a local machine 10 for execution where it is stored with a long file name. In another of these embodiments, an application file on the local machine 10 requests execution of the file using the short file name. In still another of these embodiments, the mapping enables execution of the file although the request for execution of the file did not use the name of the file on the local machine (the long file name).

In some embodiments, the packager mechanism 530 generates the mapping. In one of these embodiments, the packager mechanism 530 selects a short file name for a file having a long file name. In another of these embodiments, an operating system on the remote machine 30' on which the packager mechanism 530 is executing selects a short file name for a file having a long file name. In still another of these embodiments, a unique short file name is selected that does not conflict with a second short file name on the remote machine 30'. In yet another of these embodiments, the installer program executed by the packager mechanism 530 generates a file including a mapping between a long file name with a short file name. In other embodiments, the mapping is transmitted to a local machine 10 retrieving the file. In one of these embodiments, the local machine 10 refers to the file when executing the file.

The following illustrative examples show how the methods and systems discussed above can be used for selecting, streaming to a local machine, and executing on the local machine a plurality of files comprising an application program. These examples are meant to illustrate and not to limit the invention.

EXAMPLE 1

In one embodiment, a user of a local machine 10 requests access to an application program, such as a word processing program, a web browsing application, or a spreadsheet program, identified in an enumeration of application programs. In one example of this embodiment, the local machine 10 executes a program neighborhood application that receives from a remote machine 30 an enumeration of applications available to the local machine 10. In another example of this embodiment, the local machine 10 communicates with a web server, such as remote machine 30''', to receive the enumeration of applications. The user of the local machine 10 may request access to an enumerated application program by selecting a graphical depiction representing the enumerated application program. The user of the local machine 10 may request access to an application program not previously installed on the local machine 10.

The local machine 10 transmits the request to access the application program to a remote machine 30. The local machine 10 receives an identification of a remote machine 30" providing access to a plurality of application files comprising the application program. The local machine 10 identifies at least one characteristic required for execution of the application program. In one example of this embodiment, the local machine 10 receives the at least one characteristic with the identification of the remote machine 30" transmitted to the local machine 10 by the remote machine 30. In another example of this embodiment, the local machine 10 retrieves the at least one characteristic from the remote machine 30" after receiving the identification of the remote machine 30". The local machine 10 may be required to comprise the at least one characteristic prior to receiving authorization to retrieve the plurality of application files. Alternatively, the local machine 10 may be required to comprise the at least one characteristic prior to executing the plurality of application files. In one example of this embodiment, the local machine 10 may be required to comprise the at least one characteristic throughout the execution of the plurality of application files.

Upon verification by the local machine 10 that the local machine 10 includes the at least one characteristic, the local machine 10 retrieves a least one application file in the plurality of application files and executes the retrieved application file to execute the application program.

EXAMPLE 2

A remote machine 30 receives a request to access an application program from a local machine 10. The remote machine 30 authenticates the local machine 10. In one example of this embodiment, the remote machine 30 requests credentials, such as a user name and password, from the local machine 10. In another example of this embodiment, the remote machine 30 transmits a collection agent 404 to the local machine 10. The collection agent 404 gathers information about the local machine 10 and transmits the information to the remote machine 30 for use in authenticating the local machine 10. In still another example of this embodiment, the remote machine 30 provides information about the local machine 10 to a policy engine 406 for authentication of the local machine 10. The remote machine 30 may comprise the policy engine 406. Alternatively, the remote machine 30 may be in communication with a remote machine 30' comprising the policy engine 406.

The remote machine 30 selects a method of execution of the application program. The remote machine 30 may make the selection responsive to the authentication of the local machine 10. In one example of this embodiment, the remote machine 30 applies a policy to information gathered about the local machine 10. In another example of this embodiment, the remote machine 30 makes the selection responsive to a policy applied to the application program. In still another example of this embodiment, the remote machine 30 makes the selection responsive to a policy applied to a file type associated with the application program. The remote machine 30 may consult a file to make the selection of the method of execution of the application program.

The remote machine 30 may select a method of execution of the application program enabling the local machine 10 to receive application-output data generated by execution of the application program on a remote machine 30'. The remote machine 30 may select a method of execution of the application program enabling the local machine 10 to execute the application program locally after retrieving a plurality of application files comprising the application program.

In one embodiment, the remote machine 30 selects a method of execution of the application program enabling the local machine 10 to execute the application program locally while retrieving a plurality of application files comprising the application program across an application streaming session. In one example of this embodiment, the local machine 10 establishes an application streaming session with a remote machine hosting a plurality of application files, the local machine 10 initiates retrieval of the plurality of application files across the application streaming session, and the local machine 10 executes a retrieved first application file in the plurality of application files while retrieving a second application file in the plurality of application files. In another example of this embodiment, the local machine 10 executes a first application file in the plurality of application files and retrieves a second application file in the plurality of applications upon receiving a request from the first application file for access to the second application file.

For embodiments in which the selected method of execution enables the local machine 10 to retrieve at least one application file in a plurality of application files comprising an application program, the remote machine 30 identifies a remote machine 30" hosting the application program available for access by the local machine 10. The remote machine 30" hosts a plurality of application files comprising the application program. The remote machine 30" may host multiple pluralities of application files comprising various application programs. In one example of this embodiment, the remote machine 30" hosts a plurality of application files for each of several different versions of an application program.

The remote machine 30" hosts a file associating a plurality of application files comprising a particular application program with a description of the application program. The file may also identify one or more execution pre-requisites to be identified on a machine prior to the transmission of the plurality of application files to the machine. The file may further include an identification of a location on a network of the remote machine 30". In one example of this embodiment, the remote machine 30 consults the file to identify the location on the network of the remote machine 30".

The remote machine 30 selects a remote machine 30". The remote machine 30 may select a remote machine 30" having a location on a network accessible to the local machine 10. The remote machine 30 may select a remote machine 30" hosting a version of the application program compatible with the local machine 10. The remote machine 30 transmits an identification of the selected method of execution of the application program and an identification of the remote machine 30" to the local machine 10 in response to receiving the request for access to the application program. The remote machine 30 may also transmit the file to the local machine 10.

EXAMPLE 3

In one embodiment, the local machine 10 receives an identification of a selected method of execution of an application program and an identification of a remote machine 30" providing access to a plurality of application files comprising the application program. The local machine 10 verifies authorization of access to the application program. In one example of this embodiment, the local machine 10 performs a pre-launch analysis of itself. The local machine 10 identifies at least one characteristic and verifies the existence of the at least one characteristic on the local machine 10. The at least one characteristic may be a pre-requisite to maintaining authorization to access and execute the application program. Verifying the existence of the at least one characteristic on the local machine 10 may ensure compatibility between characteristics of the local machine 10 and the system requirements of the application program, and may additionally ensure compliance with security policies or licensing agreements.

Upon successful completion of a pre-launch analysis, the local machine 10 establishes an application streaming session with the remote machine 30" providing access to the plurality of application files. The application streaming session may be any connection over which the local machine 10 may request and receive a file in the plurality of application files. Establishment of the application streaming session may enable the local machine 10 to execute a first application file in the plurality of application files prior to retrieval of all files in the plurality of application files. The local machine 10 may initiate execution of the application program while continuing retrieval of additional application files in the plurality of application files. Alternatively, the local machine 10 may retrieve the plurality of application files in an archive file and execute a first extracted application file while extracting a second application file from the archive file.

EXAMPLE 4

In one embodiment, an application streaming client 552 on a local machine 10 retrieves a plurality of application files from a remote machine 30. The application streaming client includes a streaming service 554, an isolation environment 556, and a file system filter driver 564. The streaming service 554 establishes an application streaming session with the remote machine 30 for requesting and retrieving the plurality of application files. The streaming service 554 executes the application files within the isolation environment 556. The file system filter driver 564 enables execution of application files within the isolation environment 556 by intercepting requests from the execution application files and redirecting the requests to the isolation environment 556.

In one example of this embodiment, the streaming service 554 retrieves an archive file including the plurality of application files comprising an application program. The streaming service 554 extracts from the archive file a first application file from the plurality of application files. The first application file may be an executable file. The streaming service 554 may execute the first application file within the isolation environment 556. Execution of the first application file may initiate execution of the application program.

In another embodiment, a first application file executing within the isolation environment 556 requests from the local machine 10 an enumeration of the plurality of application files. The file system filter driver 564 intercepts the request for the enumeration and redirects the request to the streaming service 554. In embodiments where the streaming service 554 retrieved the plurality of application files, the streaming service 554 may generate an enumeration of the plurality of application files. In embodiments where the streaming service 554 retrieved an archive file including the plurality of application files, the streaming service 554 may generate the enumeration of the plurality of application files responsive to an enumeration included in the retrieved archive file. In other embodiments, the streaming service 554 retrieves only the enumeration of the plurality of application files while at least one application file in the plurality of application files resides on a remote machine 30 and has not yet been retrieved to the local machine 10 by the streaming service 554. In these embodiments, the streaming service 554 may generate an enumeration of the plurality of application files responsive to the retrieved enumeration. In one example of these embodiments, the streaming service 554 indicates to the first application file that the plurality of application files resides on the local machine 10, although only the enumeration resides on the local machine 10.

EXAMPLE 5

In one embodiment, a first application file executing within the isolation environment 556 requests from the local machine 10 access to a file identified by the enumeration of the plurality of application files. If the requested file resides in a user scope within the isolation environment 556 accessible to the first application file, the first application file accesses the requested file.

If the requested file does not reside in the user scope or in the isolation environment 556, the file system filter driver 564 intercepts the request and redirects the request to the streaming service 554. If the requested file is a file within the archive file containing the plurality of application files, the streaming service 554 extracts the requested file and stores the requested file on the local machine 10. The streaming service 554 may store the file within the isolation environment 556. The request for the file is satisfied when the file is stored in the isolation environment 556.

If the requested file does not reside in the isolation environment 556 or in the archive file including the plurality of application files, the streaming service 554 requests the file from the remote machine 30. The streaming service 554 may receive the file from the remote machine 30 across an application streaming session. The streaming service 554 stores the received file in the isolation environment 556. The request for the file is satisfied when the file is stored in the isolation environment 556.

In one example of this embodiment, a second application file executes in a second user scope in the isolation environment 556. The second application file requests access to the file originally requested by the first application file. If a copy of the requested file does not reside in the second user scope, the copy of the requested file stored in the isolation environment 556 is used to satisfy the request for the application file.

EXAMPLE 6

In one embodiment, a local machine 10 receives from a remote machine 30 an identification of a selected method of execution of an application program and an identification of a remote machine 30' providing access to a plurality of application files comprising the application program. The local machine 10 successfully completes a pre-launch analysis of the local machine 10. The local machine 10 receives a license from the remote machine 30 authorizing execution of the application program. In one example of this embodiment, the license requires the local machine 10 to transmit heartbeat messages to a session management server 562 to maintain authorization to execute the application program. Heartbeat messages may include messages indicating initiation of execution of an application program, termination of execution of an application program, and messages sent on a periodic basis throughout the execution of the application program. Heartbeat messages may also include messages about the status of the local machine 10, such as when the local machine 10 connects to a network or when the local machine 10 terminates a connection to a network. In another example of this embodiment, the license specifies a pre-determined period of time during which the local machine 10 has authorization to execute the application program.

The local machine 10 establishes an application streaming session with the remote machine 30' and retrieves at least one of the application files in the plurality of application files. During execution of the at least one application file, in embodiments where the received license requires transmission of heartbeat messages, the local machine 10 sends heartbeat messages to the session management server 562 to maintain authorization to execute the at least one application file.

EXAMPLE 7

In one embodiment, the local machine 10 receives an identification of a selected method of execution of an application program and an identification of a remote machine 30' providing access to a plurality of application files comprising the application program. The local machine 10 successfully completes a pre-launch analysis of the local machine 10. The local machine 10 receives a license specifying a pre-determined period of time during which the local machine 10 has authorization to execute the application program.

The local machine 10 establishes an application streaming session with the remote machine 30' and retrieves at least one of the application files in the plurality of application files. In one example of this embodiment, the local machine 10 retrieves a subset of the plurality of application files, the subset comprising each file necessary to execute the application program when the local machine 10 is not connected to a network. The local machine 10 stores the subset in a cache on the local machine 10.

At a point in time within the pre-determined period of time, the local machine 10 is disconnected from a network and receives from a user of the local machine 10 a request for access to the application program. In one example of this embodiment, the local machine 10 is a device such as a laptop and the user of the local machine 10 is in an environment prohibiting connections to networks, such as an airplane. Upon receiving the request from the user, the local machine 10 may retrieve from the cache an application file from the plurality of application files and execute the application program.

EXAMPLE 8

In another embodiment, the local machine 10 receives an identification of a selected method of execution of an application program and an identification of a remote machine 30' providing access to a plurality of application files comprising the application program. The local machine 10 may receive an identification of a first client agent residing on the local machine 10 to execute to retrieve the plurality of application files, such as an application streaming client.

In one example of this embodiment, the local machine 10 fails to successfully complete a pre-launch analysis of itself. The local machine 10 may lack a characteristic required for compatibility with a requirement of the application program, such as a particular device driver or operating system. The local machine 10 may lack a characteristic required for compliance with a security policy, for example, membership in a particular Active Directory or authorization for access to a private network. The local machine 10 may be a type of machine incompatible with a requirement of the application program, such as a personal digital assistant attempting to access a computationally intensive application program, or a public machine at a kiosk attempting to execute a secure application hosted by a remote machine on a private network.

The local machine 10 makes a determination not to retrieve the plurality of application files across the application streaming session, responsive to the determination that the local machine 10 lacks the at least one characteristic required for access to the application program. The local machine 10 executes a second client agent residing on the local machine 10 instead of executing the identified first client agent. In one example of this embodiment, the local machine 10 receives an identification of the second client agent to execute in the event of failure to successfully complete the pre-launch analysis. The local machine 10 requests execution of the application program on a remote machine 30". The second client agent receives application-output data generated by the execution of the application program on the remote machine 30". The second client agent displays the application-output data on the local machine 10.

EXAMPLE 9

In one embodiment, an administrator of a network provides access to an application program for users of local machines 10. The administrator executes an application on a remote machine 30' to generate a plurality of application files comprising the application program. The application may include a graphical user interface. The administrator may use the graphical user interface to identify the application program and an installer program associated with the application program, define policies to be applied in authorizing access to the application program, and specify characteristics about the type of access provided, including requirements to be satisfied by a local machine 10 attempting to access or execute the application program. The administrator may identify an installer program installing an entire application program, or a portion of an application program, such as an upgrade or patch.

In one example of this embodiment, a remote machine 30 includes a packaging mechanism 530. The packaging mechanism 530 executes the installer program within an isolation environment 532 on the remote machine 30. Execution of the installer program results in installation, into the isolation environment 532, of at least one application file associated with the application program. The remote machine 30 may include a file system filter driver 534, which ensures the installation of the application file into the isolation environment 532 by intercepting a request by the installer program to install the application file on the local machine 10, and redirecting the request to the isolation environment 532. The packaging mechanism 530 may use the file system filter driver 534 to maintain a record of each application file installed into the isolation environment 532.

The installer program may install a plurality of application files into the isolation environment 532. The packaging mechanism 530 generates a file including an enumeration of application files in the plurality of application files. The file may include information associated with the plurality of application files, such as the type of application program the plurality of application files comprise, the version of the application program, execution pre-requisites associated with the application program, and policy requirements, such as a method of execution required for a particular application program. The packaging mechanism 530 stores on a remote machine 30' the plurality of application files and the file.

In one embodiment, the administrator of the network identifies an application program comprising an updated version of an existing application program or application file in a plurality of application files comprising an application program.

The application may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more articles of manufacture as object code.

While the invention has been shown and described with reference to specific preferred embodiments, it should be understood by those skilled in the art that various changes in form and detail may be made therein without departing from the spirit and scope of the invention as defined by the following claims.

B. Systems and Methods for Rapid Application Delivery Service Isolation

In some aspects the present disclosure further relates to systems and methods for enhanced application streaming that supports profiling and execution of applications which may use local client machine system services as a part of their execution environment. The systems and methods presented may also enable an application executed in an isolated environment of the client machine to use the services of the local client machine which may be outside of the application's isolated environment. For example, in embodiments in which a client machine includes an isolated environment within which an application operates, services which may support this application may be provided from outside of the application's isolated environment. Therefore, these systems and methods may enable the service supported applications to work seamlessly in the isolation environment even if such applications use the services of the local client machine which may be operating outside of the application's isolation environment and separate from user space.

By creating an isolation environment for services or processes which need to run on the client machine and separately from the isolation environment of the application being supported by the processes, the systems and methods of the present disclosure allow for preservation of high privileges for the services while allowing the services to run on the client machine. Similarly, by using a separate isolation environment within which to run, services may communicate with the remote server as would the application. The isolation environment for the services may be created using user credentials, which may be already cleared by the system for authentication and access. The services may be in communication with the application they service, as well as in communication with the remote server. The isolation environment for the services may include a number of components described herein for creating and maintaining the isolation environment as well as for controlling and managing the services within the environment. Furthermore, the isolation environments for services enable running or executing of the services in a separate context from the application which they support, because the application operates within an isolation environment independent from the isolation environment in which the services operate. In addition, the isolation environments for the services enables the services to have privileges which are higher or greater than the privileges which may be granted by the client to applications, such as the Rapid Application Delivery (Rade) applications.

A service used by an application operating on the client machine may be a privileged executable. In some embodiments, a service may be run or executed outside the context of a user session. In further embodiments, the service is run outside of an isolation environment of the application. In certain embodiments, a service is run when the system is booted or restarted. In specific embodiments, the service is run or executed when the application requests that the service be loaded. In some embodiments, services run or executed to aid the application may need to be executed under isolation. In further embodiments, the isolation of the service aiding the application may be separated from the isolation environment of the application. By separating the isolation environment of the service from the isolation environment of the application the service may be enabled to have privileges that do not infringe on the client's or the remote server's security.

A service may provide an application with a service of conducting an operation of high privilege. This may be additionally useful for applications which may be categorized as low privilege applications. In some embodiments, some services may require higher privileges for some applications than the same applications may be granted. In certain embodiments, the higher privileges of the services supporting the applications are provided by executing the services in their own isolation environments which are independent from the isolation environments of the application or the session of the user. Ignoring isolation, services may be implemented such that there is a single service of a particular kind or type per client machine. In some embodiments, services may provide a central place for instances of an application that may be run in multiple logon sessions to communicate with a central (single) instance. In some embodiments, services include one or more command line applications. In further embodiments, services include no GUI. In still further embodiments, services include a command line input/output which may generally not be viewable. In further embodiments, services implemented in isolation environments may include command line input/outputs that may be accessible and viewable.

In some embodiments, Services may be run with a number of predefined privileges. For example, on Microsoft systems, privileges for services may include LOCAL_SERVICE (with low privileges), NETWORK_SERVICE (with higher privileges than LOCAL_SERVICE, and access to the network), or LOCAL_SYSTEM (with higher privileges than NETWORK_SERVICE, but can not access the network).

From some operational standpoints, services may be similar to applications. Accordingly, in some embodiments, just like with applications, the services may be also isolated. Services may also be privileged. Isolating a service may include executing or running the service inside a profile sandbox or an isolation environment. The service operating in the sandbox may perform operations on a disk and registry. These operations may be intercepted and redirected to other locations, as is common for other "applications" under isolation. While some services may be run or executed only once for the global machine, there may be an instance of the service created for the profile, such as a user profile. From such instance of the service created, all sandboxes that may started from the profile may share this single instance of service. When the service is from different profiles then multiple instances may be created.

Services may be controlled by a Service Control Manager (SCM). An SCM may create a service. The SCM may initiate, manage, start, stop, pause and delete a service. The SCM may manage services based on a request. In some embodiments, a CreateProcessInternalW function in SCM may monitor the starting of service processes. The SCM may further use an HKLM\Software\Citrix\IsolatedSevices Key to see if the initiated or launched service is to be isolated. Whenever a request to start a service is sent to the SCM, the SCM may check a list to ascertain whether the service being started or initiated also needs to be isolated. If the SCM determines, based on the list, that the service is to be isolated, the SCM may create a sandbox, or the isolated environment, and put the service in the sandbox. Once the service is started, the SCM may manage the isolated service just like any other service. In some embodiments, the SCM manages or treats the isolated service the way an application operating in it's own isolated environment is managed. Each isolated service may therefore run or execute in its own sandbox, just like an independent application. In some embodiments, the service uses a user token in order satisfy any authentication issues and in order to receive any necessary permissions from the client machine to run and operate in an independent sandbox. In some embodiments, the "userroot" of the user is used by the service in order to execute. The sandbox of the service may be treated by the client machine as a sandbox that is created by the user from session zero. In some embodiments, the client machine does not differentiate between a sandbox created by the SCM comprising a service to support an operation of a user and a sandbox created from session zero by the user for the application. The service may run in the context in which the service control manager launches it.

Services may be isolated using the Service Control Manager, SCM. The services may register with SCM and SCM may facilitate the start, stop, pause operations on the services. The service process may be run as part of a sandbox that is created from the service user, session zero and GUID of the profile. All service from the same user and profile GUID may be configured to run in accordance with the user provided privilege. When a process is launched and if there is a service in one of the profiles (in case of IIC) then a sandbox may be created for the service. The service sandbox may run until all of the service processes die or the system is rebooted. In some embodiments, the service sandbox runs even when all the service processes are inactive or dead.

The service isolation architecture may encompass one or more components. In some embodiments, the service isolation architecture includes the SCM. The SCM may include services.exe which may be installed along with the operating system. Isolation service architecture may further include one or more service processes. Service processes may be installed by the application during profiling. The service isolation architecture may also include the Isolated/Streamed Application, which may include the application running inside a sandbox. In some embodiments, Client Service Hooks which may include or be added to CtxsbxHook.dll, CreateProcess-Internal hooks, which may include or be added to CtxsbxHook.dll, and Rade service may be included in the service isolation architecture.

In some embodiments, the term hooking, such as hooking of a hooked function for example, may cover a range of techniques used to alter or augment the behavior of an application, software, an operating system component, or a function. Hooking may be implemented by modifying function calls or messages, events or any other communications passed between the software components or functions. Code that handles such intercepted function calls, events or messages may be referred to as a "hook" and the function which may be affected may be referred to as a hooked function. Hooking may be used for extending functionality. In some embodiments, functions of the present disclosure are hooked such that the functionality for creating, managing or modifying isolation environments and operation of services within isolation environments is enabled or provided.

The Service Control Manager (SCM) may be a Windows service control manager process services.exe. SCM may be responsible for controlling as well as managing all the aspects of services running on the system. Service Isolation design may use SCM for handling all the services and service specific aspects. The service process may include a process which may be run inside an isolation environment, such as the isolation environment of the application or an isolation environment different from the isolation environment of the application. The application may be a streamed application. The application, such as a streamed application may include the process running inside the isolation environment. This application may be either fully or partially depended upon one or more services. In some embodiments, the application uses the isolated services to run properly. Client Service Hooks may include components active in the streamed application to monitor the service creation and starting. CreateProcessInternal hook may comprise a module created in the SCM. This component may be responsible for identifying the isolated service start and may take the appropriate action of isolating the service process. Rade Service may include services for reading services from the profile, populating the profile's service database, requesting for creation, deletion and starting of isolated services to Rade helper Service. In some embodiments, Rade service may not include the privileges of creating and starting the services. Rade service may also be responsible for sandboxing service on client side. Radehlprsvc may be referred to as the Rade help service. Rade help service may run as a system. Rade help service may include privileges to Create, Delete and Start the services. This service may minimize the attack surface. Since Rade Service may include a lot of end points which may be exposed to attacks. For this reason, Rade help service may provide a new service with higher privileges which can be contacted only by Rade service.

Figure 27:
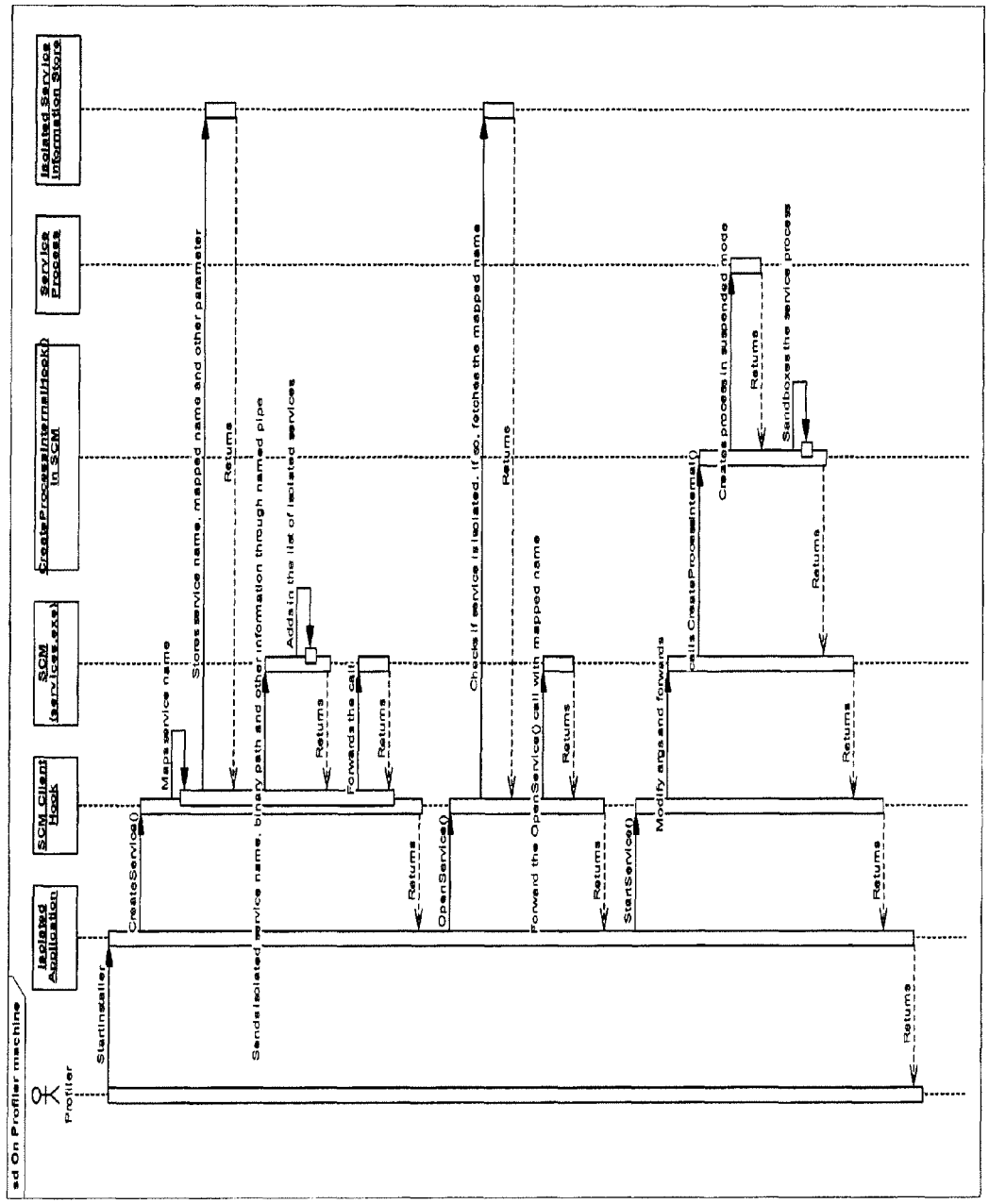
FIG. 27 is a diagram depicting an embodiment for installing a service within an isolation environment.

FIG. 27 illustrates some embodiments of the service installation within an isolation environment. In some embodiments, applications use the CreateService API function to install the service. A parameter, such as service name, binary path, service type, start type and service username etc may be used. In case of isolated applications, all the service functions including the CreateService functions are hooked so as to alter the system's behavior in order to facilitate running the application or the service as an isolated service. So when the isolated application tries to install the service using CreateService function, the isolated application may use the hooked CreateService function.

The hooked CreateService function may change certain parameters before invoking the original CreateService function. To differentiate between the isolated services and normal services, the service name may be mangled and binary path may be set to actual physical path of service EXE (path inside radecache location). Once the relevant parameters are modified, the parameters may be passed onto the original CreateService function which may inform the SCM to install the specified service. Once the service is installed, the service may create the new registry entry under following registry key which may be reserved for storing all the installed services: HKEY_LOCAL_MACHINE\System\CurrentControlSet\IsolatedServices If the CreateService function call is successful then this call may be recorded along with all the parameters into the installed services database within the profile. This recorded information may be used later to install these services on the client machine wherever this application is streamed. During profiling, all the installed services may be deleted at the end of profiling operation to ensure that base system registry remains clean. Also since the profiler runs with administrative privilege, the profiler may have enough rights to install or delete the services.

A single user environment may refer to a streaming client installed in the client version of the platform. In such instances, one or more users may be logged in at one time. In such environment, a sandbox may be created when a streamed application is launched. If a created sandbox includes services that are isolated, all the isolated services with automatic start may be started. There may be an instance of the service that would be running or that would be created and then shared by other sandbox created from same profile. In some embodiments, two profiles may have the same service (service with same name). In some embodiments, such occurrences happen when the both profiles have two different versions of the same application installed. For example, one profile may run Microsoft Office 2003 version while another profile may run Microsoft office 2007 version. In such cases, services from both profiles may conflict due to conflict in RPC endpoints.

A multiuser environment may refer to sandboxes created in stream-to-server, or STS, scenarios. In some embodiments, treatment of the sandbox and the services is substantially similar as a treatment of a single user environment. When multiple sandboxes from the same profile are created, the service may be started in only one sandbox and may be shared by all other sandboxes. In some embodiments, such a configuration preserves the singleton behavior of the service and avoids any endpoint collision for service using sockets, RPC etc. In further embodiments, issues may be faced when two profiles having same service names run simultaneously. For example, the Microsoft Office 2007 and the Microsoft Office 2007 operated by two users may encounter issues if two different users are using these two profiles. In some embodiments, a conflict may occur if services are ran at the same time. In some embodiments, no conflicts occur.

An isolated service may be started based on the start type. An automatic start may include services which may be started when the sandbox is created from the profile. Such services may continue to run until the system is rebooted or shut down. A manual start may include services which may be started when there is a start service from within isolated process. These services may continue to run till the service is stopped or system is rebooted. In some embodiments, when shutting down the system, there might arise problems due to arbitrary order of shutting services down. When a service is created and started from the version one of the profile and the subsequent application launch finds an upgraded version two of the profile, the running version of the service may be stopped or deleted. The service from the newer profile may then be started. This may fail the current application calls to the service. The application may not communicate with the service for some time. In some embodiments, the application does not stop communicating with the service. If the application has stopped communicating with the service, the communication may be resumed after a period of time. When the profiled application deletes the service, the service may be deleted and the service entries may be removed from internal store. During profiling there may be a sandbox which may be using the service. In some embodiments, the service may be safely deleted during profiling The isolated service may be visible to processes running outside of isolation. In some embodiments, the isolated services are not visible to the processes running outside of isolation. In further embodiments, no communication is exchanged between the isolated and non-isolated processes.

A custom user may be provided and given a varying privilege level. An admin may choose which one suits best for the service requirements. In some embodiments, the services running as a local service, network service, or a local system are all supported. In some embodiments, global named objects (the objects created with Global\\prefix) may be used. In some embodiments, local named objects with user identifier and a session identifier (which may be prefixed as local\\ prefix) may be used. In some embodiments, if an application wants to share a named object with a service running in separate session, the application may share the named object via Global\\ objects. In some embodiments, Global prefixes and/or global named objects are mangled or obfuscated. In other embodiments, global prefixes and/or global named objects are not mangled or obfuscated. Similarly, local prefixes and local named objects may or may not be mangled or obfuscated, depending on the preference or the application.

In some embodiments, services may run in the sandbox created for them as user of the service. So the user root of the service may include the user context on which the service is launched. In some embodiments, the service operates irrespective of the context on which the service is launched. The user root may be flushed using the "radecache" utility. The isolated service may be isolated by using a user token to satisfy the authentication and/or permissions necessary to create an isolation environment for the service. Services started during profiling may be supported. In some embodiments, services that are created or started and then deleted during the profile time may be supported. For example, an Office update may use OSE service to upgrade the application.

The table below presents embodiments of API calls that may be used with the system and methods of the present application:

| API | Profiler-inside isolation | Client-inside isolation | From outside isolation |
| --- | --- | --- | --- |
| OpenSCManager | No Change in behavior | No Change in behavior | No Change in behavior |
| CreateService | Service Name mangled/service information stored in persistent storage | Service Name mangled/service information stored in persistent storage | No change in behavior |
| CloseServiceHandle Used to close SCM handle and service handle. | No change in behavior | No change in behavior | No Impact |

| API | Profiler-inside isolation | Client-inside isolation | From outside isolation |
|---|---|---|---|
| OpenService | For isolated services mangle the name and open the service For non isolated services pass through. | For isolated services open the service. For rest of the services pass through. | Opening isolated service would fail with ERROR_SERVICE_DOES_NOT_EXIST As SCM would not know this name |
| DeleteService | For services that got created from within the profiler. Delete them. For rest of the service pass through | Access Denied | No impact (works on handle the behavior would depend on how the handle is opened) |
| StartService | For isolated service the service would be started. For non isolated service Pass though | For isolated service the service would be started. For non isolated service Pass though | No impact (works on handle the behavior would depend on how the handle is opened) |
| QueryServiceStatusEx | NO change Would Behave as expected | NO change Would Behave as expected | NO change Would Behave as expected |
| ControlService ControlServiceEx | No change Would Behave as expected | No change Would Behave as expected | NO Change Would Behave as expected |
| ChangeServiceConfig ChangeServiceConfig2 | This API could change parameters including the service binaries? This would be handled | This API could change parameters including the service binaries? This would be handled | No Change |
| EnumDependentServices | Will unmangle isolated services name before returningpresent disclosureto application. | Will unmangle isolated services name before returningpresent disclosureto application. | NO Change. |
| EnumServicesStatusEx EnumServicesStatus | Shall return all the service including the isolated service. | Shall return all the service including the isolated service. | Do we have to hide the isolated services? |
| GetServiceDisplayName | Would return actual service name for isolated service | Would return actual service name for isolated service | No Change in behavior |
| GetServiceKeyName | Would return actual service name for isolated service | Would return actual service name for isolated service | No Change in behavior |
| LockServiceDatabase | Not supported | Not supported | No change |
| QueryServiceLockStatus | Not supported | Not supported | No change |
| UnlockServiceDatabase | Not supported | Not supported | No change |

The service may be seen by the end user in the service control manager. The service may not be masked from the service control manager. In some embodiments, the service may include a name mangled with a constant string. Within an isolated application the service may be identified with the actual name. The user may not be able to start the isolated services inside isolation from the service control manager. In some embodiments, only isolated applications can start the services. The service control manager may run inside isolation in order to start isolated services.

When a profile is updated all services installed in the profile may be created and those which are automatic start configured may be started. Also, when the profiled application is streamed to the client, all the recorded services need to be installed before the application is started. This may be accomplished by installing all the recorded services via the RadeHelperService (which runs as system) within the profile before actually starting the application.

An isolated application may open a service. Applications may use the OpenService API function to open the handle to an installed service. This handle may be used to perform various operations such as starting/stopping/controlling/querying the service. Like the CreateService function, the OpenService function may also be hooked to provide a virtual view of a service to the streamed application. Whenever the streamed application tries to open any service, the application may land up in the hooked function. Inside this hooked OpenService function, the service name parameter may be changed to its mapped name and then passed onto the original OpenService function. If the service does not exist inside isolation we can pass the original unmangled name to the OpenService API.

Applications may use the OpenService and then the StartService function to start the installed service. The StartService function may invoke an RStartService function within the SCM. This function may retrieve the binary path of the service from the registry database and then use the CreateProcess or CreateProcessAsUser function to create the service process in suspended mode. Both these functions may internally call the CreateProcessInternal function to create the process. A hook in the CreateProcessInternal function may take care of isolating the service. Once the service process is created, a unique name may be created to communicate with the service.

In order to support service isolation, the CreateProcessInternal function within the SCM process (services.exe) may be hooked to alter its behavior with respect to streamed services. When the application invokes the StartService function to start the service, the application may first land up on a hooked StartService call where the application may mark the service to be isolated by writing in the HKLM\Software\Citrix\IsolatedServices registry Key. The application may then place a call with the SCM, from where the application may end up in the hooked CreateProcessInternal function in the SCM where the application may check the HKLM\Software\Citrix\IsolatedServices key to see if the service needs to be isolated. If the service needs to be isolated, the service process may be created in suspended mode and then sandboxed. In some embodiments, only users having access to the HKLM\Software\Citrix\IsolatedServices key can start an isolated service. After reading this Key, the SCM may delete the registry subkey with the name of the service to ensure that the locally installed services inside the isolation environment may be started. The sandbox may be created for the user for which the service runs or for session zero. This configuration may ensure that the service uses the user root of the service user and not that of the process that imitated the launch of the service.

Next in the RStartService function after the response returns from the CreateProcess function a named pipe may be created to communicate with the service process. Then, the application uses the actual service, the process may handle responses returned from the CreateProcess function to resume the service process. The real service process may run under the same isolation environment as the streamed application. Also all the service related communication between the SCM and the isolated service process happens seamlessly over the named pipe.

Figure 28:
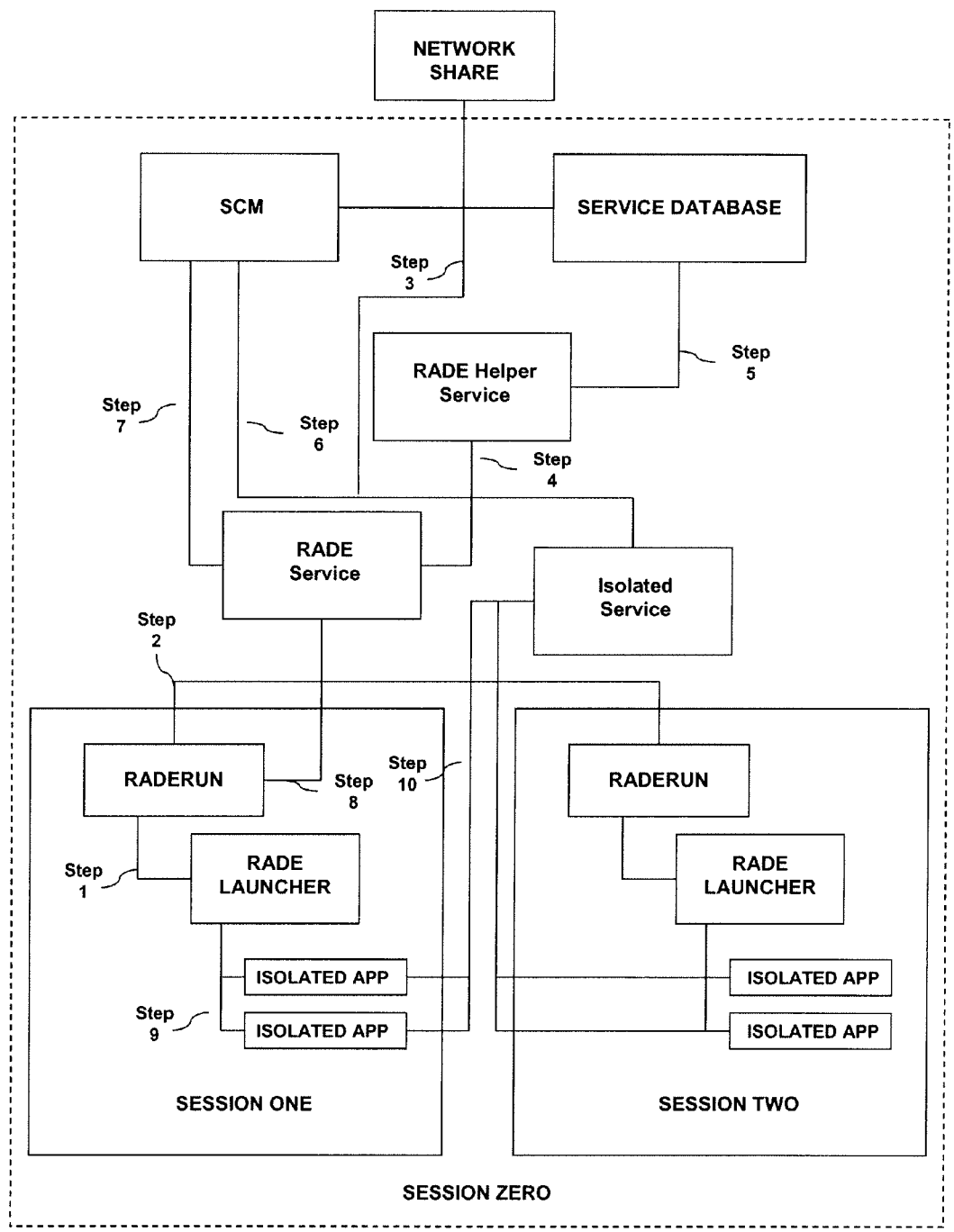
FIG. 28 is a block diagram depicting an embodiment for starting an using a service in an isolation environment.
Figure 29:
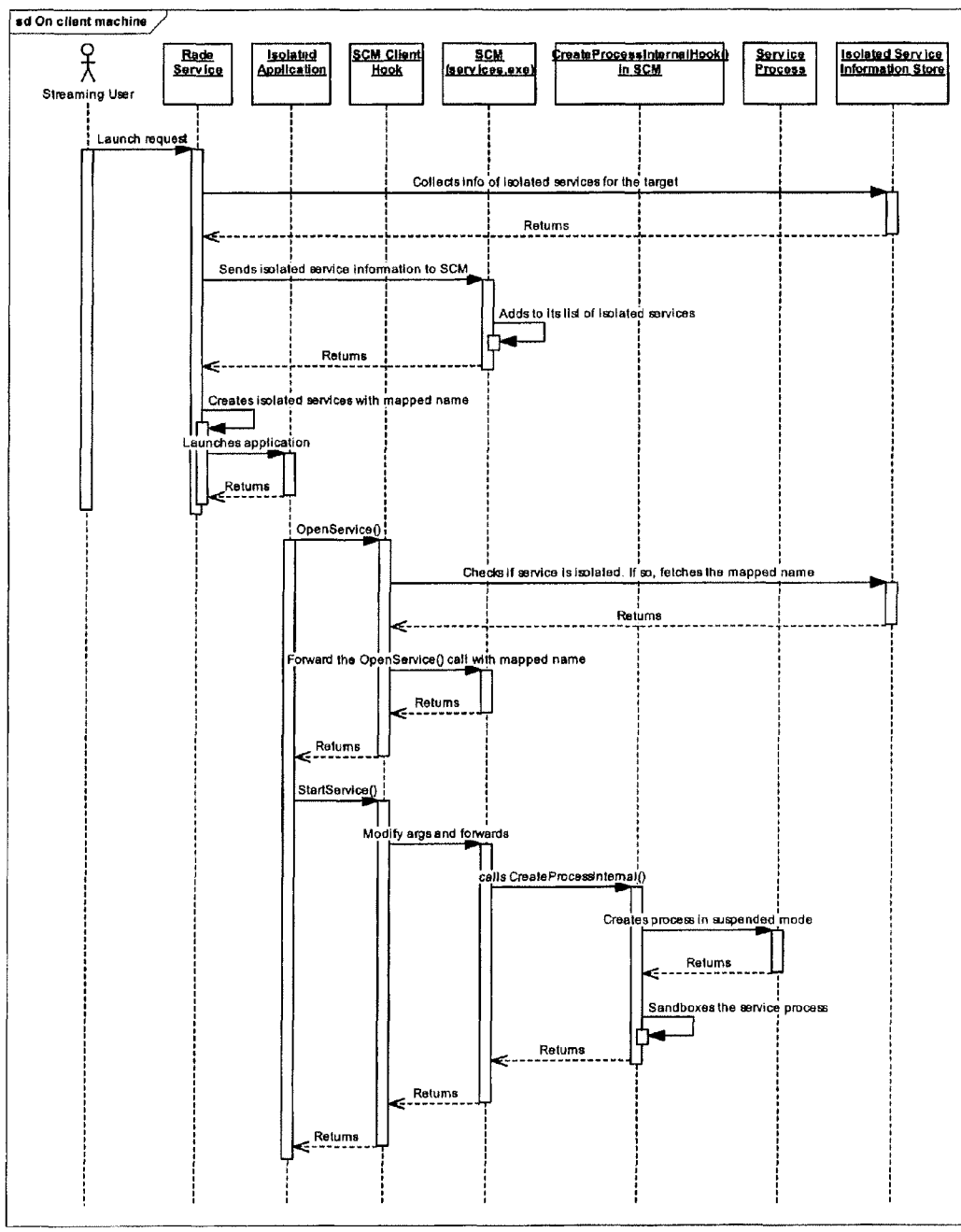
FIG. 29 is a diagram depicting an embodiment of steps for starting an using a service in an isolation environment.

Referring now to FIGS. 28 and 29, embodiments of systems and methods which may include the flow of actions or events for starting or using the services is depicted.

Referring to FIGS. 28 and 29, steps of embodiments of a method are depicted. At step 0: An application is launched via either PNagent or Dazzle, and RadeRun is spawned. At step 1: RadeRun launches RadeLauncher in suspended mode. At step 2: RadeRun makes an RPC call to RadeService and requests that the application sandbox RadeLauncher. At step 3: RadeService goes to the remote share to read the profile (if trusted), in order to create sandbox rules. At step 4: RadeService checks if the profile has services, if so, the application requests that the RadeHelperService create the service with a mangled name outside isolation. At step 5: RadeHelperService creates the service with a mangled name outside isolation, and if the service happens to be configured to auto start, RadeHelperService starts the service. At step 6: StartService ultimately ends up in the SCM CreateProcessInternal hook where the application launches the service in suspended mode. At step 7: The SCM then makes a call to RadeService to create a sandbox with this suspended process, and resumes the service. Now the service is up and running in the sandbox. At step 8: The call now returns to RadeService, which then returns the call to RadeRun, notifying that RadeLauncher has been successfully sandboxed. RadeRun then resumes RadeLauncher. At step 9: RadeLauncher then does a ShellExecute on the application to be launched, and the isolated application comes up. At step 10: The isolated application comes up and communicates with the isolated service.

Once the isolated service is started, the streamed application may use the ControlService or StopService function to stop, pause or continue the service. These functions may finally invoke an RControlService or RStopService function within the SCM, which then may send the appropriate control commands to the isolated service over the named pipe. All these control events may be handled independently by the SCM without any need to intercept these functions. Service names may have mapped names which may be created in the profiling system during profiling. All the services may be deleted at the end of the profiling operation. This may be done to make sure that the profiler system is clean; otherwise, installed services may remain in the base system's registry.

Isolated services may be created in the client system with mapped names. Such a service may run as a part of a sandbox created on behalf of the service user or in session zero. These services may continue to run until the system is rebooted or RadeCache FlushAll is called. Isolated services may be deleted when the RadeCache is flushed. However, deletion of a service from within an isolation environment may not be allowed on the client side.

Applications may use the GetServiceKeyName API to retrieve the name of a specified service. Like the CreateService function, the GetServiceKeyName function may be hooked to provide a virtual view of a service to the streamed application. Whenever a streamed application tries get the name of a service from the display name, the application may use a hooked function. Using a hooked function, such as the GetServiceKeyName function, the application may check whether or not the passed display name is for an isolated service. Then a query may be made to an internal data base. In some embodiments, an original API call may be made. Applications may use the QueryServiceConfig API configuration parameters of a specified service. Like the CreateService function, the QueryServiceConfig function may also be hooked to provide a virtual view of a service to the streamed application. Whenever a streamed application calls QueryServiceConfig, the application may end up in the hooked function. Inside this hooked QueryServiceConfig function, an internal data base may be checked to see if the application requires an isolated service. If so, the original API call may be sent to retrieve the information and then de-mangle the required entries and pass the application back to the caller.

Applications may use the ChangeServiceConfig and ChangServiceConfig2 APIs to configure parameters of a specified service. Like other service related APIs, the ChangeServiceConfig and ChangServiceConfig2 functions may also be hooked to provide a virtual view of a service to the streamed application. Whenever a streamed application calls QueryServiceConfig, the application may end up in the hooked function. Using this hooked ChangeServiceConfig function, the application may check the internal data base to see if the application requires an isolated service. If yes, a call to the original API is made to retrieve the information, and then the internal database is updated. Services may use the RegisterServiceCtrlHandler to register a function for handling service control requests. Like other service related APIs, RegisterServiceCtrlHandler may be hooked to provide a virtual view of a service to the streamed application. Whenever an isolated service calls RegisterServiceCtrlHandler, the application may end up in the hooked function. Using this hooked RegisterServiceCtrlHandler function, the application may check the internal data base to see if it requires an isolated service; if yes a call to the original API with a mangled service name is made. Services may use StartServiceCtrlDispatcher to connect the main thread of a service process to the service control manager, which may cause the thread to be the service control dispatcher thread for the calling process. Like other service related APIs, StartServiceCtrlDispatcher may also be hooked to provide a virtual view of a service to the streamed application.

The invention claimed is:

1. A method, comprising:
   sending, by a local machine, a request to stream an application;
   receiving, by the local machine, an access information file including access information for accessing a plurality of application files and for executing a first client;
   retrieving an identification of the plurality of application files, responsive to the access information file;
   receiving, by the local machine, information identifying whether the application requires the use of a service with greater security privilege levels than those available to the user of the local machine;
   determining that the application requires use of the service and that the service needs to be isolated;
   creating, by the local machine responsive to the determination, an isolation environment with security privilege levels greater than those available to the application; and
   starting the service as an isolated service in the isolation environment with security privilege levels greater than those available to the application.

2. The method of claim 1, further comprising the step of using credentials or a token with a different security privilege level than that of the isolation environment for isolated services to access information unavailable to services running with security privilege levels of the isolation environment for isolated services.

3. The method of claim 1, wherein receiving information identifying whether the application requires the use of services with greater security privilege levels than those available to the user of the local machine includes receiving at least one of mapping information, profiling information, or information identifying services as isolated services.

4. The method of claim 1, where the starting of isolated services occurs after an application is launched and the application requests a service that is determined to be an isolated service.

5. The method of claim 1, further comprising the step of deleting all the isolated services.

6. The method of claim 1, wherein starting an isolated service occurs upon startup or reboot of the local machine.

7. The method of claim 1, wherein an isolated service is started in its own sandbox.

8. The method of claim 1, where creating an isolation environment is accomplished through the use of a Service Control Manager.

9. The method of claim 8, wherein the Service Control Manager initiates, manages, starts, stops, pauses, or deletes an isolated service.

10. The method of claim 8, wherein the Service Control Manager determines whether a particular service should be isolated.

11. A system comprising:
    a local machine communicatively connected to a network;
    an environment on the local machine configured to run a streamed application from the network; and
    a Service Control Manager (SCM) configured to determine that the streamed application requires use of a service that requires greater security privilege levels than those available and needs to be isolated, wherein the SCM creates, responsive to the determination, an isolation environment on the local machine with security privilege levels greater than those available to the environment running the streamed application and starts the service as an isolated service in the isolation environment.

12. The system of claim 11, further comprising storage on the network for information identifying whether an application requires the use of services with greater security privilege levels than those available to the user of a local machine.

13. The system of claim 11, wherein the isolation environment further comprises sandboxes for each isolated service.

14. The system of claim 11, wherein the local machine comprises storage for isolated services information.

15. A system comprising:
    means for sending, by a local machine, a request to stream an application;
    means for receiving, by the local machine, an access information file including access information for accessing a plurality of application files and for executing a first client;
    means for retrieving an identification of the plurality of application files, responsive to the access information file;
    means for receiving, by the local machine, information identifying whether the application requires the use of a service with greater security privilege levels than those available to the user of the local machine;
    means for determining that the application requires use of the service and that the service needs to be isolated;
    means for creating, by the local machine responsive to the determination, an isolation environment with security privilege levels greater than those available to the application; and
    means for starting the service as an isolated service in the isolation environment with security privilege levels greater than those available to the application.

16. The system of claim 15, further comprising means for using credentials or a token with a different security privilege level than that of the isolation environment for isolated services to access information unavailable to services running with security privilege levels of the isolation environment for isolated services.

17. The system of claim 15, further comprising means for receiving information identifying whether the application requires the use of services with greater security privilege levels than those available to the user of the local machine where said information includes receiving at least one of mapping information, profiling information, or information identifying services as isolated services.

18. The system of claim 15, further comprising means for starting isolated services after an application has launched and the application requests a service that is determined to be an isolated service.

19. The system of claim 15, further comprising means for deleting all the isolated services.

* * * * *